US012532336B2

(12) United States Patent
Khalid

(10) Patent No.: US 12,532,336 B2
(45) Date of Patent: Jan. 20, 2026

(54) METHODS AND APPARATUS FOR IMPLEMENTING WIRELESS SIDELINK COMMUNICATIONS

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 302 days.

(21) Appl. No.: 18/234,543

(22) Filed: Aug. 16, 2023

(65) Prior Publication Data

US 2025/0063581 A1 Feb. 20, 2025

(51) Int. Cl.
*H04W 72/40* (2023.01)
*H04W 28/02* (2009.01)

(52) U.S. Cl.
CPC ....... *H04W 72/40* (2023.01); *H04W 28/0226* (2013.01)

(58) Field of Classification Search
CPC ............. H04W 72/40; H04W 28/0226; H04W 76/023; H04W 76/14; H04W 4/021; H04W 4/023; H04W 4/80; H04W 64/00
See application file for complete search history.

(56) References Cited

U.S. PATENT DOCUMENTS

| 2014/0192737 | A1* | 7/2014 | Belghoul | H04W 4/021 370/328 |
| 2023/0333194 | A1* | 10/2023 | Duan | G01S 5/0072 |
| 2025/0113329 | A1* | 4/2025 | Barbu | H04W 36/0055 |

OTHER PUBLICATIONS

WO_2022140745_A1 (Year: 2022).*

* cited by examiner

*Primary Examiner* — Rushil P. Sampat
(74) *Attorney, Agent, or Firm* — Straub & Straub; Stephen T. Straub; Michael P. Straub

(57) ABSTRACT

Methods and apparatus for determining and implementing out of coverage sidelink communications between user equipment devices. An exemplary method includes the steps of: receiving from a first wireless network, by a geo-fencing proximity analyzer of a second wireless network, session request information for a session to be established between a first user equipment device and a second user equipment device; determining, by the geo-fencing proximity analyzer, whether or not a sidelink communications session is to be established between the first user equipment device and the second user equipment device based on: (i) the location of the first user equipment device, and (ii) the location of the second user equipment device; and wherein the first user equipment device and the second user equipment device are both located outside the coverage area of the second wireless network.

20 Claims, 20 Drawing Sheets

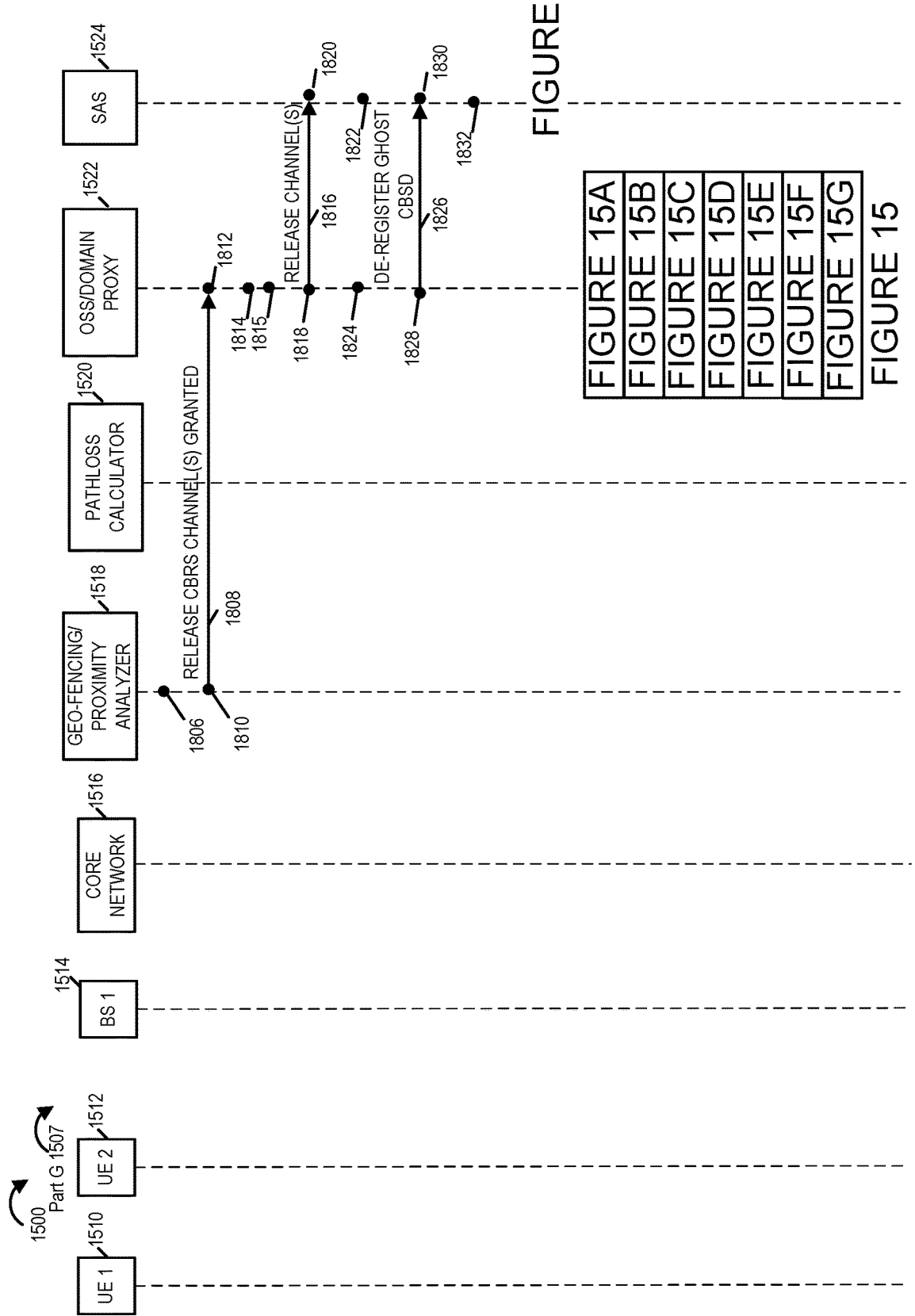

METHODS AND APPARATUS FOR IMPLEMENTING WIRELESS SIDELINK COMMUNICATIONS

FIELD OF INVENTION

The present invention relates to methods and apparatus for implementing wireless sidelink communications. The present invention also relates to methods and apparatus for implementing sidelink communications for out of coverage area user equipment devices (e.g., mobile devices) using Citizen Broadband Radio Service spectrum such as for example in a Hybrid Mobile Network Operator environment and/or system.

BACKGROUND OF THE INVENTION

In a wireless network, wireless base stations (e.g., Citizens Broadband Radio Service Devices (CBSDs) in Citizen Broadband Radio Service (CBRS) networks) serve as access points which can support wireless communications with mobile terminals also referred to herein as user equipment devices (UEs). In some such wireless networks there are multiple tiers defining what frequency spectrum bands may be used and the amount of interference that the users may cause. In the CBRS wireless network for example there are three tiers. Tier 1 is an incumbent access tier. Tier 2 is a Priority Access Tier. Tier 3 is General Authorized Access tier. The Priority Access tier consists of Priority Access Licenses (PALs) that are licensed by the government to operate in a specific geographic area. With respect to the CBRS wireless system the Priority Access Licenses are on a county-by-county basis. Each PAL consisting of a 10 megahertz channel within the 3550-3650 MHz band. While the Priority Access Licenses must protect and accept interference from Incumbent Access users such as for example, authorized federal users in the 3550-3700 MHz band and Fixed Satellite Service (space-to-Earth) earth stations in the 3600-3650 MHz band, the Priority Access Licenses receive protection from General Authorized Access (GAA) users. The General Authorized Access tier is licensed-by-rule to permit open, flexible access to the band with the intent of allowing access to the widest possible group of potential users. While the GAA users are permitted to operate throughout the 3550-3700 MHz band, GAA users must not cause harmful interference to Incumbent Access users or Priority Access Licensees. Furthermore, GAA users must accept interference from the Incumbent Access users and the Priority Access Licensees. Moreover, GAA users have no expectation of interference protection from other GAA users.

In various instances, wireless service operators operate in a geographic area as both PAL users and GAA users in which they utilize both licensed PAL spectrum and unlicensed open GAA spectrum. PAL spectrum is licensed and there is a cost associated with the PAL license. The PAL licensed spectrum is high quality since the PAL spectrum is clean in terms of excess interference. As previously mentioned, the PAL spectrum is protected from interference from the GAA users. Furthermore, many wireless service providers are implementing their CBRS wireless networks as 5G (3rd Generation Partnership Project fifth generation wireless networks). Currently, in 5G networks or spectrum also referred to as bandwidth is allocated by wireless base stations to each user equipment device regardless of whether that spectrum is licensed (e.g., CBRS PAL spectrum) or unlicensed (e.g., CBRS GAA spectrum).

Wireless service operators utilizing both PAL and GAA spectrum in the same geographic area are currently faced with the technological problem of how to utilize PAL and GAA spectrum with very high utilization rates.

Some wireless networks, such as for example, CBRS networks, often include one or more wireless base stations (e.g., Citizens Broadband Radio Service Devices (CBSDs)) with overlapping coverage areas in which multiple wireless service operators can operate. A wireless service operator's wireless base stations (e.g., CBSDs) are used to provide services to subscribers' user equipment devices. GAA spectrum is granted to each of these wireless base station (e.g., CBSDs) using a centralized resource allocation management device or system. In the CBRS network the resource allocation management device is called the Spectrum Access System (SAS). The resource allocation management device, e.g., Spectrum Access System in a CBRS network, is a central processing and database system that receives and processes spectrum grant requests. In such wireless networks, e.g. CBRS network, interference is managed through power management of wireless base station devices (e.g., CBSD devices) by the resource allocation management device, e.g., the Spectrum Access System (SAS). The resource allocation management device (e.g., SAS) stores information regarding which wireless base station (e.g., CBSD) uses how much spectrum at which location in the wireless network, e.g., CBRS network. When a specific amount of GAA spectrum is granted to a particular wireless base station (e.g., CBSD) with a specific transmission power, the resource allocation management device (e.g., SAS) calculates the coverage of this wireless base station (e.g., CBSD) by using a pre-determined path-loss model. The resource allocation management device (e.g., SAS) manages monitors and manages the interference caused by the different wireless base stations and adjusts the transmission power of the different wireless base stations to minimize the interference while maximizing the utilization of the limited frequency spectrum which is available. In some instances, the SAS grants one or more blocks of GAA spectrum to a wireless service operator or provider for a particular area or location such as a county or city and the service operator or provider operates a plurality of base stations in the particular area or location using the granted spectrum and any PAL spectrum the service operator or provider has licensed for the area or location.

In the same areas where a CBRS network operator is operating using CBRS spectrum a Mobile Network Operator is also typically operating using a different set of spectrum for example cellular spectrum. In some instances, there are Hybrid Mobile Network Operators which operate there own CBRS network while also being a Mobile Virtual Network Operator entering into agreements with the Mobile Virtual Network Operator to allow their subscribers to have seamless coverage by being able to obtain services through the Mobile Virtual Network Operator when outside the CBRS coverage area. The Hybrid Mobile Network Operator having a limited wireless network coverage area with base stations (e.g., CBSDs) typically deployed in areas of high traffic density where it makes economic sense to offload traffic from the MNO network and thereby reduce fees to be paid to the MNO for use of its network. In such instances, a CBRS network operator may pay for PAL license for an entire county but only have coverage in small area such as a particular city in the county. The PAL licensed spectrum not being utilized. There is a procedure for sidelink communications where device to device communications are implemented but this requires the devices to be in communications with a base station of the wireless network whose spectrum is to be utilized.

From the foregoing, it should be understood that there is a need for new and/or improved methods and apparatus for achieving ways to utilize licensed spectrum in areas where a wireless network operator does not have wireless coverage. From the foregoing, it should be further understood that there is a need for new and/or improved methods and apparatus for wireless network operators such as MVNO operators to be able to offload traffic from a mobile network operator when a MVNO operator also licenses spectrum but does not have the wireless network infrastructure (e.g., base stations to provide wireless coverage throughout the licensed spectrum area). Furthermore, there is a need for new and/or improved methods and apparatus for providing sidelink device to device communications using a wireless network operator's spectrum in areas outside the coverage area of the wireless network operator. There is furthermore a need for new and/or approved methods and apparatus to more effectively and efficiently utilize wireless resources (e.g., spectrum) while also reducing an operator's costs.

SUMMARY OF THE INVENTION

The present invention provides new and/or improved methods and apparatus for achieving out of coverage area sidelink communications sessions between user equipment devices. Various embodiments of the present invention provide new and/or improved methods and apparatus for determining under what conditions to implement sidelink communications sessions between out of coverage user equipment devices. Various embodiments of the present invention provide new and/or improved methods and apparatus for more efficiently and effectively utilizing resources, (e.g., licensed and unlicensed spectrum) in wireless systems. Various embodiments of the present invention provide new and/or improved methods and apparatus for offloading traffic sessions from a first wireless network by using spectrum licensed to a second wireless network and/or unlicensed spectrum. Various embodiments of the present invention provide new and/or improved methods of determining the type of spectrum (e.g., licensed or unlicensed) and what spectrum bands and/or channels to use for out of coverage sidelink communications between user equipment devices to minimize interference with other user equipment devices. Various embodiments of the present invention solve one or more of the problems discussed above.

In an exemplary embodiment of the present invention, Dual SIM Dual Subscription user equipment devices of a second wireless network within the coverage area of a first wireless network but outside the coverage area of the second wireless network report their location (e.g., Global Position System (GPS) coordinates) to a geo-fencing proximity analyzer (also referred to herein as a sidelink proximity analyzer) of the second wireless network via the first wireless network. When a first user equipment device of the second wireless network sends a session initiation request to a base station of the first wireless network over the first wireless network's spectrum to establish a session with a second user equipment device of the second wireless network, session information is provided to the geo-fencing proximity analyzer by network equipment in the first wireless network (e.g., network core of the first wireless network). The geo-fencing proximity analyzer determines based on at least the reported locations of the first and second user equipment devices whether a sidelink communications session in which the first user equipment device and the second user equipment device communicate directly with one another with a device to device connection is to be implemented for the session.

When the decision is that a sidelink communications session is to be established, the geo-fencing proximity analyzer determines what type of spectrum licensed (e.g., spectrum licensed to the second wireless network) and/or unlicensed spectrum is to be used for the sidelink communications session for example based on the potential interference the sidelink communications session will cause with other user equipment devices operating within the coverage area of the second wireless network.

A pathloss calculator is used to determine the pathloss between the first user equipment device and the second user equipment and instructions for the power transmission levels for the first and second user equipment devices for the sidelink communications session.

A Domain Proxy registers a ghost base station with a Spectrum Access System and obtains spectrum channel grants for the first and second user equipment devices to utilize for the sidelink communications session. The ghost base station is a fictious non-existent base station which is registered as belonging to the second wireless network with a location based on the reported locations of one or both of the first and second user equipment devices. The spectrum grants obtained using this method allow for the identification of spectrum channels with the least or a minimal amount of interference from the spectrum available. The Spectrum Access System manages the spectrum in the second wireless network which in various embodiments is shared spectrum (e.g., CBRS spectrum).

Spectrum grant information identifying the granted spectrum channels and power transmission level instructions are sent to the first and second user equipment devices via the first wireless network as the user equipment devices are outside the coverage area of the second wireless network. Upon receiving the spectrum information and power transmission level instructions, the first and second user equipment devices use the information to establish a sidelink communications session using the granted spectrum. Upon completion of the sidelink communications session, the granted spectrum is relinquished.

The user equipment devices of the second wireless network including the first and second user equipment devices as previously described are Dual Subscriber Dual Subscription devices. These devices include credentials and functionality allowing the user equipment devices to operate on both the first wireless network and the second wireless network. The second wireless network operator being a Mobile Virtual Network Operator with respect to the services provided by the first wireless network to the user equipment devices of the second wireless network. That is the first wireless network is bound via an agreement with the second wireless network operator to provide wireless services to the user equipment devices of the second wireless network. These services are typically provided when the user equipment devices are outside the coverage area of the second wireless network but within the coverage area of the first wireless network. The sidelink communications sessions offload traffic from the first wireless network and thereby reduce expenses for the second wireless network while also freeing up spectrum resources of the first wireless network. In some embodiments, the first wireless network operates using the cellular frequency band for communicating with user equipment devices while the second wireless network does not use the cellular frequency band for communicating with the user equipment devices but instead uses the CBRS frequency band (e.g., 3.55 to 3.7 GHz frequency band). In some embodiments, the first wireless network utilizes unshared spectrum for communicating with user equipment devices while the second wireless network utilizes shared spectrum that requires a resource management device, e.g., a Spectrum Access System, to manage the allocation and usage of the shared spectrum between different devices and operators. The first wireless network in some such embodiments does not require a resource management device, e.g., a Spectrum Access System, as the first wireless network's spectrum is not shared with other operators in its licensed area of operation.

An exemplary method in accordance with one embodiment of the present invention includes the steps of: receiving from a first wireless network, by a geo-fencing proximity analyzer of a second wireless network, session request information (e.g., a sidelink determination request or a session initiation request from the first core network of the first wireless network) for a session to be established between a first user equipment device and a second user equipment device, said first user equipment device and the second user equipment device both being located outside the coverage area of the second wireless network; and determining, by the geo-fencing proximity analyzer, whether or not a sidelink communications session is to be established between the first user equipment device and the second user equipment device based on: (i) the location of the first user equipment device, and (ii) the location of the second user equipment device.

In some embodiments, when the geo-fencing proximity analyzer determines that a sidelink communications session is to be established between the first user equipment device and the second user equipment device, communicating spectrum channel grant information to the first user equipment device and the second user equipment device via the first wireless network, said spectrum channel grant information identifying one or more spectrum channels to be used for the sidelink communications session between the first user equipment device and the second user equipment device.

In some embodiments, the method further includes the steps of: communicating from the geo-fencing proximity analyzer to the first user equipment device and the second user equipment device via the first wireless network power transmission level instructions to be used for the sidelink communications session between the first user equipment device and the second user equipment device and an indication that the communications session between the first user equipment device and the second user equipment is be implemented as a sidelink communications session.

In some embodiments, subsequent to receiving from the geo-fencing proximity analyzer the spectrum channel grant information and power transmission level instructions at the first user equipment device and the second user equipment device, the method further includes the steps of: establishing, by the first user equipment device and the second user equipment device, a sidelink communications session between the first user equipment device and the second user equipment device utilizing the spectrum channels identified in the received spectrum channel grant information.

In some embodiments, the one or more spectrum channels are spectrum channels licensed to the second wireless network (e.g., CBRS PAL spectrum licensed to the second wireless network).

In some embodiments, the one or more spectrum channels are unlicensed spectrum channels (e.g., CBRS GAA spectrum channels).

In some embodiments, the one or more spectrum channels are determined by querying a Spectrum Access System for available spectrum channels in a first location, said first location being determined based on one or more of the following: (i) the first user equipment device location, and (ii) the second user equipment device location.

In some embodiments, the method further includes the step of: determining, by the geo-fencing proximity analyzer, the type of spectrum to be utilized for the sidelink communications session based on a determination of whether or not the sidelink communications session will cause interference with other user equipment devices operating within the coverage area of the second wireless network.

In some embodiments, the step of determining, by the geo-fencing proximity analyzer, whether or not a sidelink communications session is to be established between the first user equipment device and the second user equipment device based on: (i) the location of the first user equipment device, and (ii) the location of the second user equipment device includes: determining whether the distance between the first user equipment device and the second user equipment device is less than a first threshold value.

In some embodiments, the determination, by the geo-fencing proximity analyzer, of whether or not a sidelink communications session is to be established between the first user equipment device and the second user equipment device is further based on one or more of the following: device type of the first user equipment device, device type of the second user equipment device, capabilities of the first user equipment device, capabilities of the second user equipment device, type of communications session to be established.

In some embodiments, the determination, by the geo-fencing proximity analyzer, of whether or not a sidelink communications session is to be established between the first user equipment device and the second user equipment device is further based on information (e.g., calculated and/or determined pathloss for the sidelink communication session between UE 1 and UE 2 (e.g., transmission signal attenuation from the first user equipment device to the second user equipment device) and/or user equipment device power transmission level required for the sidelink communication) received from a pathloss calculator regarding the sidelink communications session to be established between the first user equipment device and the second user equipment device.

In some embodiments, the method further includes the steps of: identifying one or more available spectrum channels that can be used for the sidelink communications session between the first user equipment device and the second user equipment device; and obtaining one or more spectrum channel grants for the sidelink communications session from a Spectrum Access System managing the spectrum of the second wireless network, said one or more spectrum channel grants including said information identifying said one or more spectrum channels to be used for the sidelink communications session between the first user equipment device and the second user equipment device; and wherein said one or more spectrum channels to be used for the sidelink communications session are one or more of the prior identified available spectrum channels that can be used for the sidelink communications session between the first user equipment device and the second user equipment device.

In some embodiments, the method further includes the steps of: registering by a Domain Proxy of the second wireless network a ghost base station with a Spectrum Access System which is managing the use of spectrum by the second wireless network, said ghost base station being a fictious non-existent base station; receiving at the Domain Proxy a registration identifier for the ghost base station from the Spectrum Access System; communicating a spectrum query from the Domain Proxy to the Spectrum Access System, said spectrum query including information (e.g., the registration identifier) indicating the query is from the ghost base station, said spectrum query requesting information on spectrum available for use by the ghost base station; receiving by the Domain Proxy information from the Spectrum Access System in response to the spectrum query, said information identifying spectrum available for use by the ghost base station (e.g., information identifying the best portions of available spectrum at the location of the ghost base station such as for example the available spectrum channel(s) with the least interference).

In some embodiments, the method further includes a Spectrum Access System which performs the following steps: performing, by the Spectrum Access System, an evaluation of available spectrum based on the location of the ghost base station (e.g., provided during registration of the ghost base station) or the first location included in the spectrum query; determining, by the Spectrum Access System, the available spectrum channels and an amount of interference on each of the available spectrum channels; determining, by the Spectrum Access System, available spectrum channels with the least amount of interference; and communicating, by the SAS to the Domain Proxy, one or more of the following: (i) information on the available spectrum channels, (ii) interference measurement information on the available spectrum channels, (iii) identification of available spectrum channels with the least amount of interference.

In some embodiments, the first user equipment device and second user equipment device are user equipment devices of the second wireless network. In some embodiments, the first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network. In some embodiments, the second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network. In some embodiments, the first wireless network utilizes first spectrum to communicate with user equipment devices, said first spectrum being in the cellular frequency band (e.g., between 600 MHz and 39 GHz). In some embodiments, the second wireless network utilizes second spectrum to communicate with user equipment devices (e.g., CBRS spectrum in frequency band between 3.55 to 3.7 GHz), said first and second spectrum being different.

In some embodiments, the first wireless network provides wireless services to user equipment devices of the second wireless network pursuant to an agreement between the first wireless network and the second wireless network (e.g., MVNO agreement). In some embodiments, the second wireless network operator is Hybrid Mobile Network Operator in which the second wireless network is owned and operated by the second wireless network operator and wherein the second wireless network operator operates as a Mobile Virtual Network Operator with respect to the first wireless network, said first wireless network being owned and operated by a Mobile Network Operator with which the second wireless network operator has entered into an agreement in which the second wireless network user equipment devices can receive wireless services from the first wireless network.

The present invention is also applicable to apparatus and system embodiments wherein one or more devices implement the steps of the method embodiments. In some apparatus embodiments each of the wireless base station, user equipment devices, network equipment devices, geo-fencing proximity analyzer, Domain Proxy, Pathloss Calculator, Spectrum Access System and each of the other apparatus/devices/nodes of the system include one or more processors and/or hardware circuitry, input/output interfaces including receivers and transmitters, and a memory. The memory including instructions when executed by one or more of the processors control the apparatus/device/node of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes a geo-fencing proximity analyzer including: memory; and a first processor that controls the geo-fencing proximity analyzer to perform the following operations: receiving, by the geo-fencing proximity analyzer, from a first wireless network, session request information (e.g., a sidelink determination request or session initiation request from the first core network of first wireless network) for a session to be established between a first user equipment device and a second user equipment device, said first user equipment device and the second user equipment device both being located outside the coverage area of the second wireless network; and determining, by the geo-fencing proximity analyzer, whether or not a sidelink communications session is to be established between the first user equipment device and the second user equipment device based on: (i) the location of the first user equipment device, and (ii) the location of the second user equipment device.

In some embodiments, the first process further controls the geo-fencing proximity analyzer to perform the following operation when the geo-fencing proximity analyzer determines that a sidelink communications session is to be established between the first user equipment device and the second user equipment device: communicating spectrum channel grant information to the first user equipment device and the second user equipment device via the first wireless network, said spectrum channel grant information identifying one or more spectrum channels to be used for the sidelink communications session between the first user equipment device and the second user equipment device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 15 comprises FIG. 15A, FIG. 15B, FIG. 15C, FIG. 15D, FIG. 15E, FIG. 15F, and FIG. 15G.

FIG. 15G is the seventh part of a signaling diagram which illustrates the steps and signaling of an exemplary method in accordance with an embodiment of the present invention.

DETAILED DESCRIPTION

Citizens Broadband Radio Service (CBRS) is a tiered solution with the top tier dedicated for fixed satellite, wireless internet service providers as well as navy radar. The second tier consists of PAL (Priority Access Licensees) and the last tier consists of General Authorized Access (GAA).

Normally, for a licensed mode of operation, in 5G and 4G wireless systems user equipment devices (UEs), e.g., mobile devices, operate under the control of the network's scheduler. Network scheduling includes the process of allocating resources for transmitting data. The scheduling of resources being controlled by the network (e.g., via control instructions sent to the UEs from one or more network scheduler(s)) with the UEs just following the received network's instructions. Messages being communicated between user equipment devices via wireless base stations. However, user equipment devices can also wirelessly communicate directly with each other. This device to device wireless communication can take place under the network's supervision or without supervision if there is no network available. If the devices are not under the network's coverage, this wireless device to device communication is call out of coverage sidelink communication. Out of coverage sidelink communications still requires resources (e.g., spectrum) as the original network. For example, out of coverage sidelink communications between user equipment devices will require frequency resources (or frequency-time resources) which are part of the original network's operating frequency resources over which to communicate.

Figure 1:
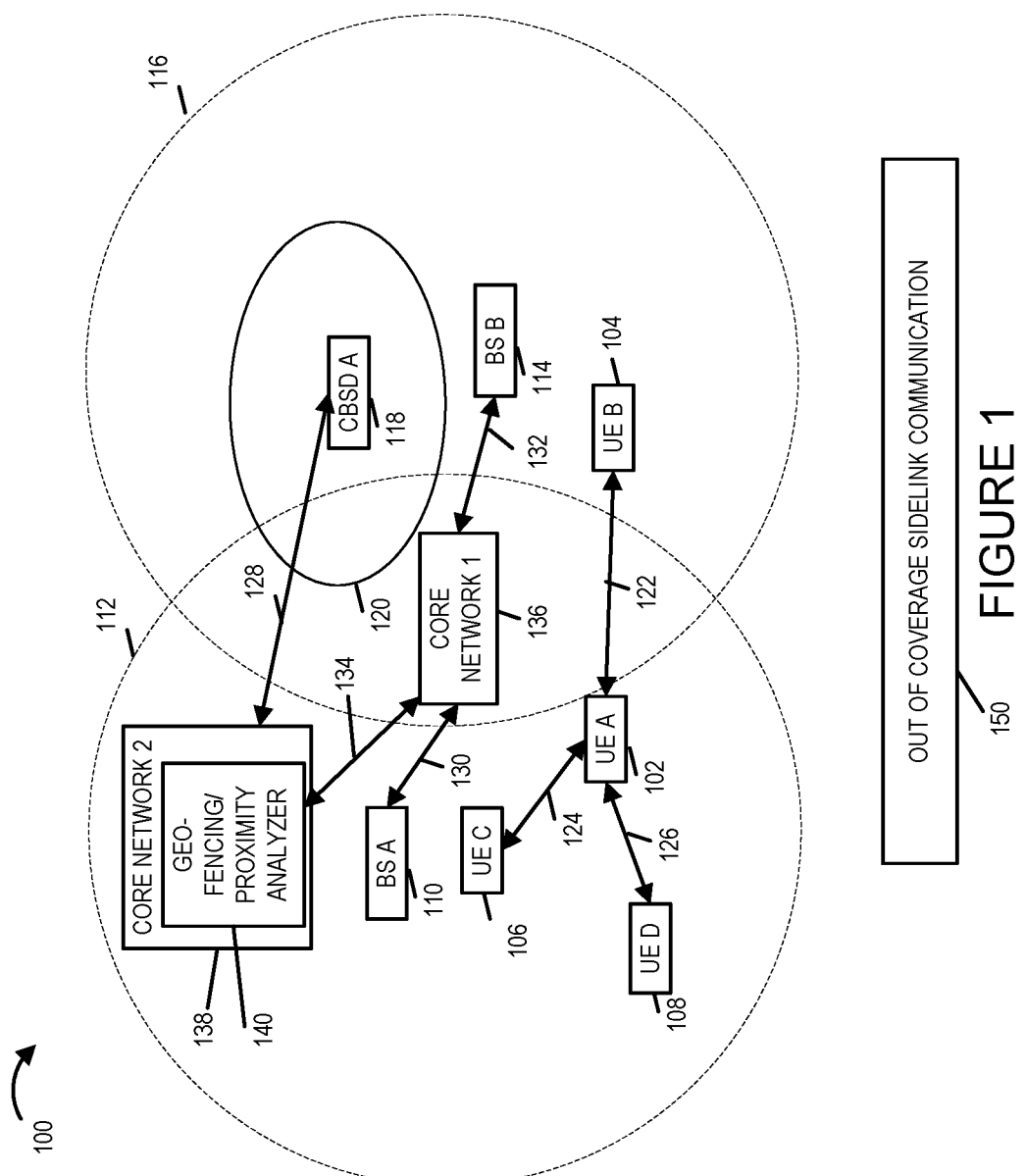
FIG. 1 illustrates user equipment devices (e.g., mobile devices) implementing out of coverage sidelink communications in a wireless system in accordance with an embodiment of the present invention.

FIG. 1 illustrates elements of a wireless system 100 in which out of coverage sidelink communications are implemented in accordance with an embodiment of the present invention. The label 150 indicates that FIG. 1 illustrates out of coverage sidelink communications. System 100 includes a first wireless network operated by a first wireless network operator and a second wireless network operated by a second wireless network operator. The first wireless network of the system 100 includes a core network 1 136 and a plurality of wireless base stations including wireless base station A (BS A) 110 and wireless base station B (BS B) 114. The base station A 110 is connected to the core network 1 136 via communications link 130. The base station B 114 is connected to the core network 1 136 via communications link 132. The first wireless network operator is a mobile network operator (e.g., Verizon). The second wireless network of the system 100 is a Citizens Broadband Radio Service network which operates in the 150 MHz of spectrum (from 3.55 to 3.7 GHz) in the 3.5 GHz band ("Band 48") and includes one or more wireless base stations referred to as Citizens Broadband Radio Service Devices (CBSDs). CBSD A 118 being one of the one or more CBSDs of the second wireless network. The CBSD A 118 is connected to a core network 2 138 of the second wireless network via communications link 128. The second wireless operator in this example being a Hybrid Mobile Network Operator (e.g., Charter Communications) which operates a CBRS wireless network and also operates as a Mobile Virtual Network Operator via an agreement with the first wireless network operator. The second network operator may also operate a cable network. The cable network in some embodiments being used to connect the base stations of the second wireless network to the core network 2 138 of the second wireless network. The network core 2 138 of the second wireless network includes a Geo-fencing/Proximity Analyzer 140 which as will be described in further detail below makes determinations as to whether or not user equipment devices of the second wireless network which are out of the coverage area of the second wireless network (e.g., out of the coverage area 120 of CBSD A 118) but within the coverage area of the first wireless network (e.g., coverage areas 112 and/or coverage area 116) are to utilize sidelink communications using CBRS spectrum when requesting establishment of a communications session (e.g., a data session).

The CBSD A 118 of the second wireless network has a wireless coverage area 120 on which the user equipment devices UE A 102, UE B 104, UE C 106, and UE D 108 of the second wireless network can communicate via CBSD A 118. The CBSD A 118 providing wireless services to its subscriber devices via CBRS spectrum. The UE A 102, UE B 104, UE C 106 and UE D 108 being dual SIM dual subscriber devices of the second wireless network with a first SIM card having credentials to operate on the first wireless network and a second SIM card having credentials to operate on the second wireless network. The UE A 102, UE B 104, UE C 106 and UE D 108 also having receiving and transmitting circuitry allowing each device to wirelessly communicate using first spectrum utilized by the first wireless network (e.g., cellular spectrum owned or licensed by the first wireless network operator) and second spectrum (e.g., CBRS spectrum such as PAL or GAA spectrum utilized by the second wireless network operator).

The first and second wireless network operators having entered into an agreement wherein the user equipment devices which are subscribers of the second wireless network (e.g., Charter Communications) can operator on the first wireless network (e.g., Verizon) when outside the coverage area of the second wireless network but within the coverage area of the first wireless network. The base station A 110 of the first wireless network has a coverage area 112 and base station B of the first wireless network has a coverage area 116.

The second wireless network has its own CBRS wireless network operating using CBRS spectrum as well as being a Mobile Virtual Network Operator operating using the first wireless network (e.g., Verizon's wireless network) which is a cellular network and utilizes cellular spectrum owned or licensed by the first wireless network operator. As previously explained the user equipment devices of the second wireless network are Dual Subscriber Identity Module (SIM) Dual Subscription (DSDS) devices which allow them to connect to base stations of both the first and the second wireless networks. This dual connectivity is implemented/managed by a connection manager component on each of the end user devices (e.g., user equipment devices) belonging to the second wireless network. However, the second wireless network operator must pay the first wireless operator for use of its network and spectrum. The main purpose of the second wireless network which may be described as Hybrid Mobile Network Operator network is to offload traffic from the first wireless network so as to minimize payments by the second mobile network operator to the first mobile network operator. The dual connectivity functionality of the user equipment devices can be used to facilitate or implement out of coverage sidelink communications between the user equipment devices using the CBRS spectrum (e.g., CBRS frequency bands) and therefore provide a means to offload traffic from the first wireless network when user equipment devices of the second wireless network are out of coverage of the second network (e.g., HMNO network). When the user equipment devices of the second wireless network are outside of the coverage area of the second wireless network but within the coverage area of the first wireless network they will typically utilize the first wireless network spectrum for communications. However, in the system 100 under certain conditions, the user equipment devices of the second wireless network (UE A 102, UE B 104, UE C 106 and UE D 108) implement sidelink communications using the CBRS spectrum of the second wireless network to communicate with one another when outside the coverage area 120 of CBSD A 118 but within the coverage area 112 of BS A 110 and/or the coverage area 116 of BS B 114 (i.e., the coverage area of the first wireless network). In the example shown, UE A 102 is wirelessly connected to UE B 104 via wireless communications sidelink 122. UE A 102 is wirelessly connected to UE C 106 via wireless communications sidelink 124. UE A 102 is wirelessly connected to UE D 108 via wireless communications sidelink 126. Each of the wireless communications sidelinks 122, 124 and 126 use wireless resources (e.g., CBRS spectrum (PAL or GAA spectrum) used by the second wireless network instead of wireless resources of the first wireless network to communicate with each other. The specific wireless resources (e.g., CBRS spectrum) being assigned or allocated to the UE devices for the sidelink communications being communicated to the UE devices via the first wireless network. For example, the CBRS spectrum to be used for sidelink 124 being provided to UE A 102 and UE C 106 via base station A 110 using spectrum of the first wireless network. The CBRS spectrum to be used for sidelink 126 being provided to UE A 102 and UE D 108 via base station A 110 using spectrum of the first wireless network. The CBRS spectrum to be used for sidelink 122 being communicated to the UE A 102 via base station A 110 using spectrum of the first wireless network and the CBRS spectrum for sidelink 122 being communicated to the UE B 104 via base station B 114. The decision of whether or not to implement sidelink communications for a communications session between one or more user equipment devices which are out of the coverage area of the second wireless network but within the coverage area of the first wireless network is determined by a Geo-Fencing/Proximity Analyzer of the second wireless network which is included in or attached to a core network of the second wireless network. The decision is based on one or more of the following: (i) the UE capabilities of each UE which is to be part of the session, (ii) the distance the UEs of the session are from one another or the location of the UEs which are to be on the session, (iii) the distance the UEs are from the coverage area of the second network, (iv) whether the sidelink would interfere with the communications within coverage area of the second network (e.g., within the coverage area 120), the session type (e.g., real time communications session or a non-real time data session (e.g., data transfer session from a sensor UE device). For example, when the session type is a real time communications session the decision may be to not use sidelink communications as the sidelink may not be able to provide adequate quality of services whereas when the session type is non-real time data session the decision may be to use sidelink communications as the sidelink is able to provide an adequate quality of service for data session such as data transfer session. The communications links 128, 130, 132, and 134 are typically wire cable or fiber communications links which provide high speed communications between each of the base stations and their respective core network and between the core network 1 136 and core network 2 138.

Figure 2:
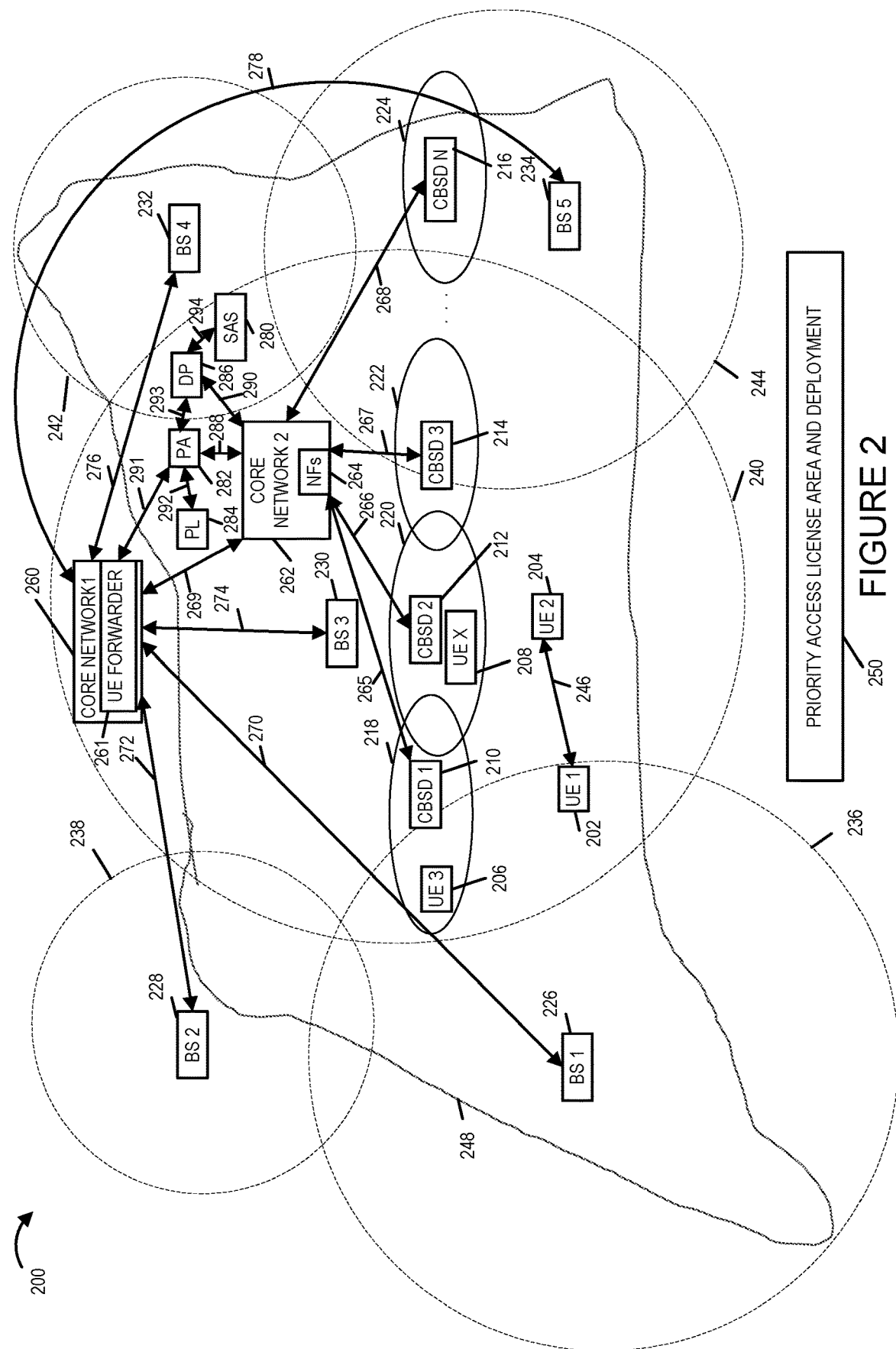
FIG. 2 illustrates another exemplary system in accordance with an embodiment of the present invention.

FIG. 2 illustrates an exemplary system 200 in accordance with an embodiment of the present invention. System 200 includes a first wireless network operated by a first wireless network operator (e.g., a Mobile Network Operator such as for example Verizon) and a second wireless network operated by a second wireless network operator (e.g., a Hybrid Mobile Network Operator such as for example Charter Communications).

The first wireless network and the second wireless network in some embodiments are 4G or 5G wireless networks. The first wireless network including a plurality of base stations (BS 1 226, BS 2 228, BS 3 230, BS 4 232, and BS 5 234) which are coupled and/or connected to a core network 1 260 (e.g., a 5G core network). The first wireless network includes communications links 270, 272, 274, 276, and 278 which couple/connect BS 1 226, BS 2 228, BS 3 230, BS 4 232, and BS 5 234 respectively to core network 1 260 of the first wireless network. The communications links 270, 272, 274, 276, and 278 are typically high speed wired, fiber and/or optical communications links but can also be wireless links. The plurality of base stations of the first wireless network work at using a first set of spectrum (e.g., licensed spectrum frequency bands). In this example, the first wireless network is a cellular network. The first wireless network operator which operates the first wireless network is a Mobile Network Operator that has entered into an agreement with the second wireless network operator to provide wireless services to user equipment devices of the second wireless network. The second wireless network pays for wireless services provided by the first wireless network to the subscribers of the second wireless network.

The second wireless network includes a plurality of base stations which operate using a second set of spectrum (e.g., frequency bands) which is different than the first set of spectrum. In this example, the second wireless network is CBRS network. The second wireless network having licensed CBRS Priority Access Licensed spectrum in a first area 248 (e.g., a county of the United States). The first area 248 corresponding to the county in which the CBRS PAL spectrum is licensed by the second wireless network operator. The plurality of base stations of the second wireless network including CBSD 1 210, CBSD 2 212, CBSD 3, 214, . . . , CBDS N 216, where N is an integer greater than 3). The second wireless network base stations utilizing CBRS spectrum PAL and GAA frequency bands to communicate within the first area 248. Label 250 indicates that FIG. 2 shows priority access license area (i.e., first area 248) and deployment of the CBRS system (e.g., CBSDs of the second wireless network) in that area. The second wireless network also includes a core network 2 262 to which CBSD 1 210, CBSD 2 212, CBSD 3 214, . . . , CBSD N 216 are coupled and/or connected with communications links 265, 266, 267, . . . , 268 respectively. The communications links 265, 266, 267, . . . , 268 are typically high speed wired, optical or fiber optic cables but can also be wireless communications links. In some embodiments, the core network 1 260 of the first wireless network and the core network 2 262 of the second wireless network are coupled and/or connected with communications link 269 which is typically a high speed wired, optical or fiber optic cable but can also be a wireless communications link. In some embodiments, the first wireless network includes UE data forwarding function and/or node 261 which is coupled to and/or included in the core network 1 260. In some embodiments, the UE data forwarding function and/or node is a separate entity which is coupled and/or connected to the core network 1 260. The second wireless network further includes a sidelink proximity analyzer (PA) 282, a pathloss calculator (PL) 284, and an Operations Support Systems (OSS) including a Domain Proxy (OSS/Domain Proxy) (DP) 286. In some embodiments, the core network 2 262 includes network functions 264 which may and in some embodiments do include one or more of the following: (i) sidelink proximity analyzer, (ii) a pathloss calculator, and (iii) an OSS/Domain Proxy. In such embodiments, the core network 2 262 is connected to the SAS 280 via a communication link. However, as discussed above with respect to exemplary system 200 the sidelink proximity analyzer 282, the pathloss calculator 284 and the Operations Support Systems (OSS) including a Domain Proxy (OSS/Domain Proxy) 286 are entities implemented separately from the core network 262 but are coupled and/or connected to other functions in the core network 2 262. The core network 2 262 is coupled and/or connected to the OSS/Domain Proxy 286 via communication link 290. The OSS/Domain Proxy 286 is coupled and/or connected to the Spectrum Access System 280 via communications link 294. The core network 2 262 is coupled and/or connected to the sidelink proximity analyzer 282 via communications link 288. The sidelink proximity analyzer 282 is coupled and/or connected to the UE Data Forwarding function/node 261 sometimes referred to as UE Data Forwarder 261 of the core network 1 via communications link 291. The sidelink proximity analyzer 282 is coupled and/or connected to the pathloss calculator 284 via communications link 292. The sidelink proximity analyzer 282 is coupled and/or connected to the OSS/Proxy Domain 286 via communications link 293. The sidelink proximity analyzer is sometimes referred to herein as geo-fencing proximity analyzer. The communications links 288, 290, 291, 292, 293 and 294 are typically high speed wired, optical or fiber optic communications links.

The Spectrum Access System 280 is responsible for managing the allocation of CBRS spectrum (PAL and GAA spectrum) in the CBRS network including the first area 248 in which the second wireless network has one or more PAL spectrum licenses.

The second wireless network includes a plurality of user equipment devices (UE 1 202, UE 2 204, UE 3 206, . . . , UE X 208, where X is an integer greater than 3) are dual Subscriber Identity Module (SIM) dual subscription devices which can simultaneously connect to the first wireless network and the second wireless network have wireless interfaces (transmitters and receivers) that can communicate with the first wireless network using the first set of spectrum (e.g., cellular spectrum and the second wireless network using the second set of spectrum (e.g., CBRS PAL and GAA spectrum). One of the dual SIM cards includes subscription information/credentials for communicating with the first wireless network and the other of the dual SIM cards includes subscription information/credentials for communicating with the second wireless network. The second wireless network operator is operating as a Mobile Virtual Network Operator with respect to the services provided by the first wireless network to the user equipment devices of the second wireless network. The second wireless network CBSD 1 210 provides wireless services to user equipment devices of the second wireless network within its coverage area 218. The second wireless network CBSD 2 212 provides wireless services to user equipment devices of the second wireless network within its coverage area 220. The second wireless network CBSD 3 214 provides wireless services to user equipment devices of the second wireless network within its coverage area 222. The second wireless network CBSD N 216 provides wireless services to user equipment devices of the second wireless network within its coverage area 224. As a result, while the second wireless network has licensed CBRS spectrum (e.g., CBRS PAL spectrum) for the entire county shown as the first area 248, the second wireless network only has wireless coverage within the coverage areas 218, 220, 214, . . . , 224 which is less than the entire first area 248. Outside the coverage area provided by the CBSDs of the second wireless network, the UEs of the second wireless network receive wireless services via the base stations of the first wireless network. As shown in FIG. 2, the base stations of the first wireless network provide coverage for the entire entity (i.e., first area 248). BS 1 226 provides wireless services in coverage area 236. BS 2 228 provides wireless services in coverage area 238. BS 3 230 provides wireless coverage in coverage area 240. BS 4 232 provides wireless services in coverage area 242. BS 5 234 provides wireless services in coverage area 244. Each user equipment device of the second wireless network includes a connection manager component which manages the dual connectivity of the user equipment devices (e.g., coordination of messages with the two wireless networks to receive services and/or what spectrum/channels to utilize for communicating).

The second wireless network does not have full coverage in the first area 248 (i.e., the county). In some instances, this is because the second wireless network has been built to offload traffic from the first wireless network in high traffic areas only where it economical to makes infrastructure expenditures instead of paying the first wireless network to provide services to the second wireless network user equipment devices. For example, in high density areas such as in towns and/or cities of the first area 248 it will be cheaper or less expensive for the second wireless network to provide services via its own CBSD base stations as opposed to paying the first wireless network whereas in low density areas such as the countryside of the county or first area 248, it will not pay for the second wireless network operator to build out its wireless network and include additional base stations when the amount of traffic is low and there may be no return on investment. In other instances, the second wireless network operator may be gradually building out its wireless network and wants coverage for its user equipment devices while it is slowly extending its coverage area by building out its network. In some counties, the high density areas of the county are small areas and so there is a smaller opportunity to offload traffic (compared to a full blown offload for the entire county). And, the cost of deployment of base stations, e.g., CBSDs, to such low density traffic areas is not economically justified. In such low density areas where there is no coverage from the CBSDs, the CBRS network operator still owns CBRS PAL spectrum licenses and can also operate on GAA spectrum. In such areas, there is an opportunity to offload traffic by having the user equipment devices operate in sidelink mode of operation where two or more user equipment devices communicate directly with one another via sidelink communications using the CBRS PAL spectrum and/or GAA spectrum. The decision of whether or not sidelink communications is to be utilized for a session depends one or more factors including for example the location of the user equipment devices, the type and/or capabilities of the user equipment devices, the type of session, how far apart the devices are to one another, and whether the sidelink communications will cause interference with user equipment devices communicating with CBSDs in the coverage areas of the CBSDs.

With respect to system 200 of FIG. 2, the UE 3 is within the coverage area 218 of CBSD 1 210 and therefore would receive its wireless services via CBSD 1 210 of the second wireless network. The UE X 208 is within the coverage area 220 of CBSD 2 212 and therefore would receive its wireless services via CBSD 2 212 of the second wireless network. The UE 1 202 and UE 2 204 are outside the coverage areas of the second network which include coverage areas 218, 220, 222, . . . , 224. As a result, for a session to be established between UE 1 202 and UE 2 204, the session will be established and utilize spectrum or resources of the first wireless network or via out of coverage sidelink communications using spectrum or resources of the second wireless network (e.g., CBRS PAL or GAA spectrum). This will depend on various factors as described above.

UE 1 202 and UE 2 204 while outside the coverage area of the second wireless network are within the coverage area of the first wireless network. UE 1 202 being within the coverage area 236 of BS 1 226 and coverage area 240 of BS 3 230. UE 2 204 being within the coverage area of 240 of BS 3 230. As the result, UE 1 202 and UE 2 204 while not wirelessly connected to the second wireless network will be wirelessly connected to the first wireless network via first wireless base station(s) (e.g., via BS 3 230) using spectrum of the first wireless network. These connections with the first wireless network base station(s) are leveraged to obtain CBRS spectrum or channel(s) for the sidelink device to device communications in the out of coverage areas of the second wireless network. The UEs of the second wireless network report UE information (e.g., location information and ID information from which device type can be derived) to the base stations of the first wireless network. UE 1 202 and UE 2 204 report UE information including identification information and location information (e.g., GPS coordinates) to the base station 3 230. The base station 3 230 forwards this information to the core network 1 260. The UE data forwarding function/node 261 of the core network 1260 forwards the UE data including the location and ID information to the sidelink proximity analyzer 282.

The location of the user equipment devices is an important factor in determining whether or not to initiate a sidelink communications session or not because these devices will have to overcome pathloss which may vary based on various factors including terrain and morphology. If UE 1 202 and UE 2 204 are within a reasonable distance, the second core network 2 facilitates sidelink communications and thereby avoids using the first wireless network's resources for the sidelink communications session reducing and/or eliminating expenses of the second wireless network (i.e., payments to the first wireless network for use of resources (e.g., spectrum) to provide the session between UE 1 202 and UE 2 204. In this example, wireless communications link 246 is shown as sidelink communications link using CBRS PAL spectrum/channels of the second wireless network and/or CBRS GAA spectrum. The spectrum/channels used for the sidelink communications session being communicated from the second wireless core network 262 to the UE 1 202 and UE 2 204 via core network 1 260 and CBSD 2 212 over first wireless spectrum of the first wireless network.

Geo-fencing plays an important factor in determining the location of the UE(s), i.e., whether or note a UE is within the second wireless network's coverage area. This location information is used to determine if a pair (or set of user equipment devices of the second wireless network) wanting to communicate with each other should be directed to communicate using sidelink communications instead of resources of the first wireless network.

The location of the UE 1 202, UE 2 204, UE 3 206, UE X 208 is known to the first wireless network as each of these UEs are within the coverage area of first wireless network and with the dual SIM dual subscriber capabilities are connected to the first wireless network and can provide their GPS location information on an on-going basis. Alternatively, the first wireless network can determine location information for the UEs via triangulation. This location information can be collected by the base stations of the first wireless network and communicated to the geo-fencing proximity analyzer 282 of second wireless network via the core network 1 260 (e.g., UE Data Forwarding function/node 261). For example, the location information for UE 1 202 and UE 2 204 can be communicated to the geo-fencing proximity analyzer 282 either via communications link 291 or via the core network 2. When UE 1 202 or UE 2 204 initiates a request to establish a communications session between the two devices, the geo-fencing proximity analyzer 282 can receive a request (e.g., from a base station of the first wireless network such as BS 3 230 via the core network 1 260) to determine whether or not to utilize sidelink communications for the communications session. The geo-fencing proximity analyzer 282 can use the location information of the UE 1 202 and UE 2 204 to determine if UE 1 202 and UE 2 204 are outside the coverage area of the second wireless network but within the first area 248 (i.e., within the county) in which the second wireless network owns and/or licenses PAL spectrum. When this is the case, the next step is to determine UE 1 202 and UE 2 204's initial proximity to one another. That is are UE 1202 and UE 2 204 within a reasonable distance as determined by a policy of the second wireless network operator. This policy may be determined based on measurements and/or quality evaluations to determine a distance that provides a level of service (e.g., quality of service) deemed acceptable to subscribers. This determination may also be dependent on the type of session to be established and/or the type of devices and/or capabilities of the user equipment devices. Once it is determined that the distance between the UE 1 202 and UE 2 204 is within a threshold value, the geo-fencing proximity analyzer 282 will request the pathloss calculator 284 determine if sidelink communications is feasible including whether the amount of power needed to communicate is within or below a threshold amount and whether the sidelink communication will interfere with other UEs (e.g., UE 3 206 and UE X 208) within the coverage area of the second wireless network. If sidelink communications between UE 1 202 and UE 2 204 is possible without interfering with other second wireless network UEs within the coverage area of the second wireless network, it will be determined that: (i) CBRS PAL spectrum channel(s) or (ii) CBRS PAL+GAA spectrum channel(s) are to be assigned to be used for the sidelink communications. If the sidelink communications is not possible without interfering with UEs within the coverage area of the second wireless network, it is determined that CBRS GAA spectrum channel(s) are to be used for the sidelink communications. The CBRS channel(s) to be used for the sidelink communications between UE 1 202 and UE 2 204 is requested by the geo-fencing proximity analyzer 282 from SAS 280 via the OSS/Domain Proxy 286. The SAS 280 is contacted to obtain a temporary/short term channel for the sidelink communication. It should be noted that user equipment devices (e.g., mobile devices) do not need to be SAS controlled, but to identify a quality channel the second wireless network is operating on and reduce the chances of interference a channel(s) is obtained from the SAS 280. The CBRS channel is obtained via the OSS/Domain Proxy 286 by the OSS/domain proxy 286 sending a request for CBRS spectrum for a ghost CBSD (i.e., a fictious CBSD which does not exist). The OSS/Domain Proxy 286 emulates a non-existent or fictious CBSD requesting allocation of spectrum channel(s) and the SAS 280 identifies spectrum channels for the ghost CBSD and notifies the OSS/Domain Proxy 286. The OSS/Domain Proxy 286 in turn notifies the geo-fencing proximity analyzer 282 of the allocated CBRS spectrum channel(s).

Once the CBRS spectrum channel(s) (i.e., PAL channel(s), PAL channel(s)+GAA channel(s), or GAA channel(s), this information is forwarded to UE 1 202 and UE 2 204 along with transmission power information (e.g., power level for transmission). The transmission power information being provided by the pathloss calculator 284. The CBRS channel information and transmission power information is transmitted from the geo-fencing proximity analyzer 282 to the UE data forwarding function/node 261 of the core network 1 or to core network 1 2060 via core network 2 262. The core network 1 260 transmits it to the base station 3 230. The base station 3 230 transmits it over the wireless spectrum of the first wireless network to UE 1 202 and UE 2 204. The UE 1 202 and UE 2 204 then implement an out of coverage sidelink communications session using the identified CBRS spectrum. In this way the spectrum and resources of the first wireless network is not utilized for the communications session between UE 1 202 and UE 2 204. When the sidelink communications session between UE 1 202 and UE 2 204 is completed, the UE 1 202 and/or UE 2 204 notify the base station 3 230 via the spectrum of the first wireless network. The base station 3 230 then notifies the core network 1 260 that the sidelink communications session between UE 1 202 and UE 2 204 has terminated. The core network 1 260 either notifies the sidelink proximity analyzer 282 directly or via the core network 2 262 that the sidelink communications session between UE 1 202 and UE 2 204 has terminated. The sidelink proximity analyzer 282 in response to receiving the sidelink termination notification sends a message to the OSS/Domain Proxy 286 that the CBRS spectrum channels which had been allocated for the sidelink communications session between UE 1 202 and UE 2 204 should be released. The OSS/Domain Proxy 286 emulating the ghost CBSD notifies the SAS 280 to release the allocated CBRS spectrum channel(s). The OSS/Domain Proxy 286 also notifies the SAS 280 that the ghost CBSD is to be de-registered that is it is no longer active. In some embodiments, the OSS/Domain Proxy 286 just sends a de-registration message for the ghost CBSD, as the SAS 280 will release the CBRS spectrum assigned/allocated to the ghost CBSD when it de-registers the ghost CBSD.

If the sidelink proximity analyzer 282 and/or pathloss calculator 284 determined that a sidelink session was not appropriate (distance greater than a threshold value or power required not feasible) then the sidelink proximity analyzer 282 notifies the base station 3 230 via core network 1 260 that the communications session between UE 1 202 and UE 2 204 is to be implemented using the resources of first wireless network. The base station 3 230 then proceeds and establishes a normal session with communications for the session passing through the base station 3 230.

Figure 11:
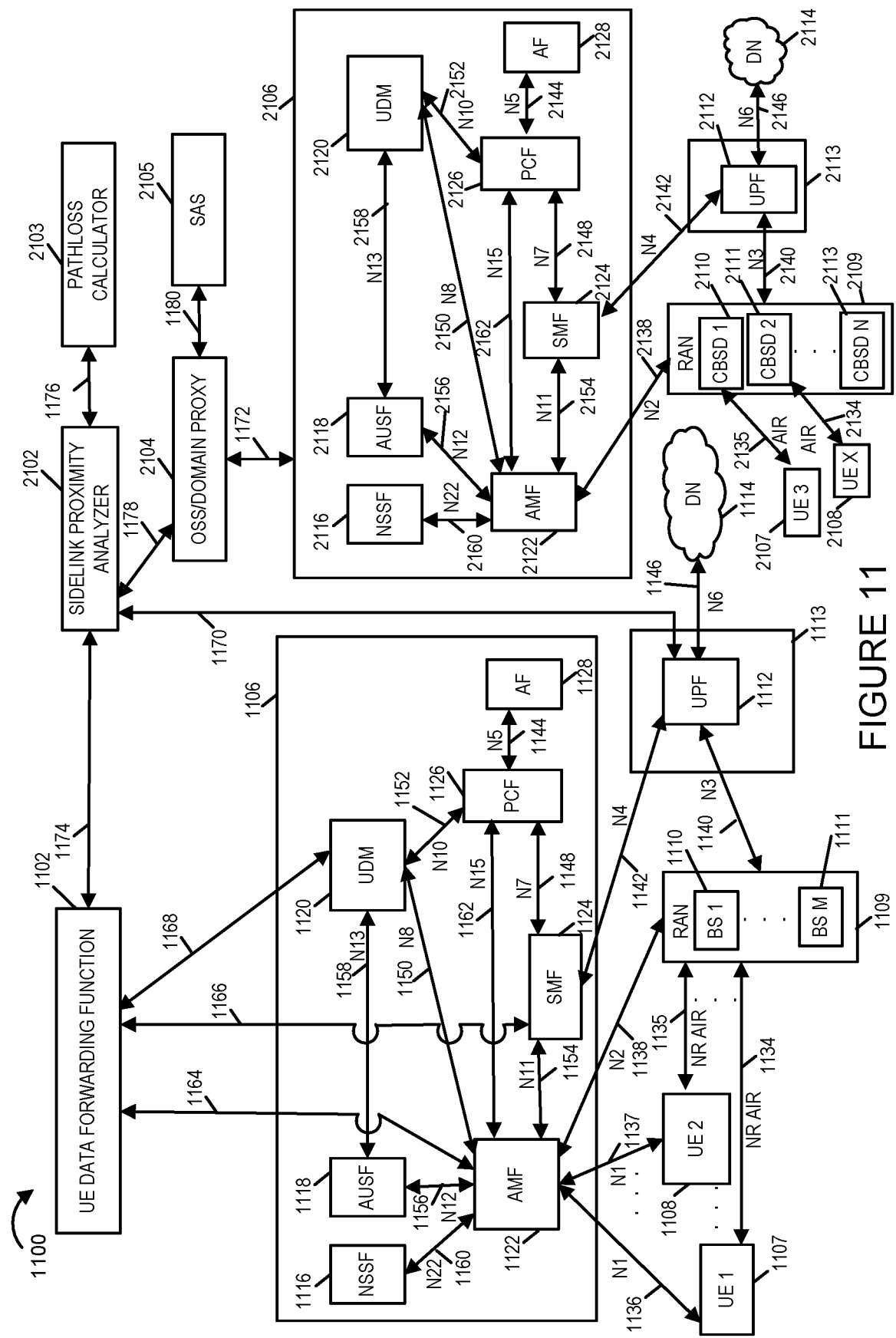
FIG. 11 illustrates an exemplary system that supports out of coverage sidelink communications in accordance with an embodiment of the present invention.

FIG. 11 illustrates an exemplary system 1100 implemented using 5G wireless technology in accordance with an embodiment of the present invention. The use of 5G technology in system 1100 is merely exemplary and for the sake of clarity in explaining the invention. It should be understood that the invention is not limited to 5G technology but may be, and in some embodiments is, implemented using other wireless technologies, e.g., 4G, LTE, etc. System 1100 includes a Spectrum Access System (SAS) 2105, a first wireless network and a second wireless network.

The first wireless network of the system 1100 includes a User Equipment (UE) data forwarding function node or device 1102, a first Radio Access Network (RAN) 1109 including a plurality of base stations (BS 1 1110, . . . , BS M 1111, M being an integer greater than 1), a first User Plane Function (UPF) 1112, a first Network Slice Selection Function (NSSF) 1116, a first Authentication Server Function (AUSF) 1118, a first Unified Data Management Function (UDM) 1120, a first Access and Mobility Management Function (AMF) 1122, a first Session Management Function (SMF) 1124, a first Policy Control Function (PCF) 1126, and a first Application Function (AF) 1128. The first wireless network includes a first core network which includes a first user plane 1113 which includes the UPF 1112 component and a control plane 1106 which includes the first NSSF 1116, first AUSF 1118, the first UDM 1120, the first AMF 1122, the first SMF 1124, the first PCF 1126, and first AF 1128 components. In some embodiments, the first core network also includes the UE Data Forwarding Function 1102 node or device.

The first user plane function (UPF) component 1112 of the first wireless network is coupled to a first Data Network (DN) 1114, e.g., the Internet. The base stations (e.g., BS 1 1110, . . . , BS M 1111) of the Radio Access Network 1109 may be, and in some embodiments are, gNodeBs. While the first wireless network includes user equipment devices (e.g., mobile devices) which can connect to the first RAN 1109 they are not shown in the system diagram 1100. The user equipment devices UE 1 1107, . . . , UE 2 1108, UE 3 2107 and UE 4 2108 shown in the system 1100 are part of the second wireless network. These user equipment devices are Dual SIM Dual Subscription user equipment devices, (e.g., wireless devices, mobile devices, smartphones, laptops, etc.) with the capability to connect to both the first and second wireless networks. UE 1 1107, . . . , UE 2 1108, UE 3 2107 and UE 4 2108 include a first SIM card with a first set of credentials which allow the UE to connect to and receive services from the first wireless network and a second SIM card with a second set of credentials which allow the UE to connect to and receive services from the second wireless network. The UEs have subscriptions for both the first and second wireless networks. The first wireless network providing wireless services to user equipment devices of the second wireless network when the UEs are outside the coverage area of the second wireless network (e.g., the second wireless network operator being a Hybrid Mobile Network Operator operating its own second wireless network while also operating as Mobile Virtual Network Operator for services provided to its user equipment device subscribers by the first wireless network.

The second wireless network of the system 1100 includes: a sidelink proximity analyzer 2102, a pathloss calculator 2103, an OSS/Domain Proxy 2104, a plurality of user equipment device (UE 1 1107, . . . , UE 2 1108, UE 3 2107, UE X 2108, a second Radio Access Network (RAN) 2109 including a plurality of base stations (CBSD 1 2110, CBSD 2 2111, . . . , CBSD N 2113, N being an integer greater than 2), a second User Plane Function (UPF) 2112, a second Network Slice Selection Function (NSSF) 2116, a second Authentication Server Function (AUSF) 2118, a second Unified Data Management Function (UDM) 2120, a second Access and Mobility Management Function (AMF) 2122, a second Session Management Function (SMF) 2124, a second Policy Control Function (PCF) 2126, and a second Application Function (AF) 2128. The second wireless network includes a second core network which includes a second user plane 2113 which includes the second UPF 2112 component and a control plane 2106 which includes the second NSSF 2116, the second AUSF 2118, the second UDM 2120, the second AMF 2122, the second SMF 2124, the second PCF 2126, and the second AF 2128 components. In some embodiments, one or more of the: sidelink proximity analyzer 2102, the pathloss calculator 2103, and the OSS/Domain Proxy 2104 are functions, nodes or devices of the second core network of the second wireless network. In some embodiments, the SAS 2105 is part of the second wireless network.

The second user plane function (UPF) component 2112 of the second wireless network is coupled to a second Data Network (DN) 2114, e.g., the Internet. The base stations (e.g., CSBD 1 2110, CBSD 2 2111, . . . , CBSD N 2113) of the second Radio Access Network 2109 may be, and in some embodiments are, gNodeBs implemented as CBRS CBSD base stations.

The first RAN 1109 and second RAN 2109 operate using different resources, e.g., different spectrum. In some embodiments, the first RAN 1109 is a cellular network (e.g., Verizon cellular wireless network) and the second RAN 2109 is a CBRS radio access network (e.g., Charter Communications CBRS network). The resources, e.g., spectrum, utilized by the base stations, e.g., CBSDs of the second wireless network, being controlled by Spectrum Access System 2105. The SAS 2105 allocating CBRS spectrum channels to the CBSDs in responses to requests from OSS/Domain Proxy 2104. The SAS 2105 as explained in further detail below also identifies and allocates CBRS spectrum channels to ghost or fictious CBSDs in response to requests from the OSS/Domain Proxy 2104. The CBRS spectrum allocated to the ghost or fictious CBSDs being used for sidelink communications sessions between user equipment devices which are out of the coverage area provided by the base stations of the second wireless network but within the coverage area of the first wireless network.

The user equipment devices UE 1 1107, . . . , UE 2 1108, UE 3 2107, and UE X 2108 may be, and in some embodiments are, 5G wireless devices such as for example 5G smartphones. It will be understood that the various functions of the system may be implemented in a variety of ways as components, servers, devices, nodes, etc. The components of the system 1100 are coupled and/or connected via communications links using various interfaces as shown in diagram 1110 including New Radio Air Interface 1134, New Radio Air Interface 1135, Air Interface 2134, Air Interface 2135, N1 interface 1136, N1 interface 1137, N2 interface 1138, N2 interface 2138, N3 interface 1140, N3 interface 2140, N4 interface 1142, N4 interface 2142, N5 interface 1144, N5 interface 2144, N7 interface 1148, N7 interface 2148, N8 interface 1150, N8 interface 2150, N10 interface 1152, N10 interface 2152, N11 interface 1154, N11 interface 2154, N12 interface 1156, N12 interface 2156, N13 1158, N13 interface 2158, N22 interface 1160, N22 interface 2160, N15 interface 1162, N15 interface 2162 so that they can exchange information, data, and messages. UE 1 1107, . . . , UE 2 1108 utilize New Radio (NR) air interfaces 1134, . . . , 1135 to communicate with the base stations of the first Radio Access Network 1109. UE 3 2107, . . . , UE X 2108 utilize air interfaces 1135, . . . , 1134 to communicate with the base stations of the second Radio Access Network 2109. UE 1 1107 to UE 2 1108 utilize the N1 interfaces 1136, . . . , 1137 to communicate with the first AMF 1122. UE 3 2107 to UE X 2108 utilize N1 interfaces to communicate with the second AMF 2122. While only a few user equipment devices are illustrated as being connected to the base stations of the first Radio Access Network 1109 and the second Radio Access Network 2109 in practice a large plurality (e.g., thousands) of user equipment devices (e.g., mobile devices) may be, and in some embodiments are, connected to first RAN 1109 and the second RAN 2109. The first UPF 1112 utilizes the N6 1146 interface to communicate with the Data Network 1114. The second UPF 2112 utilizes the N6 2146 interface to communicate with the Data Network 2114.

The side-link proximity analyzer 2102 sometimes referred to as a geo-fencing/proximity analyzer is coupled to the first UPF 1112 of first core network of the first wireless network via communications link/interface 1170. The side-link proximity analyzer 2102 is coupled/connected to the UE Data Forwarding Function node/device 1102 of the first wireless network via communications link and/or interface 1174. The sidelink proximity analyzer 2102 being coupled and/or connected to the OSS/Domain Proxy 2104 via communication link and/or interface 1178. The sidelink proximity analyzer 2102 is coupled/connected to the pathloss calculator 2103 via communications link and/or interface 1176.

The UE data forwarding function node and/or device 1102 is coupled to the first core network. The UE data forwarding function node and/or device 1102 is coupled and/or connected to the first AMF 1122 via communications link and/or interface 1164. The UE data forwarding function node and/or device 1102 is coupled and/or connected to the first SMF 1124 via communications link and/or interface 1166. The UE data forwarding function node and/or device 1102 is coupled and/or connected to the first UDM 1120 via communications link and/or interface 1168.

The OSS/Domain Proxy 2104 is coupled and/or connected to the SAS 2105 via communications link and/or interface 1180. The OSS/Domain Proxy 2104 is coupled to the second core network of the second wireless network via communications link and/or interface 1172. The OSS/Domain Proxy 2104 communicates with the SAS 2105 on behalf of the CBSDs of the second wireless network (CBSD 1 2110, CBSD 2 2111, . . . , CBSD N 2113). The OSS/Domain Proxy 2104 includes a Certified Professional Installer tool (e.g., Spectra-Pro CPI tool) used to input selected parameters to the SAS 2105 for example for CBSD installation, deployment, removal and/or de-activation. The OSS/Domain Proxy 2104 communicates (e.g., exchanges messages) with the SAS 2105 to register CBSDs, make spectrum inquires for CBSDs, obtain spectrum grants for CBSDs, release spectrum grants of CSBDs, and de-register the CBSDs.

In addition, the OSS/Domain Proxy 2104 exchanges messages with the SAS 2105 for ghost CBSDs which do not exist for the purpose of obtaining spectrum grants for sidelink communications. The sidelink communication for example being between user equipment devices which are operating outside the coverage area of the second wireless network but within an area, e.g., a county, in which the second wireless network has licensed PAL spectrum. The OSS/Domain Proxy 2104 in response to receiving a request for spectrum for a sidelink communications session from the sidelink proximity analyzer 2102 emulates a CBSD to obtain the spectrum grant for the ghost or fictious CBSD from the SAS 2105 using UE information (e.g., location information of at least one of the UE endpoints of the sidelink session to be established) received with the request for spectrum for the sidelink communication session. The CBRS spectrum grant (e.g., PAL and/or GAA spectrum channel(s)) being spectrum on which the sidelink communications session can be established. The user equipment devices are not required to obtain CBRS spectrum grants for sidelink communications but doing so provides the advantage that the spectrum granted (e.g., PAL and/or GAA channel(s)) will have the least interference. That is the SAS 2105 will identify for the ghost CBSD CBRS channel(s) which have minimal interference from other devices (e.g., other CBSDs in the area).

The registration parameters for a ghost CBSD will be discussed in the context of a small cell ghost CBSD since the transmission power of user equipment devices, e.g., mobile devices, are very low. A Registration Request message object may, and in some embodiments does, include the following parameters: userid, fccid, callSign, cbsdSerialNumber, cbsdCategory, airinterface, measCapability, groupingParam, eirCapability, horizontalAccuracy, verticalAccuracy, latitude, longitude, height, heightType, indoorDeployment, antennaAzimuth, antennaDowntilt, antennaGain, antennaBeamwidth, antennaModel, vendor, cbsdModel, softwareVersion, hardwareVersion, firmwareVersion.

The following parameters are mandatory for CBSD registration with an SAS: userid, fccid, cbsdSerialNumber, cbsdCategory, airinterface, measCapability, latitude, longitude, height, heightType, indoorDeployment, antennaAzimuth, antennaDowntilt, antennaGain, antennaBeamwidth and therefore will be provided to the SAS 2105 when registering a ghost CBSD.

The parameters: userid, fccid, callSign, cbsdSerialNumber, cbsdCategory, airinterface, measCapability, and groupingParam are sent to the SAS 2105 by the OSS/Domain Proxy 2104 as part of a ghost CBSD registration request.

The parameters cbsdSerialNumber, eirCapability, horizontalAccuracy, verticalAccuracy, latitude, longitude, height, heightType, indoorDeployment, antennaAzimuth, antennaDowntilt, antennaGain, antennaBeamwidth, antennaModel are signed off and submitted to the SAS 2105 using the CPI tool included in the OSS/Domain Proxy 2104. The latitude, longitude, height, and antennaAzimuth parameters will vary by site and be based on UE information (e.g., UE 1 location and antenna information). The remainder of these parameters in various embodiments will remain the same for each small cell type and will be auto populated for each ghost CBSD.

The parameters: vendor, cbsdModel, softwareVersion, hardwareVersion, firmwareVersion are optional and may be left blank in the Registration Request message object. Optionally, these parameters can be supplied to the SAS 2105 via the CPI tool, e.g., as part of a predefined template for each small cell type (e.g., ghost CBSD).

The OSS/Domain Proxy 2104 after receiving the spectrum grant from the SAS 2105 for the ghost CBSD communicates the spectrum grant to the sidelink proximity analyzer 2102.

The communications links and interfaces shown in FIG. 11 are exemplary and the functions/components of the system 1100 may be, and in some embodiments are, coupled and/or connected using a different configuration and/or interfaces. A brief description of the various functions will now be provided.

The user equipment devices are 5G dual SIM dual subscription wireless devices which support the air interfaces used for the first wireless network and the second wireless network. The air interfaces for the first wireless network and the second wireless may be, and, in some embodiments are different. In some embodiments, the air interfaces for the first and second wireless networks is the same (e.g., new radio interface) but the resources (e.g., spectrum) is different. The first Access and Mobility Management Function (AMF) 1122 acts as a single entry point for UE connection for the first wireless network and based on the service requested by the UE selects the respective Session Management Function (SMF) 1124 for managing the user session. The first SMF 1124 in response to a request for a session from a UE of the second wireless network with another UE of the second wireless network may forward the request or information about the request to the UE Data forwarding function 1102 which may in turn forward it to the sidelink proximity analyzer 2102 for determination of whether a sidelink session between the UE devices should be implemented or the session should be implemented using the resources (e.g., spectrum) and base station(s) of the first wireless network. The first User Plane Function (UPF) 1112 transports the IP data traffic (user plane) between the User Equipment devices and the external first Data Network (DN) 1114. The first Authentication Server Function (AUSF) 1118 allows the first AMF 1122 to authenticate the UE and access services of the first 5G core network. The first Session Management Function (SMF) 1124, the first Policy Control Function (PCF) 1126 and first Unified Data Management Function (UDM) 1120 provide policy control for the first wireless network by implementing and applying policy decisions and accessing subscription information to control the behavior and operation of the first wireless network. The UE data forwarding function node and/or device 1102 is an edge node or device of the first wireless network and performs the operations of an intermediary between the first wireless network and the second wireless network by communicating messages, data and instructions between the two wireless networks. The UE data forwarding function 1102 receives and/or collects information such as UE identification information, UE type and/or capability information, UE location information, UE session request and termination information (e.g., UE identification and location information for UE endpoints of the session, session type information, session initiation information, session termination information) and forwards and/or communicates it to the second wireless network (e.g., the sidelink proximity analyzer 2102 of the second wireless network). The UE data forwarding function node and/or device 1102 also receives from the first wireless network (e.g., the sidelink proximity analyzer 2102) information and data for sidelink communications (e.g., determination whether or not a sidelink communications is to be implemented for a session between UE devices, sidelink resources (e.g., spectrum channel(s) to be utilized for sidelink communications, transmission power level instructions for sidelink communications) and forwards/communicates this information via the first wireless network core to the base stations of the first wireless network and/or UE devices to be acted upon. In various embodiments, the sidelink proximity analyzer 2102 transmits instructions to enable sidelink communications to the first UPF 1112 (e.g., sidelink channel(s) to be used and power instructions).

The pathloss calculator 2103 evaluates the pathloss between two user equipment device (e.g., two mobile devices such as smartphones) that are to communicate over a sidelink communications connection. The pathloss calculator 2103 receives, from the sidelink proximity analyzer 2102, the location of two user equipment devices (e.g., UE 1 1107 and UE 2 1108) and information from which device type and/or capabilities of the UEs (e.g., UE 1 1107 and UE 2 1108) can be determined. The pathloss calculator determines how far (i.e., the distance) the UEs can reach for the sidelink communications session based on and/or using the UE device type and/or capabilities and the location of the UEs (e.g., UE 1 1107 and UE 2 1108 for a sidelink session between UE 1 1107 and UE 2 1108). In some embodiments, the pathloss calculator 2103 uses one or more different propagation models in combination with digital terrain, morphologies, buildings and morphology height data in performing its evaluation and/or determination of how far a UE can communicate. In various embodiments, the expected frequency or a center frequency in the spectrum range is utilized (e.g., a frequency within the CBRS spectrum). In some embodiments, the pathloss calculator is a real-time advanced calculator that uses the above described digital data (e.g., heights, morphologies and buildings data) to make the evaluation in real-time while in some other embodiments, the pathloss calculator is not a real time pathloss calculator but instead makes the evaluations in advance for the most common UE device capabilities and locations and merely looks up the previously calculated answers. In some embodiments, the pathloss calculator is a free space pathloss calculator which is used to calculate the attenuation (reduction) of signal strength between the two UE antennas. The free space path loss calculation makes the assumption that the space between the two antennas of the UEs is an obstruction free, line-of-sight straight path through the air. An exemplary formula for calculating free space pathloss calculation (FSPL) is shown below.

$FSPL=20 \log 10(d)+20 \log 10(f)+20 \log 10(4\pi c)-G_t-G_r$, where d is the distance in meters, f is the frequency in Hz, $G_t$ is the transmitter gain in dB, $G_r$ is the receiver gain in dB, and c is the speed of light in meters/second.

In some embodiments, an empirical or deterministic formulae is used to determine the pathloss in a given morphology (e.g., using morphological models of terrains and/or global digital elevation models for terrain morphology analysis such as in mountain environments and/or with respect to structures such as buildings, walls, bridges, water towers, etc.).

The sidelink proximity analyzer 2102 receives information and requests (e.g., UE identification information, UE type information, session request information, UE location information, sidelink communications session determination requests, requests for identification of spectrum channel(s) to be used for sidelink communications sessions) from the first core network of the first wireless network (e.g., from the UE data forwarding function node and/or device 1102). Based on the received information (e.g., location information of the UE endpoints for which the sidelink communications session is to be established, capabilities and/or type of UE endpoints, and/or session type) and information received from the pathloss calculator 2103, the sidelink proximity analyzer 2102 determines whether or not a sidelink communications session is to be established. When a sidelink communications session is to be established, the sidelink proximity analyzer 2102 requests the OSS/Domain Proxy 2104 obtain a CBRS spectrum grant for the sidelink communications session. The request includes information, e.g., location information and UE capability information, that the OSS/Domain Proxy 2104 can utilize to emulate a CBSD which is being deployed (e.g., registering and obtaining a CBRS spectrum grant). This occurs by the OSS/Domain Proxy 2104 communicating with SAS 2105 on behalf of or as a ghost CBSD as explained above. Once the sidelink proximity analyzer 2102 is provided the CBRS granted spectrum it communicates the CBRS spectrum grant information (e.g., the CBRS channels to be used for the sidelink communications session) to the UE endpoint devices (e.g., UE 1 1107 and UE 2 1108) via the first wireless network (e.g., via base stations of the first wireless network over spectrum of the first wireless network).

Figure 12:
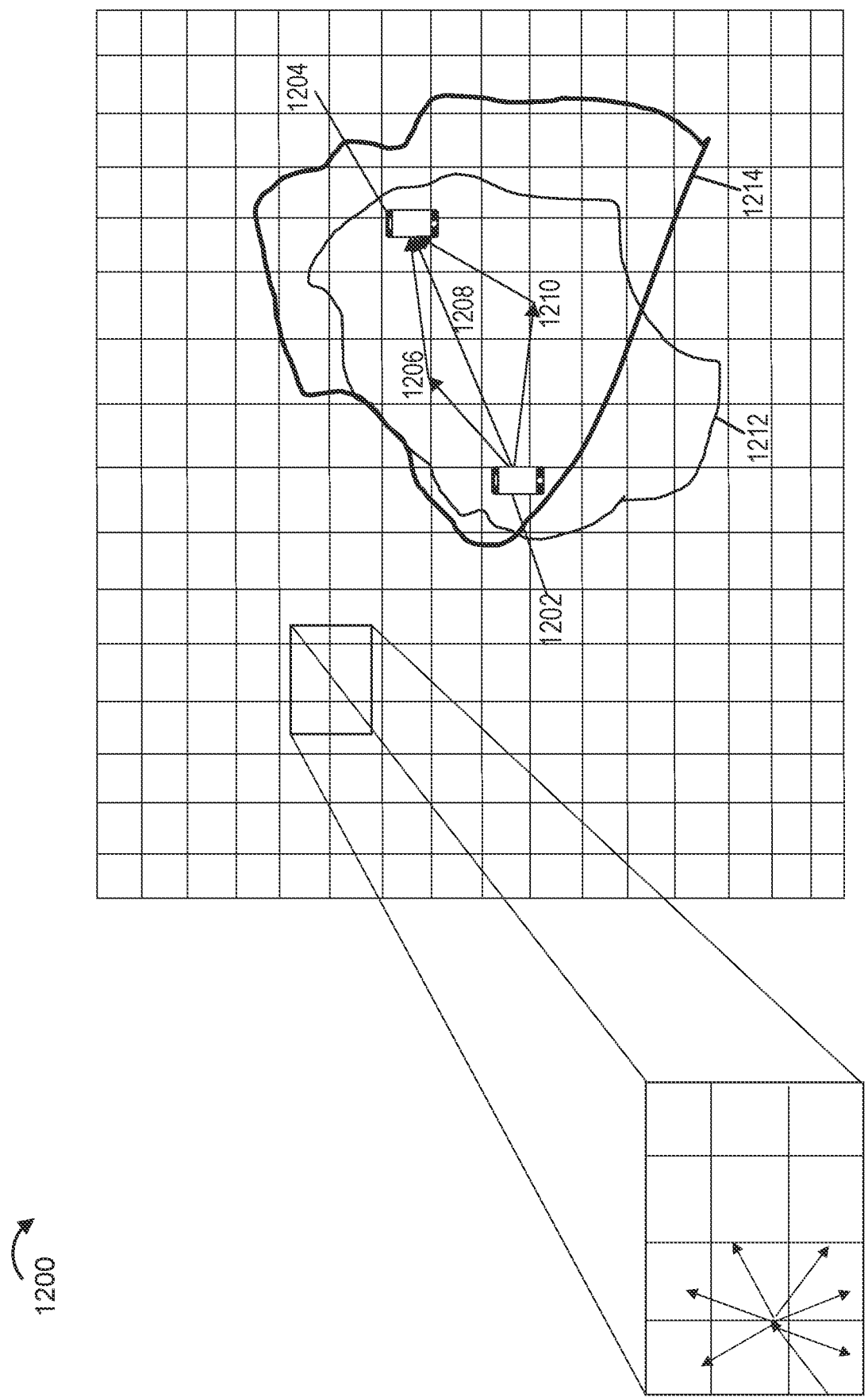
FIG. 12 illustrates pathloss calculation images showing different paths over which wireless signals can travel being evaluated during the determination of the pathloss for wireless (e.g., radio frequency) communications between two UE devices.

Diagram 1200 of FIG. 12 illustrates pathloss calculation images showing different paths over which wireless signals can travel being evaluated during the determination of the pathloss for wireless (e.g., radio frequency) communications between two UE devices. Pathloss calculations and path evaluations being performed by a pathloss calculator in accordance with an embodiment of the present invention. The diagram 1200 illustrates different paths 1206, 1208, and 1210 with different distances between UE 1 1202 and UE 2 1204 being considered while calculating the pathloss and transmission power required for a sidelink communications session between UE 1 1202 and UE 2 1204. The path 1208 is a free, line-of-sight straight path between UE 1 1202 and UE 2 1204. Whereas 1206 and 1208 are not direct line-of-sight straight paths between UE 1 1202 and UE 2 1204. Area 1212 indicates a first region within which UE 1 1202 and UE 2 1204 can communicate using sidelink communications based on a first propagation model (e.g., digital terrain model). Area 1214 indicates a second region within which UE 1 1202 and UE 2 1204 can communicate using sidelink communications based on a second propagation model.

In some embodiments, system 200 is implemented using the system architecture of system 1100. In some such embodiments, the UE 1 202 is UE 1 1107; UE 2 204 is UE 2 1108; UE 3 206 is UE 3 2107; UE X 208 is UE X 2108; CBSD 1 210 is CBSD 1 2110; CBSD 2 212 is CBSD 2 2111; CBSD N 216 is CBSD N 2113; BS 3 230 is BS 1 1110; BS 1 226, BS 2 228, BS 3 230, BS 4 232, BS 5 234 are base stations in the first RAN 1109; CBSD 1 210, CBSD 2 212, CBSD 3 214, . . . , CBSD N 216 are base stations in the second RAN 2109; UE Forwarder 261 is UE Data Forwarding Function 1102; core network 1 260 includes the components UE Data forwarding function 1102, first NSSF 1116, first AUSF 1118, first UDM 1120, first AMF 1122, first SMF 1124, first PCF 1126, first AF 1128, and first UPF 1112; sidelink proximity analyzer 282 is sidelink proximity analyzer 2102; OSS/Domain Proxy 286 is OSS/Domain Proxy 2104; Pathloss Calculator 284 is Pathloss Calculator 2103, SAS 280 is SAS 2105; core network 2 262 includes components second NSSF 2116, second AUSF 2118, second UDM 2120 second AMF 2122, second SMF 2124, second PCF 2126, second AF 2128, and second UPF 2112.

Figure 13:
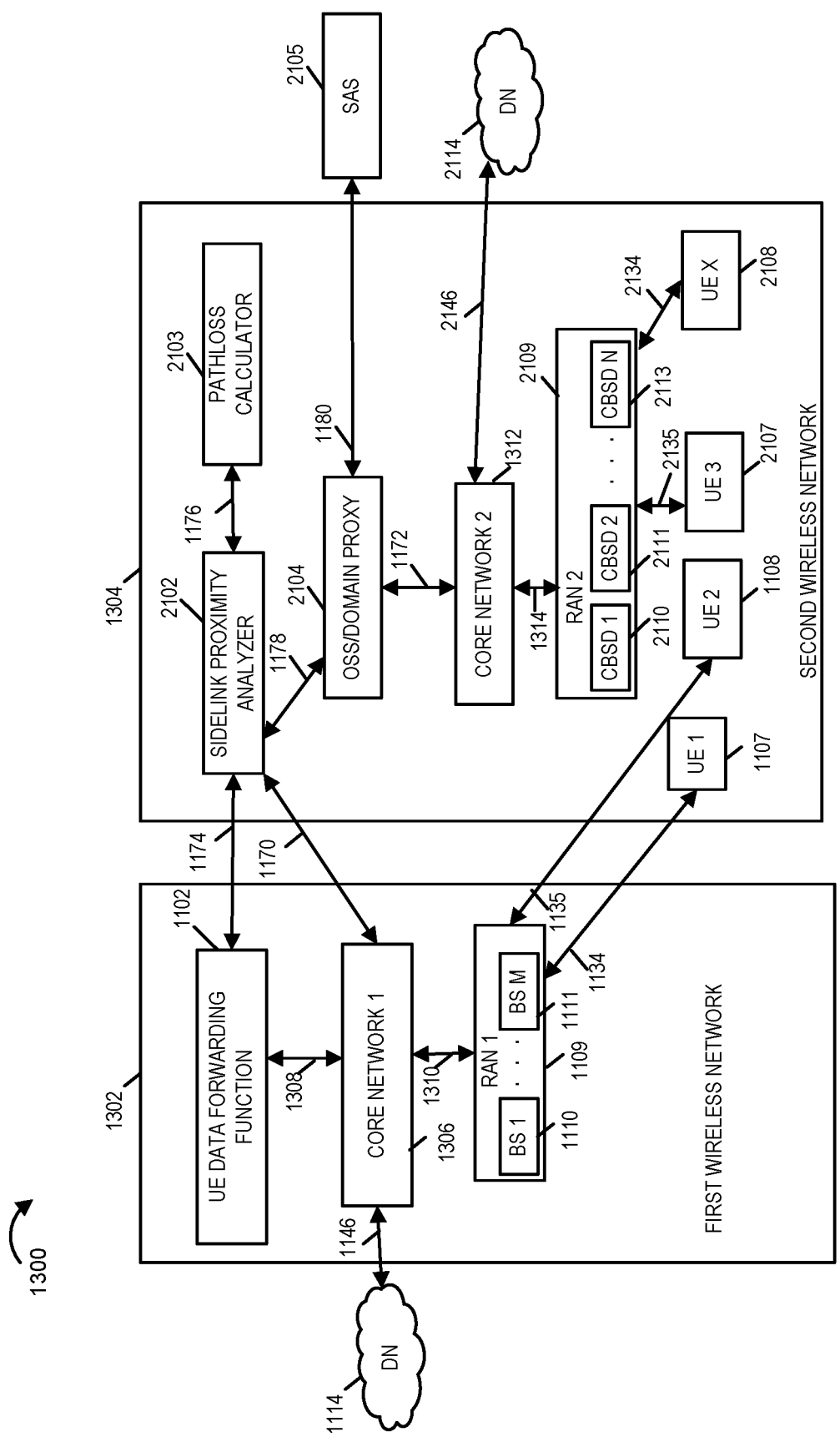
FIG. 13 illustrates an exemplary system in accordance with an embodiment of the present invention.
Figure 14:
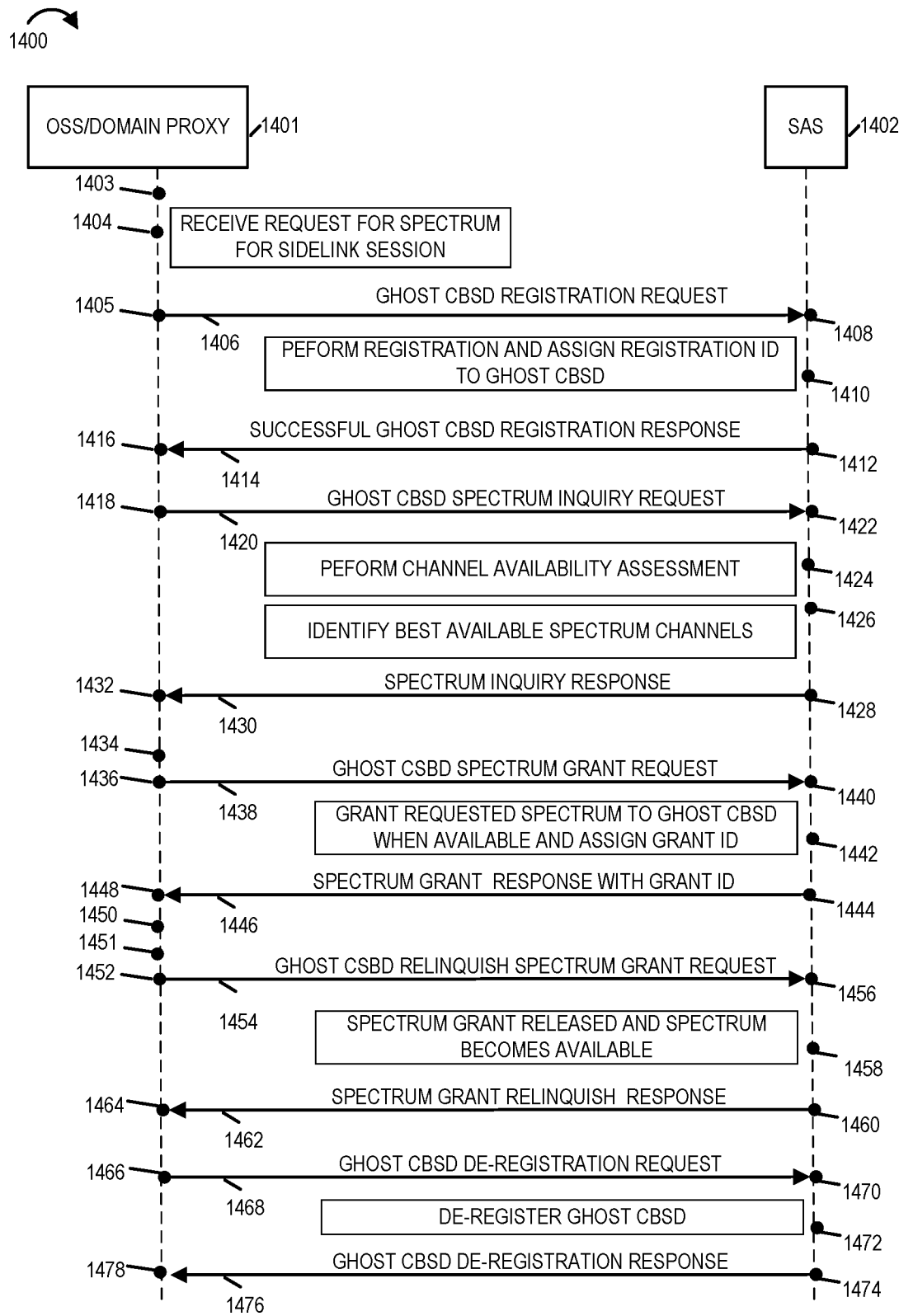
FIG. 14 illustrates a signaling diagram which illustrates the signaling and steps of obtaining a spectrum grant from a SAS for an out of coverage area sidelink communications session between user equipment devices.

FIG. 13 illustrates a system 1300 in accordance with an embodiment of the present invention. Elements or steps with the same reference numbers used in different figures are the same or similar and those elements or steps will not be described in detail again. System 1300 includes a first wireless network 1302 (e.g., cellular wireless network), a second wireless network 1304 (e.g., a CBRS wireless network), a Spectrum Access System (SAS) 2105, a first data network 1114, and a second data network 2114. In some embodiments, the SAS 2105 is part of the second wireless network such as described in connection with system 200. The first wireless network 1302 including broader coverage than the second wireless network 1304. The system 1300 being a Hybrid Mobile Network Operator system in which the second wireless network is owned and operated by a second wireless network operator and the second wireless network operator operates as a Mobile Virtual Network Operator with respect to services provided by the first wireless network to subscribers of the second wireless network as previously described in connection with system 200 and/or system 1100. The first wireless network operator for example being an MNO (e.g., Verizon) and the second wireless network being a HMNO (e.g., Charter Communications). The first and second wireless network operators having entered into an agreement wherein the first wireless network will provide wireless services to subscribers (e.g., user equipment devices) of the second wireless network for example when outside the second wireless network coverage area but within the first wireless network coverage area.

The first wireless network 1302 includes a core network 1 1306, a UE Data Forwarding Function 1102, a Radio Access Network (RAN) 1 1109. The second wireless network 1304 includes a sidelink proximity analyzer 2102, a pathloss calculator 2103, an OSS/Domain Proxy 2104, a core network 2 1312, a Radio Access Network (RAN) 2 2109, and a plurality of user equipment devices (UE 1 1107, UE 2 1108, UE 3 2107, UE X 2108). The user equipment devices are dual SIM dual subscription mobile devices with credentials and capability (e.g., wireless interfaces) for accessing the first wireless network 1302 and the second wireless network 1304. The core network 1 1306 is coupled and/or connected to first data network 1114 via communications link and/or interface 1146. The core network 1 1306 is coupled and/or connected to UE Data Forwarding function node and/or device 1102 via communications link 1308. The core network 1 1306 is coupled and/or connected to the RAN 1 via communications link 1310. The RAN 1 1109 includes base station 1 1110, . . . , BS M 1111. The core network 1 1306 is coupled and/or connected to sidelink proximity analyzer 2102 via communications link and/or interface 1170. The UE Data Forwarding Function node and/or device 1102 is coupled and/or connected to the sidelink proximity analyzer 2102 via communications link and/or interface 1174. The sidelink proximity analyzer 2102 is coupled and/or connected to the pathloss calculator 2103 via communications link and/or interface 1176. The sidelink proximity analyzer 2102 is coupled and/or connected to the OSS/Domain Proxy 2104 via communications link and/or interface 1178. The OSS/Domain Proxy 2104 is coupled and/or connected to the SAS 2105 via communications link and/or interface 1180. The OSS/Domain Proxy 1172 is coupled to and/or connected to the core network 2 1312 via communications link and/or interface 1172. The core network 2 1312 is coupled and/or connected to second data network 2114 via communications link and/or interface 2146. The core network 2 1312 is coupled and/or connected to the RAN 2 2109 via communications link and/or interface 1314. The RAN 2 2109 includes CBSD 1 2110, CBSD 2 2111, . . . , CBSD N 2113. UE 1 1107 is coupled and/or connected to the RAN 1 1109 via communications link 1134. UE 2 1108 is coupled and/or connected to the RAN 1 1109 via communications link 1135. UE 3 2107 is coupled and/or connected to the RAN 2 2109 via communications 2135. UE X is coupled and/or connected to RAN 2 2109 via communications link 2134.

In some embodiments, the first wireless network 1302 is the first wireless network of system 1100 and the second wireless network 1304 is the second wireless network of system 1100. In some such embodiments, the first wireless network and the second wireless network operators have entered into an agreement as described in connection with the system 1110 in which the user equipment devices of the second wireless network can receive services from the first wireless network. In some such embodiments, the core network 1 1306 is the first core network of the first wireless network in system 1100 and the core network 2 is the second core network of the second wireless network in system 1100.

In some embodiments, the communications link and/or interface 1308 represent a plurality of communications links and/or interfaces which couple and/or connect the first core network of the first wireless network of system 1100 with the UE data forwarding function node and/or device 1102. In some embodiments, the communications link and/or interface 1310 represent a plurality of communications links and/or interfaces which couple and/or connect the first core network of the first wireless network of system 1100 with the base stations of the RAN 1109. In some embodiments, the communications link and/or interface 1314 represent a plurality of communications links and/or interfaces which couple and/or connect the second core network of the second wireless network of system 1100 with the CBSDs of the RAN 2109. In some embodiments, the core network 1 1306 includes the following components from system 1100: the first UPF 1112, the first NSSF 1116, first AUSF 1118, the first UDM 1120, the first AMF 1122, the first SMF 1124, the first PCF 1126, and the first AF 1128 components. In some embodiments, the core network 2 1312 includes the following components from system 1100: second NSSF 2116, second AUSF 2118, second UDM 2120, second AMF 2122, second SMF 2124, second PCF 2126, second AF 2128, and second UPF 2112.

In some embodiments, one or more of the functions and/or devices of the first and/or second wireless network are implemented on one or more compute nodes in a cloud. For example, in some embodiments, the sidelink proximity analyzer 2102, pathloss calculator 2103, OSS/Domain Proxy 2104, UE data forwarding function node 11102 and elements of the core network are implemented on a separate compute node in a cloud.

Figure 10:
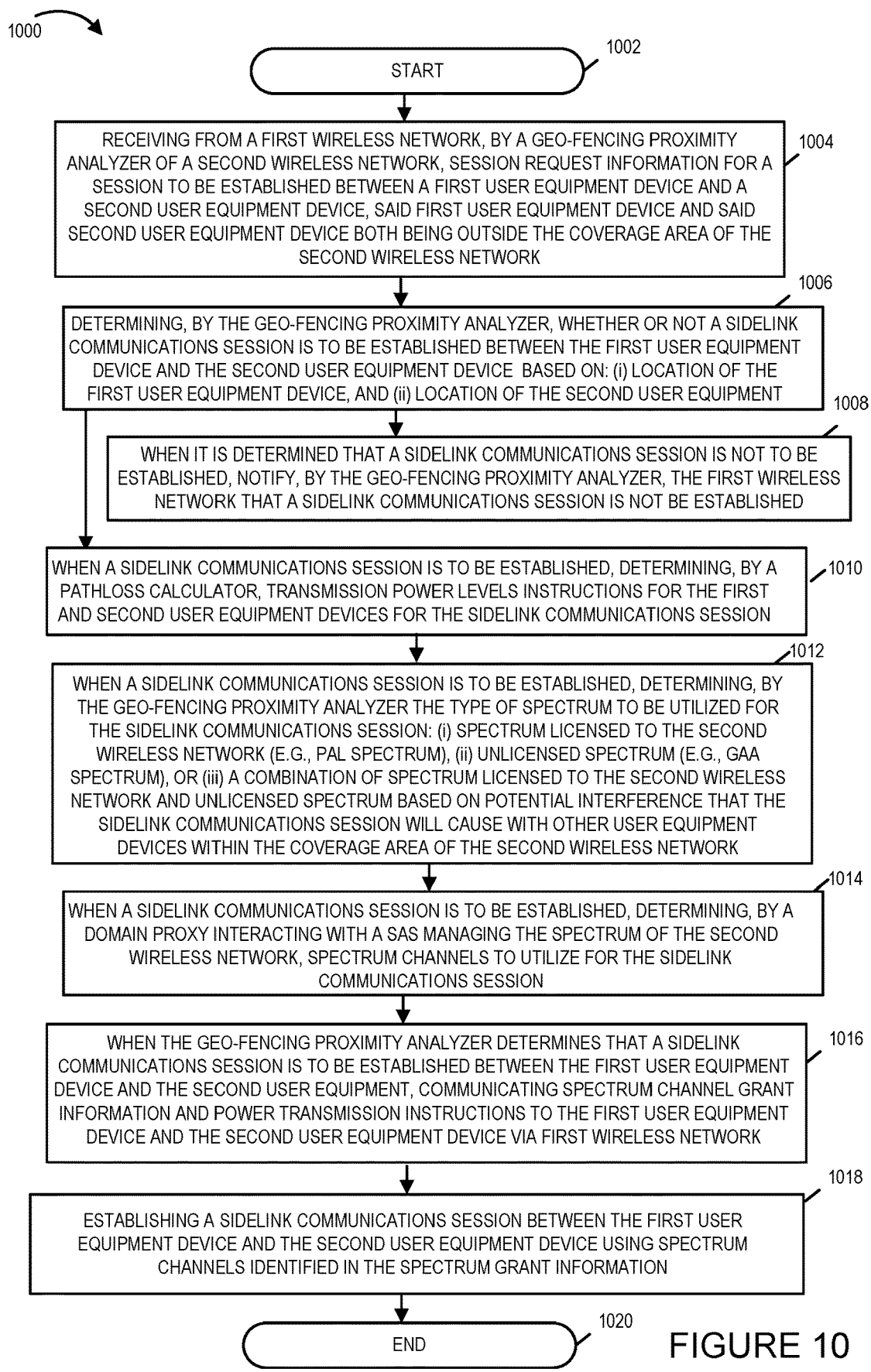
FIG. 10 illustrates a flowchart of an exemplary method in accordance with an embodiment of the present invention.

FIG. 10 illustrates a high level flowchart of an exemplary method 1000 in accordance with an embodiment of the present invention. While it will be readily understood that additional steps are performed in connection with communicating information, messages, and packets between devices, the method 1000 focuses on and discusses the steps for understanding the invention. The method 1000 will be discussed in connection with the exemplary system 200 but is not limited to being implemented on system 200 and can be implemented on other systems including by way of example the system 1100 of FIG. 11 and system 1300 of FIG. 13.

Method 1000 begins in start step 1002. Operation proceeds from step 1002 to step 1004. In step 1004, the geo-fencing proximity analyzer 208 of the second wireless network, receives from a first wireless network (e.g., core network 1 260) session request information for a session to be established between a first user equipment (UE 1 202) of the second wireless network and a second user equipment device (UE 2 204) of the second wireless network. The first user equipment device and the second user equipment device both being outside the coverage area of the second wireless network (e.g. outside second wireless network coverage areas 218, 220, 222, . . . , 224. In some embodiments, the session request information includes the location of the first and second user equipment devices (e.g., GPS coordinates reported to the first wireless network. In some embodiments, the user equipment devices of the second wireless network report location information on continuing scheduled basis to the geo-fencing proximity analyzer. Operation proceeds from step 1004 to step 1006.

In step 1006, the geo-fencing proximity analyzer 282, determines whether or not a sidelink communications session is to be established between the first user equipment device and the second user equipment device based on: (i) location of the first user equipment device, and (ii) location information of the second user equipment device. In some embodiments, the determination is further based on one or more of the following: the capabilities (e.g., transmission capabilities) of the first and/or second user equipment device, the device type of the first and/or second user equipment devices, the signal pathloss between the first and second user equipment devices, and the type of communications session (e.g., real time session or non-real time session). Operation proceeds from step 1006 to step 1008 when it is determined that a sidelink communications session is not to be implemented/established. In step 1008, when it is determined that a sidelink communications session is not to be established, the geo-fencing proximity analyzer 282 notifies the first wireless network (core network 1 260) that a sidelink communications session is not to be implemented. Operation proceeds from step 1006 to step 1010 when a sidelink communications session is to be implemented/established.

In step 1010, when a sidelink communications session is to be established, a pathloss calculator 284 of the second wireless network determines the transmission power level instructions for the first and second user equipment devices for the sidelink communication session (e.g., using the location of the first and second user equipment devices, transmission capabilities of the first and second user equipment device and one or more pathloss propagation models and/or formulae. In some embodiments, the pathloss propagation models using digital terrain information, geographical features, morphologies and building height information to determine the pathloss and transmission power level instructions. Operation proceeds from step 1010 to step 1012. In step 1012, when it is determined that a sidelink communications session is to be established, the geo-fencing proximity analyzer determines the type of spectrum to be utilized for the sidelink communication session from the following: (i) spectrum licensed to the second wireless network (e.g., PAL spectrum), (ii) unlicensed spectrum, and (iii) a combination of spectrum licensed to the second wireless network and unlicensed spectrum. The determination of the type of spectrum being based on the potential interference the sidelink communications session will cause with other user equipment devices within the coverage area of the second wireless network (e.g., UE 3 206 and UE X 208). In some embodiments, the geo-fencing proximity analyzer uses the location of the first and second user equipment device, location of the coverage areas of the second wireless network, and the power level instructions determined by the pathloss calculator to make the type of spectrum determination as such information can be utilized to determine potential interference with the other user equipment devices. Operation proceeds from step 1012 to step 1014. In step 1014, when it is determined that a sidelink communications session is to established, a Domain Proxy interacting (e.g., exchanging messages) with a Spectrum Access System (SAS) managing the spectrum of the second wireless network and other network sharing the spectrum of the second wireless network determines spectrum channels to utilize for the sidelink communications session. Operation proceeds from step 1014 to step 1016, when the geo-fencing proximity analyzer determines that a sidelink communications session is to be established between the first user equipment device and the second user equipment device, the geo-fencing proximity analyzer communicates to the first wireless network and/or the first and second user equipment devices an indication that the session to be established between the first user equipment device and the second user equipment device is to be implemented as a sidelink communications session. The geo-fencing proximity analyzer also communicates spectrum channel grant information (e.g., determined by the Domain Proxy) and power transmission level instructions (e.g., determined by the pathloss calculator) to the first user equipment device and the second user equipment device via the first wireless network (e.g., via core network 1 260, base station 3 230 and using the first wireless network spectrum). This information is indicated as being for the sidelink communications session. Operation proceeds from step 1016 to step 1018. In step 1018, the first and second user equipment device establish a sidelink communications session between each other using the spectrum channels identified in the spectrum channel grant information and information contained in the power transmission instructions. Operation proceeds from step 1018 to end step 1020 in which the method concludes. In various embodiments before the end step 1020, the first and second user equipment devices report when the sidelink communications session has terminated to the geo-fencing proximity analyzer via the first wireless network. The geo-fencing proximity analyzer then takes steps to relinquish or release the spectrum grants obtained for the sidelink communications session.

Figure 15A:
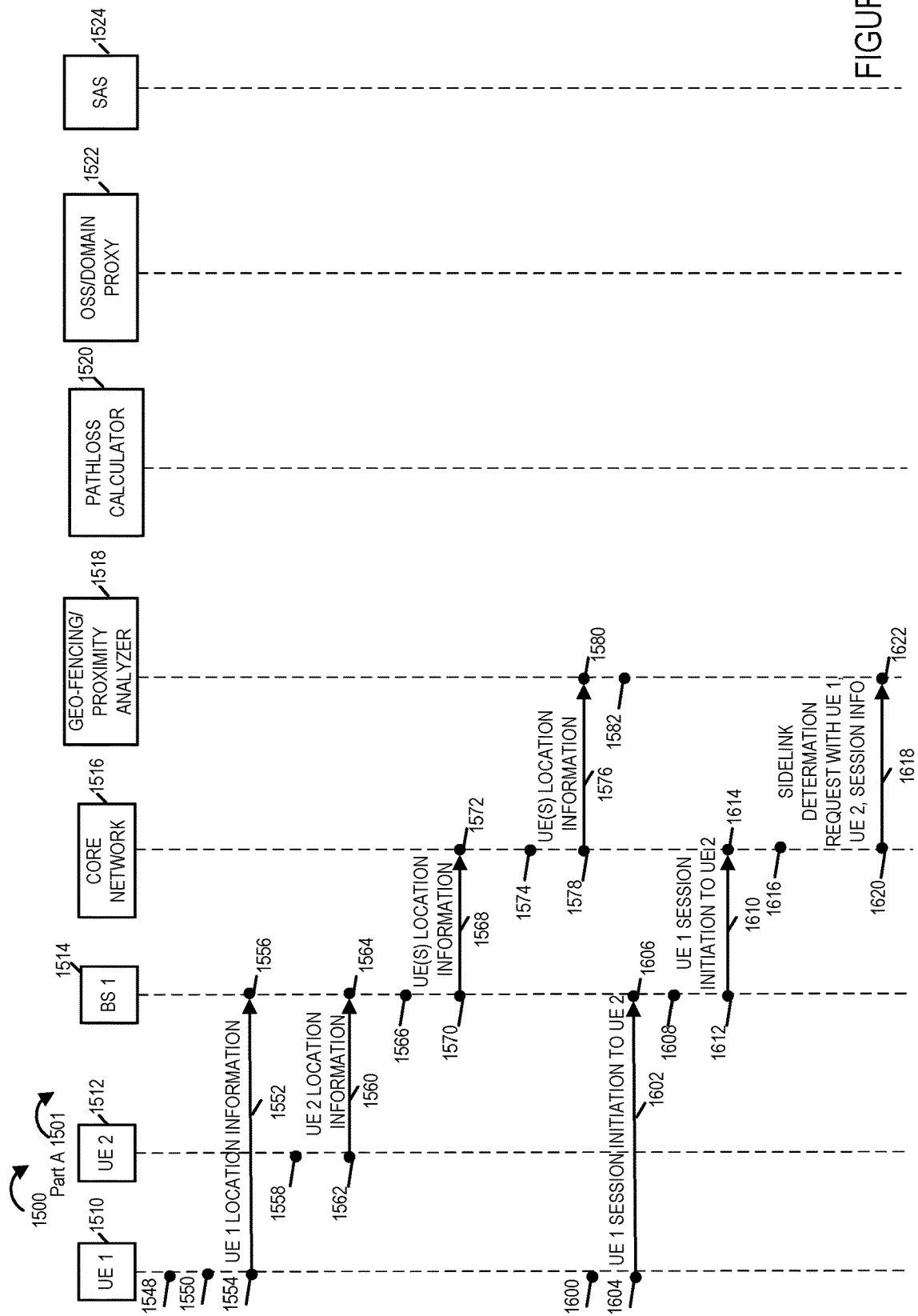
FIG. 15A is the first part of a signaling diagram which illustrates the steps and signaling of an exemplary method in accordance with an embodiment of the present invention.
Figure 15B:
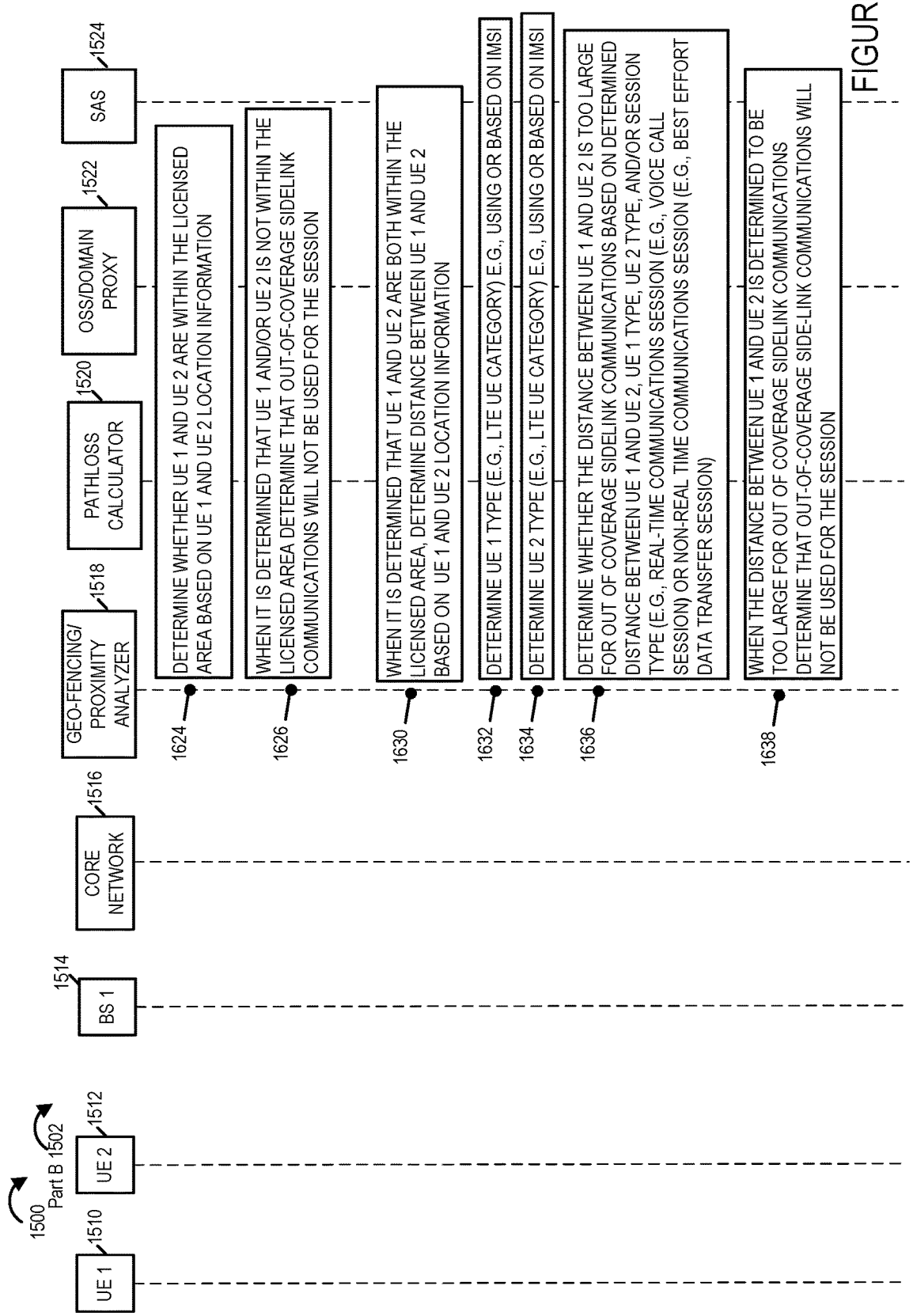
FIG. 15B is the second part of a signaling diagram which illustrates the steps and signaling of an exemplary method in accordance with an embodiment of the present invention.
Figure 15C:
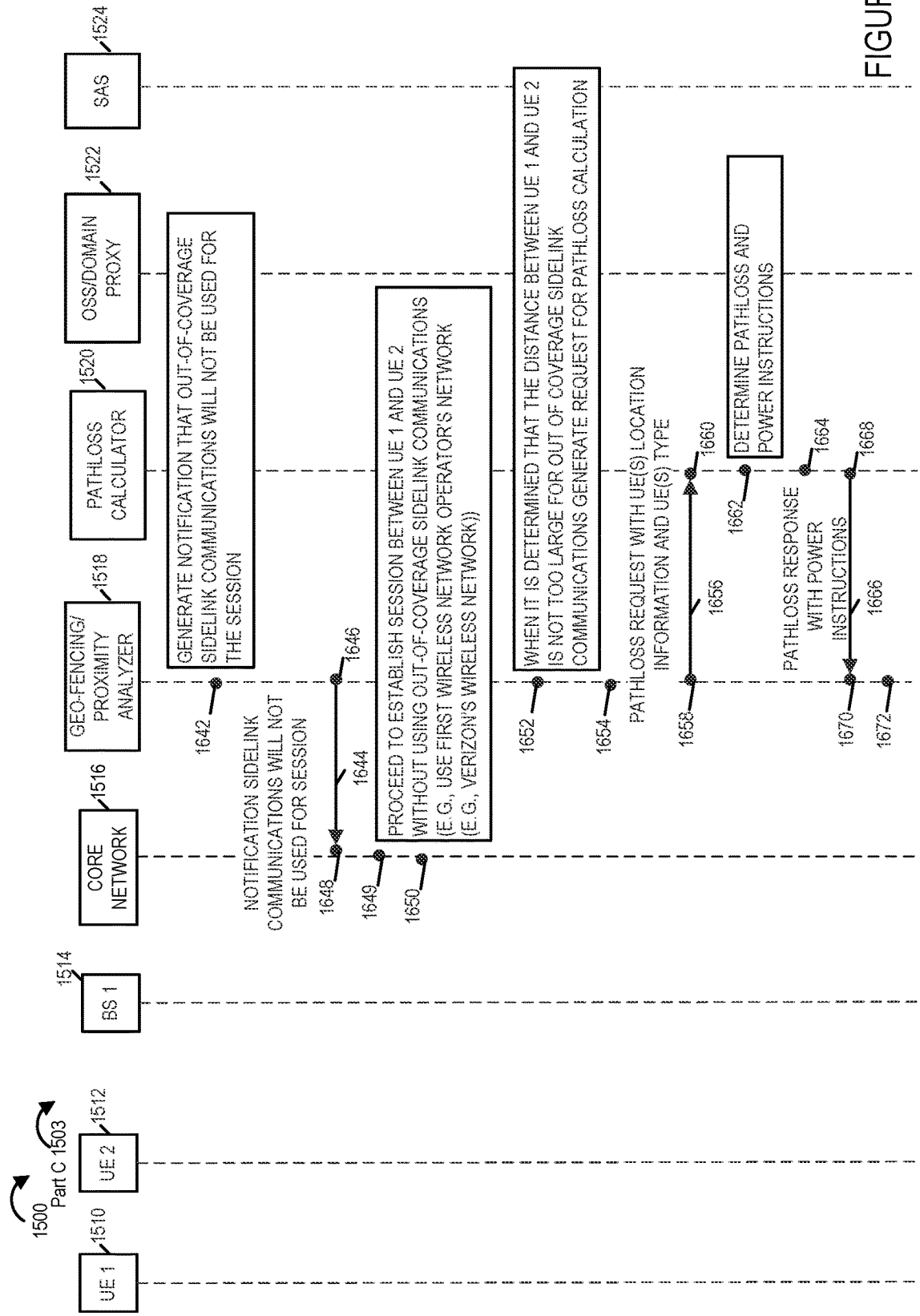
FIG. 15C is the third part of a signaling diagram which illustrates the steps and signaling of an exemplary method in accordance with an embodiment of the present invention.
Figure 15D:
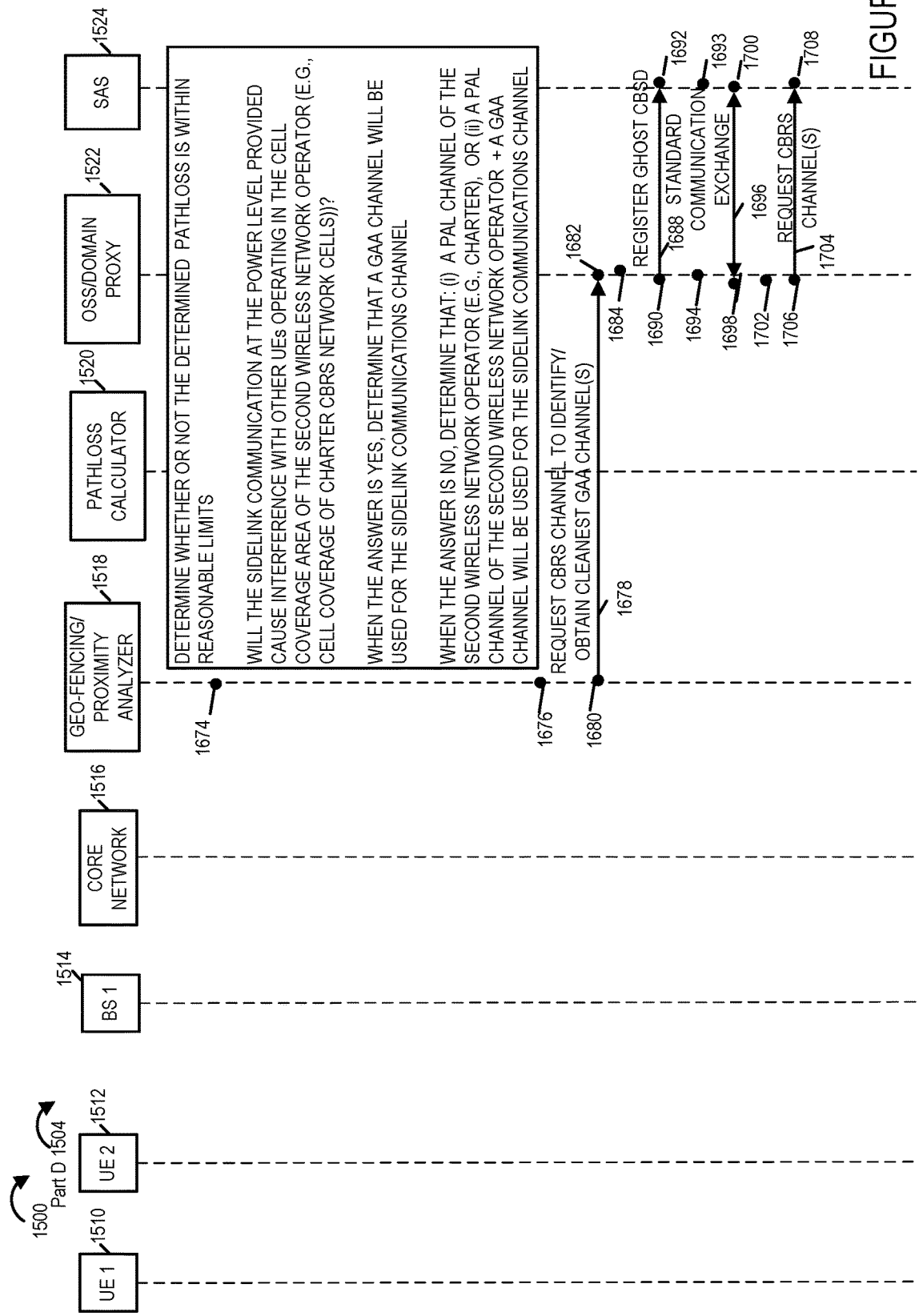
FIG. 15D is the fourth part of a signaling diagram which illustrates the steps and signaling of an exemplary method in accordance with an embodiment of the present invention.
Figure 15E:
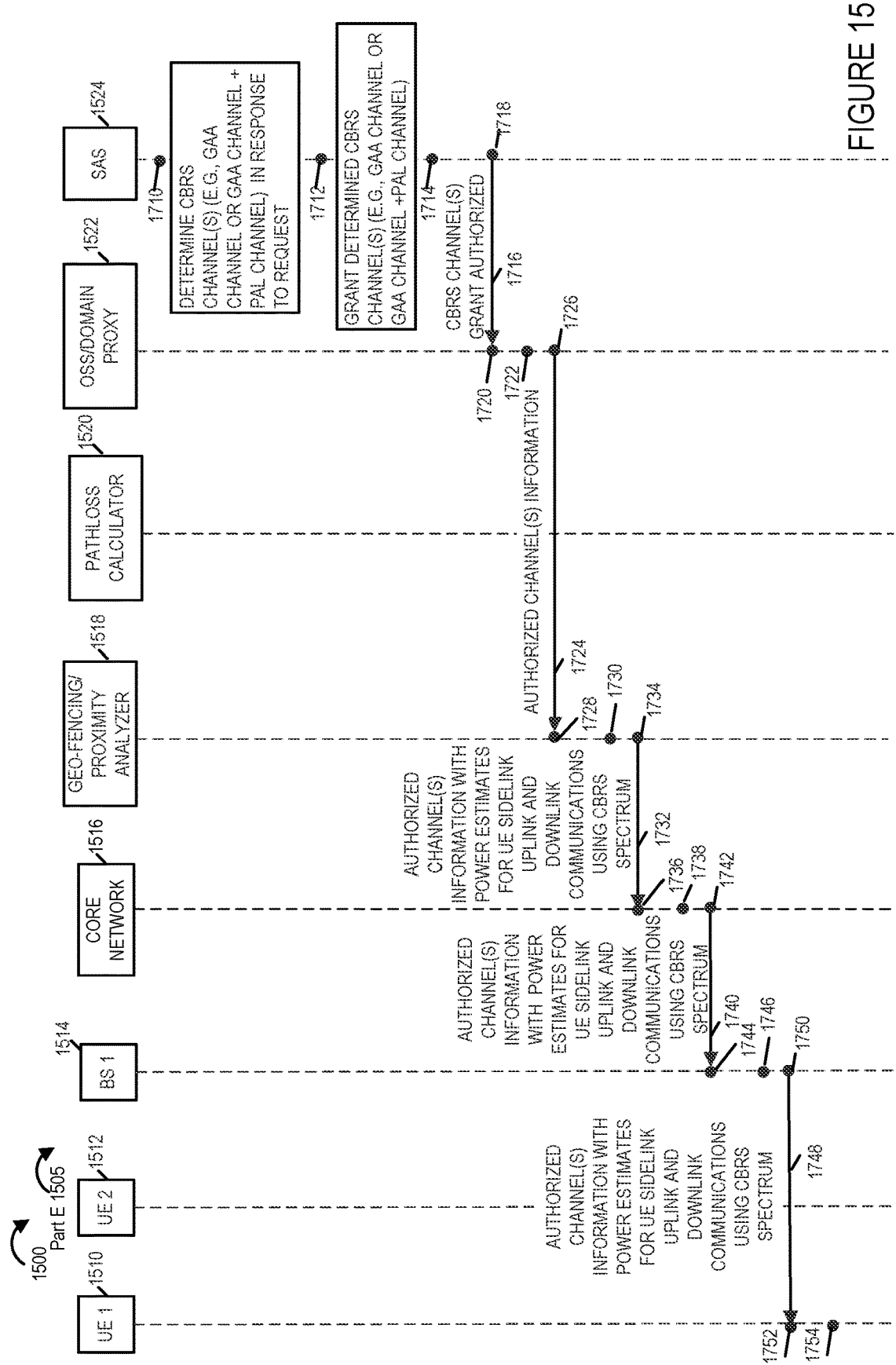
FIG. 15E is the fifth part of a signaling diagram which illustrates the steps and signaling of an exemplary method in accordance with an embodiment of the present invention.
Figure 15F:
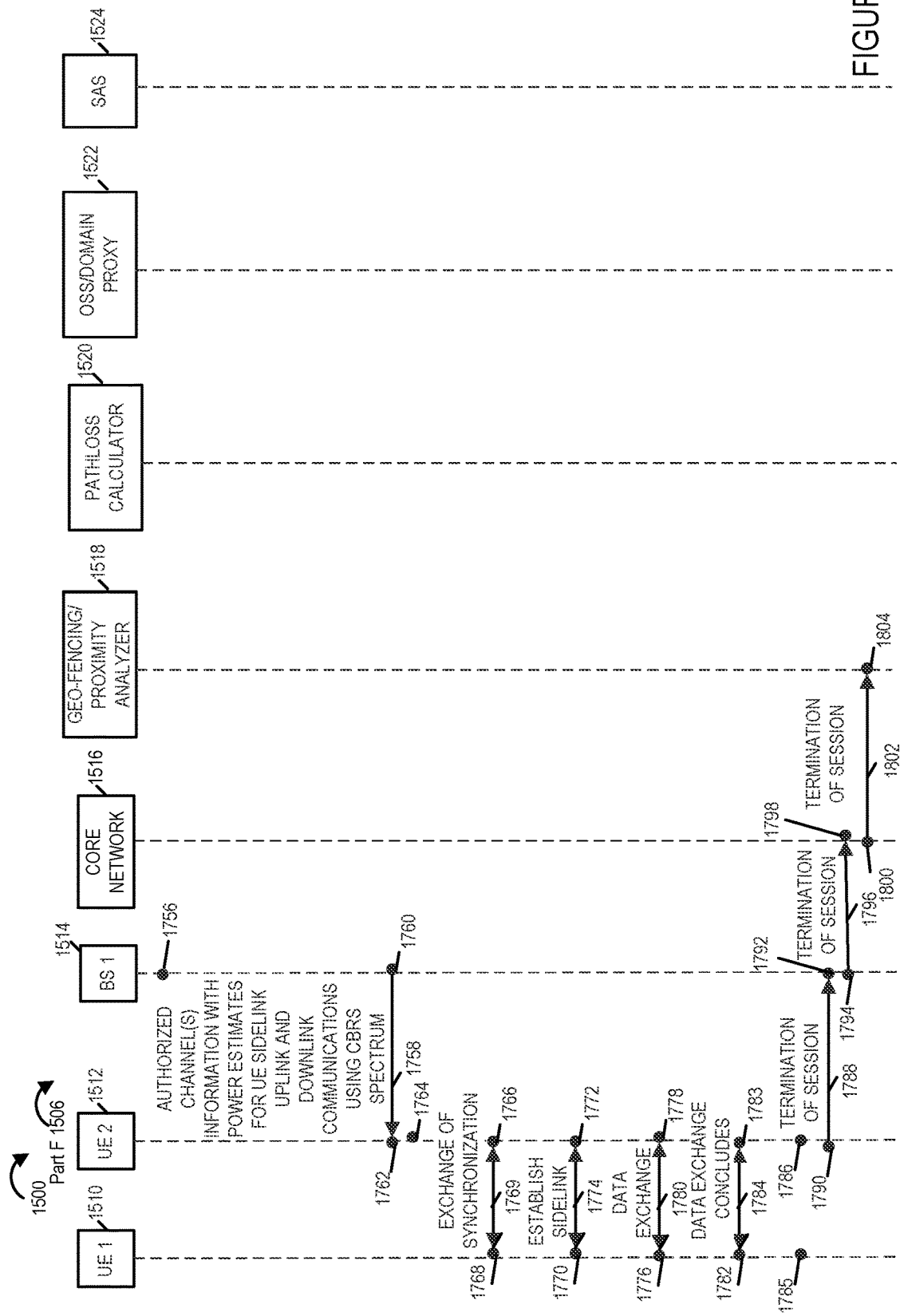
FIG. 15F is the sixth part of a signaling diagram which illustrates the steps and signaling of an exemplary method in accordance with an embodiment of the present invention.

FIG. 15 comprises FIG. 15A, FIG. 15B, FIG. 15C, FIG. 15D, FIG. 15E, FIG. 15F, and FIG. 15G. FIG. 15A is the first part (Part A 1501) of a signaling diagram which illustrates the steps and signaling of an exemplary method in accordance with an embodiment of the present invention. FIG. 15B is the second part (Part B 1502) of a signaling diagram which illustrates the steps and signaling of an exemplary method in accordance with an embodiment of the present invention. FIG. 15C is the third part (Part C 1503) of a signaling diagram which illustrates the steps and signaling of an exemplary method in accordance with an embodiment of the present invention. FIG. 15D is the fourth part (Part D 1504) of a signaling diagram which illustrates the steps and signaling of an exemplary method in accordance with an embodiment of the present invention. FIG. 15E is the fifth part (Part E 1505) of a signaling diagram which illustrates the steps and signaling of an exemplary method in accordance with an embodiment of the present invention. FIG. 15F is the sixth part (Part F 1506) of a signaling diagram which illustrates the steps and signaling of an exemplary method in accordance with an embodiment of the present invention. FIG. 15G is the seventh part (Part G 1507) of a signaling diagram which illustrates the steps and signaling of an exemplary method in accordance with an embodiment of the present invention.

While it will be readily understood that additional steps and signaling are performed in connection with communicating information, messages, and packets between devices, the method 1500 focuses on and discusses the steps and signaling for understanding the invention. Elements or steps with the same reference numbers used in different figures are the same or similar and those elements or steps will not be described in detail again. The signaling diagram/method 1500 is implemented by a system including a first Dual SIM Dual subscriber user equipment device DSDS UE 1 1510, a second Dual SIM Dual subscriber user equipment device DSDS UE 2 1512, a first wireless base station BS 1 1514 which is part of a first wireless network or system (e.g., Verizon wireless network), a core network 1516 which is part of the first wireless network or system (e.g., a Verizon core network which is part of the Verizon wireless network or system), a Geo-Fencing/Proximity Analyzer 1518 (also referred to herein as a sidelink proximity analyzer) which is part of a second wireless network or system (e.g., Charter wireless network), a Pathloss Calculator 1520 which is part of the second wireless network or system (e.g., the Charter wireless network or system), an Operations Support Systems (OSS)/Domain Proxy 1522 which is an OSS which includes a Domain Proxy device or functionality which is part of the second wireless network or system (e.g., the Charter wireless network or system), and a Spectrum Access System 1524 which is a resource management system that manages the allocation and usage of spectrum by base stations in the second wireless network. The second wireless network operator (e.g., Charter) which operates the second wireless network or system operates both wireless base stations (e.g., CBRS CBSDs) which it owns as well as operates as a Mobile Virtual Network Operator (MVNO) with respect to wireless services provided by the first wireless network or system (e.g., Verizon) which is operated by the first wireless network operator (e.g., Verizon). The first wireless network operator having entered into an agreement to provide wireless services to user equipment devices of the second wireless network. This allows the second wireless network operator to provide services using its own base stations to its subscribers when within the coverage area of its base stations and to have the first network operator provide services to its subscribers when outside the coverage area of the second network operator's base stations but within the coverage area of the first wireless network operator's base stations. The user equipment devices UE 1 1510 and UE 2 1512 are subscriber devices of the second wireless network or system. The user equipment devices UE 1 1510 and UE 2 1510 are Dual SIM Dual subscriber user equipment device that are able to operate on both the first wireless network and the second wireless network. The first and second wireless network may operate using different spectrum.

In some embodiments, the DSDS UE 1510 and UE 2 1512 are wireless device (e.g., mobile devices such as by way of example a mobile phone, smart phone, laptop, tablet) with a first SIM card with credentials to access the first wireless/mobile network operator's network and a second SIM card with credentials to access the second wireless/mobile network operator's network. The first mobile network operator's network being a first wireless network having a first set of spectrum available for use. The second mobile network operator's network being a Hybrid Mobile Network Operator (HMNO) network including a second wireless network which utilizes spectrum different than the first wireless network for wireless communications. In some embodiments, the first wireless base station BS 1 1514 is an eNodeB or gNodeB. In some embodiments, the second wireless network is a CBRS network. In some embodiments, the second wireless network is a CBRS Time Division Long Term Evolution network utilizing 5G New Radio (NR) technology. In various embodiments, the second wireless network is a hybrid mobile network which offloads traffic from the first wireless network. In some such embodiments, the second network operator, which operates the HMNO network, is a Mobile Virtual Network Operator (MVNO) operator for which the first wireless/mobile network operator, which operates the first wireless/mobile network/system, provides network services to the second wireless network operator. The network services being wireless network services. In some such embodiments, the first wireless network operator is a Mobile Network Operator or a carrier such as for example Verizon. In some such embodiments, the second network operator operates a CBRS system and has a PAL license covering a first county or area.

The DSDS UE 1 1510 and DSDS UE 2 1512 includes a dual SIM card with credentials that allow it to connect to and communicate with devices, e.g., wireless base stations and user equipment devices in both the first wireless network and the second wireless network. User equipment to user equipment wireless sidelink communications are device to device (D2D) communications. The DSDS UE 1 1510 and DSDS UE 2 1512 each include a connection manager which manages communications with both the first network and second network, e.g., reporting of UE information, e.g., UE location information, handoff of the DSDS UE 1510 and DSDS UE 1512 from the first network to the second network, connection and communications between user equipment devices.

The core network 1516 is operated by the first wireless/mobile network operator as part of the first wireless network/system. The core network 1516 includes network equipment, e.g., a plurality of network equipment devices and/or entities/functions, which provide core network services and functionality for the first wireless network. In some embodiments the core network 1516 is an Evolved Packet Core/System. In at least some embodiments, the core network 1516 includes a UE data forwarding function node and/or device such as for example, UE data forwarding function 1102 discussed in connection with system 1100. In various embodiments, communications links couple and/or connect the various entities BS 1 1514, core network 1516, geo-fencing proximity analyzer 1518, pathloss calculator 1520, OSS/Domain Proxy 1522, SAS 1524. The first wireless base station 1514 is connected to the core network 1516 over a path that includes a landline, e.g., a wire or optical cable. The core network 1516 is coupled and/or linked to the geo-fencing proximity analyzer 1518. The geo-fencing proximity analyzer 1518 is coupled and/or connected to the pathloss calculator 1520. The OSS/Domain Proxy 1522 is coupled and/or connected to the geo-fencing/proximity analyzer 1518. The OSS/Domain Proxy 1522 is coupled and/or connected to the SAS 1524.

Figure 4:
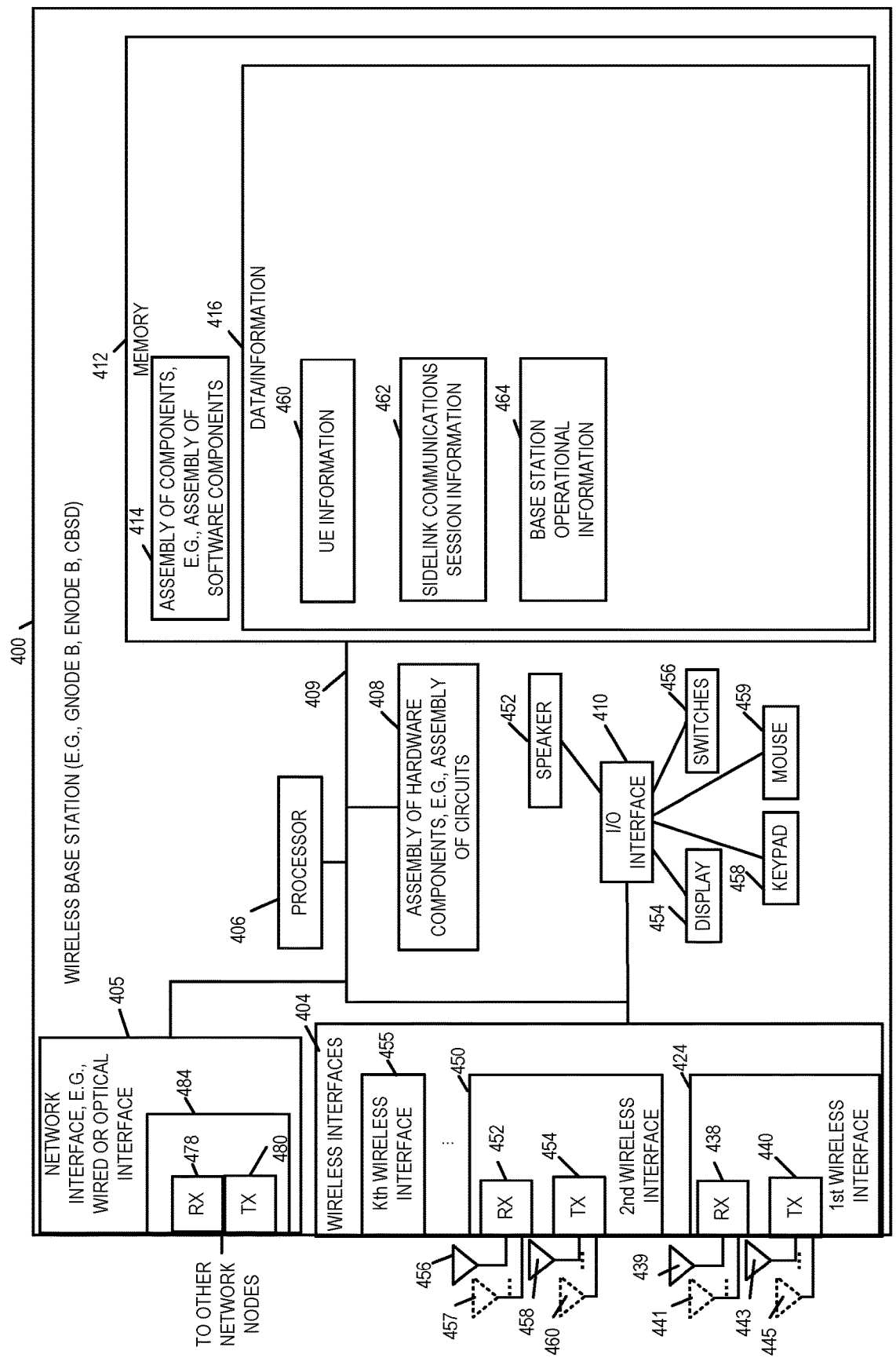
FIG. 4 illustrates details of an exemplary wireless base station, in accordance with one embodiment of the present invention.

In various embodiments, the first wireless base station (BS 1) 1514 is implemented in accordance with the wireless base station 400 shown in FIG. 4. In some embodiments, the DSDS UE 1 1510 and DSDS UE 2 1512 are implemented in accordance with user equipment device 500 shown in FIG. 5. In some embodiments, the network equipment included in the core network 1516 is implemented in accordance with the network equipment device 600 shown in FIG. 6. In some embodiments, the first wireless base station (BS 1) 1514 is implemented as an eNodeB or a gNodeB. In some embodiments one or more of the following entities: geo-fencing proximity analyzer 1518, pathloss calculator 1520, OSS/Domain Proxy 1522, and SAS 1524 are implemented in accordance with the network equipment device 600 shown in FIG. 6.

The signaling diagram/method 1500 may be, and in some embodiments is, implemented using exemplary system 200 of FIG. 2. In such embodiments, the first wireless base station BS 1 1514 is the wireless base station 3 230 of system 200. The DSDS user equipment device UE 1 1510 is DSDS user equipment device 1202 of system 200. The DSDS user equipment device UE 2 1512 is UE 2 204 of system 200. The core network 1516 is the core network 1 260 of system 200. The geo-fencing proximity analyzer 1518 is sidelink proximity analyzer 282 of system 200. The pathloss calculator 1520 is the pathloss calculator 284 of system 200. The OSS/Domain Proxy 1522 is the OSS/Domain Proxy 286 of system 200. The SAS 1524 is the SAS 280 of system 200. In some embodiments, the signaling diagram/method is implemented in accordance with the system 1300 of FIG. 13. In such embodiments, UE 1 1510 is UE 1 1107 of system 1300; UE 2 1512 is UE 2 1108 of system 1300; BS 1 1514 is BS 1 1110 of system 1300, core network 1516 is core network 1306 and includes UE data forwarding function 1102 of system 1300; geo-fencing/proximity analyzer 1518 is sidelink proximity analyzer 2102 of system 1300; pathloss calculator 1520 is pathloss calculator 2103 of system 1300; OSS/Domain Proxy 1522 is OSS/Domain Proxy 2104 of system 1300; SAS 1524 is SAS 2105 of system 1300. In some embodiments, signaling diagram/method 1500 is implemented on system 1100. It should be understood that the method 1500 is not limited to the exemplary systems 200, 1100, 1300 and may be, and is used, on other systems and system configurations. The signaling diagram/method 1500 illustrates the exemplary signaling and steps for determining when and how to implement an out of coverage area sidelink communications session between user equipment devices (UE 1 and UE 2).

The method 1500 starts in start step 1548 shown on FIG. 15A. Operation proceeds from start step 1548 to step 1550.

In step 1550, user equipment device 1 (UE 1) 1510 generates message 1552. The message 1552 includes identification information (e.g., International Mobile Subscriber Identity (IMSI) and/or International Mobile Equipment Identity (IMEI)) and information on the location of user equipment device 1 1510 such as for example global positioning system (GPS) coordinates. Operation proceeds from step 1550 to step 1554.

In step 1554, UE 1 1510 transmits the message 1552 to wireless base station 1 (BS 1) 1514. The message 1552 is transmitted over the air using first spectrum allocated and/or belonging to the first mobile network operator (e.g., Verizon). Operation proceeds from step 1554 to step 1556.

In step 1556, the base station 1 1514 receives and processes the message 1552 extracting from the message 1552 the user equipment device 1 1510 location information and identification information contained in the message 1552. In various embodiments, the base station 1 1514 stores the received user equipment device 1 1510 information in its memory. Operation proceeds from step 1556 to step 1558.

In step 1558, user equipment device 2 (UE 2) 1512 generates message 15560. The message 1560 includes identification information (e.g., International Mobile Subscriber Identity (IMSI) and/or International Mobile Equipment Identity (IMEI)) and information on the location of user equipment device 2 1512 such as for example global positioning system (GPS) coordinates. Operation proceeds from step 1558 to step 1562.

In step 1562, UE 2 1512 transmits the message 1560 to wireless base station 1 (BS 1) 1514. The message 1560 is transmitted over the air using first spectrum allocated and/or belonging to the first mobile network operator (e.g., Verizon). Operation proceeds from step 1562 to step 1564.

In step 1564, the base station 1 1514 receives and processes the message 1560 extracting from the message 1560 the user equipment device 2 1512 location information and identification information contained in the message 1560. In various embodiments, the base station 1 1514 stores the received user equipment device 2 1512 information in its memory. Operation proceeds from step 1564 to step 1566.

In step 1566, the wireless base station 1 1514 generates message 1568 which includes user equipment identification and corresponding location information for the user equipment devices which are connected and/or attached to the wireless base station 1 1514. The message 1568 includes the received UE 1 1510 identification information and corresponding UE 1 1510 location information and the received UE 2 1512 identification information and UE 2 1512 location information. Operation proceeds from step 1566 to step 1570.

In step 1570, the wireless base station 1 1514 transmits the message 1568 to network equipment (e.g., an Access Mobility Function node) in the core network 1516. Operation proceeds from step 1570 to step 1572.

In step 1572, the core network 1516 receives the message 1568. In some embodiments, the network equipment device in the core network 1516 which receives the message 1568 extracts UE information and stores it in a storage device or memory included in the core network 1516. In some embodiments, the UE information corresponding to each of the UE devices is stored in a store device or memory included in or attached to Unified Data Management entity such as for example a Unified Data Repository. Operation proceeds from step 1572 to step 1574.

In step 1574, network equipment in the core network 1516 (e.g., UE Data Forwarding function/node) generates message 1576 (e.g., using the UE information contained in message 1568). Operation proceeds from step 1574 to step 1578.

In step 1578, a network equipment device (e.g., UE Data Forwarding function/node) transmits message 1576 to the geo-fencing/proximity analyzer 1518. Operation proceeds from step 1578 to step 1580.

In step 1580, the geo-fencing/proximity analyzer 1518 receives the message 1576 with the UE information including the UE 1 1510 identity and location information and the UE 2 1512 identity and location information. Operation proceeds from step 1580 to step 1582.

In step 1582, the received message 1576 is processed and the UE information is extracted. In various embodiments, the extracted UE information is then utilized by the geo-fencing/proximity analyzer 1518 to update UE location information in its memory with respect to the location of UE subscribers such as UE 1 1510 and UE 2 1512. In various embodiments, the user equipment devices of the system which include UE 1 1510 and UE 2 1512 report their location to the geo-fencing/proximity analyzer 1518 on a continuous on-going basis whenever connected to the either the first wireless network or the second wireless network. In various embodiments, the reporting of location occurs on a recurring basis after the passage of a specific amount of time (e.g., once every 50 seconds). In some embodiments, the connection manager of the UE 1 1510 and UE 2 1512 performs this UE location reporting function using GPS coordinates obtained from a GPS receiver on the user equipment device. In various embodiments steps 1550, 1554, 1556, 1558, 1562, 1564, 1566, 1570, 1572, 1574, 1578, 1580 are performed on a recurring basis as part of the user equipment device reporting function. In some embodiments, the core network 1516 receives and maintains the UE identity and location information reported until it is requested by the geo-fencing/proximity analyzer 1518. In some embodiments, the geo-fencing/proximity analyzer 1518 registers with the core network 1516 to obtain notifications with updates whenever the core network 1516 is updated with UE location information or per a location update schedule (e.g., every T seconds or minutes, the T being a value which may be specified by the geo-fencing/proximity analyzer). Operation proceeds from step 1582 to step 1600.

In step 1600, UE 1 1510 generates a UE 1 session initiation request message 1602. In some embodiments, step 1600 is performed in response to user input received at the UE 1 1510 device. The UE 1 1510 session initiation request message 1602 includes information indicating that a session is to be initiated between UE 1 1510 and UE 2 1512. The session initiation request message 1602 includes information necessary for establishing the session including session type of the session to be established (e.g., real-time communications session (e.g., voice communications or video call session), a non-real time communications session (e.g., data transfer session such as transfer of data for pictures which is best effort), identification information (e.g., IMEI or IMSI for the UE 1 1510), the address information for UE 1 1510 and UE 2 1512. In some embodiments, the message 1602 includes information identifying the class of service or traffic type for the session. The traffic type may include for example a traffic type of large data transfer (e.g., transfer of an amount of data above or equal to a first threshold size) or small data transfer (e.g., transfer of an amount of data below a first threshold size). The Quality of Service may be for example, high, low, or best effort quality of service. In various embodiments, a connection manager component in the UE 1 1510 generates the message 1602. In various embodiments, the message 1602 includes the UE 1 1510 identification information and location information (e.g., GPS coordinates) so that the base station 1 1514 will have the latest location information for UE 1 1510. Operation proceeds from step 1600 to step 1604.

In step 1604, the UE 1 1510 transmits the message 1602 to the wireless base station 1 1514 over a wireless connection, channel or link controlled or owned by the first wireless network. Operation proceeds from step 1604 to step 1606.

In step 1606, the wireless base station 1 1514 receives the session initiation request message 1602 from UE 1 1510. Operation proceeds from 1606 to step 1608.

In step 1608, the wireless base station 1 1514 generates the message 1610 based on information included in the message 1602. The message 1610 is a session initiation message indicating that UE 1 1510 is requesting initiation of a session with UE 2 1512. The message 1610 includes UE 1 information, UE 2 information, and session information including for example session establishment information that is information necessary to establish the session between UE 1 1510 and UE 2 1512 including for example UE 1 and UE 2 addresses (e.g., IP addresses) or telephone number information. The UE 1 information includes identification information for UE 1 (e.g., IMSI or IMEI information). The UE 2 information includes identification information for UE 2 (e.g., IMSI or IMEI information). In some embodiments, the UE 1 information includes a device type identifier which identifies the type of device UE 1 1510 is. In some embodiments, the UE 2 information includes a device type identifier which identifies the type of device UE 2 1512 is. In some embodiments, the UE 1 1510 and UE 2 1512 information includes UE LTE category information for each device. In some embodiments, the UE 1 and UE 2 information includes the capabilities (e.g., transmission capabilities of the respective user equipment device (i.e., UE 1 transmission capabilities and UE 2 transmission capabilities). The UE 1 information may and sometimes does include the most recently received location information for UE 1 1510. The UE 2 information in some embodiments includes the most recently received location information for UE 2 1512. The session information may, and in some embodiments, does include information about the session to be established (e.g., session type, Quality of Service to be provided, information indicating whether the session is to be a real-time or non-real time session, information indicating whether TCP or UDP transport protocol is to be used for the session, information indicating whether the session is to be a best effort session, information indicating whether the session is a call session or a data session, information indicating the session is to be a data transfer session, information indicating the amount of data to be transferred). Operation proceeds from step 1608 to step 1612.

In step 1612, the base station 1 1514 transmits the session initiation message 1610 to the core network 1516 (e.g., Access Management and Mobility Management Function (AMF) entity in the core network 1516). Operation proceeds from step 1612 to step 1614.

In step 1614, network equipment in the core network 1516 (e.g., the AMF entity) receives the session initiation request message 1610. Operation proceeds from step 1614 to step 1616.

In step 1616, the core network 1516 generates the message 1618 based on information included in the message 1610. The message 1618 is a sidelink determination request message. The message 1618 includes UE 1, UE 2, and/or session information. The UE 1 information includes identification information for UE 1 (e.g., IMSI or IMEI information). The UE 2 information includes identification information for UE 2 (e.g., IMSI pt IMEI information). In some embodiments, the UE 1 information includes a device type identifier which identifies the type of device UE 1 1510 is. In some embodiments, the UE 2 information includes a device type identifier which includes a device type identifier which identifies the type of device UE 2 1512 is. In some embodiments, the UE 1 and UE 2 information include UE LTE category information indicating the corresponding category for UE 1 and UE 2. In some embodiments, the UE 1 and UE 2 information include UE capabilities, e.g., UE transmission capabilities for UE 1 and UE 2 respectively. The UE 1 information may and sometimes does include the most recently received location information for UE 1 1510. The UE 2 information in some embodiments includes the most recently received location information for UE 2 1512. The session information may, and in some embodiments, does include session information (e.g., session type, Quality of Service to be provided, information indicating whether the session is to be a real-time or non-real time session, information indicating whether TCP or UDP transport protocol is to be used for the session, information indicating whether the session is to be a best effort session, information indicating whether the session is a call session or a data session, information indicating the session is to be a data transfer session, information indicating amount of data to be transferred). Operation proceeds from step 1616 to step 1620.

In step 1620, a network equipment device (e.g., UE Data Forwarding Function node/device) transmits the sidelink determination request message 1618 from the core network 1516 to the geo-fencing/proximity analyzer 1518. The geo-fencing/proximity analyzer 1518 being part of the second wireless network. Operation proceeds from step 1620 to step 1622.

In step 1622, the geo-fencing proximity analyzer 1518 receives the sidelink determination request message 1618. Operation proceeds from step 1622 to step 1624 shown on FIG. 15B.

In step 1624, the geo-fencing/proximity analyzer 1518 determines whether UE 1 1510 and UE 2 1512 are within the licensed area of the second wireless network based on the UE 1 and UE 2 location information. The licensed area being an area in which the second wireless network has licensed spectrum such as for example a county for which the second wireless network has one or more CBRS Priority Access Licenses. Each CBRS Priority Access License F consisting of a 10 megahertz channel within the 3550-3650 MHz and. In some embodiments, step 1624 includes the geo-fencing/proximity analyzer 1518 comparing UE 1 1510 location information to the geographical boundaries of the county in which the second wireless network has the one or more PAL licenses to determine whether the UE 1 1510 is located within the licensed area. In some embodiments, step 1624 includes the geo-fencing/proximity analyzer 1518 comparing UE 2 1512 location information to the geographical boundaries of the county in which the second wireless network has the one or more PAL licenses to determine whether the UE 1 1510 is located within the licensed area. Operation proceeds from step 1624 to step 1626 when it is determined that UE 1 1510, UE 2 1512 or both UE 1 1510 and UE 2 1512 are not within the licensed area. Operation proceeds from step 1624 to step 1630 when it is determined that UE 1 1510 and UE 2 1512 are both within the licensed area.

In step 1626, when the geo-fencing/proximity analyzer 1518 determines that UE 1 1510 and/or UE 2 1512 are not within the licensed area, the geo-fencing/proximity analyzer 1518 makes the determination that out-of-coverage sidelink communications will not be used for the session between the UE 1 1510 and UE 2 1512. Operation proceeds from step 1626 to step 1642 shown on FIG. 15C.

In step 1630, when the geo-fencing/proximity analyzer 1518 determines that UE 1 1510 and UE 2 1512 are both within the licensed area, the geo-fencing/proximity analyzer 1518 determines the distance between UE 1 1510 and UE 2 1512 based on the UE 1 and UE 2 location information. Operation proceeds from step 1630 to step 1632.

Figure 3:
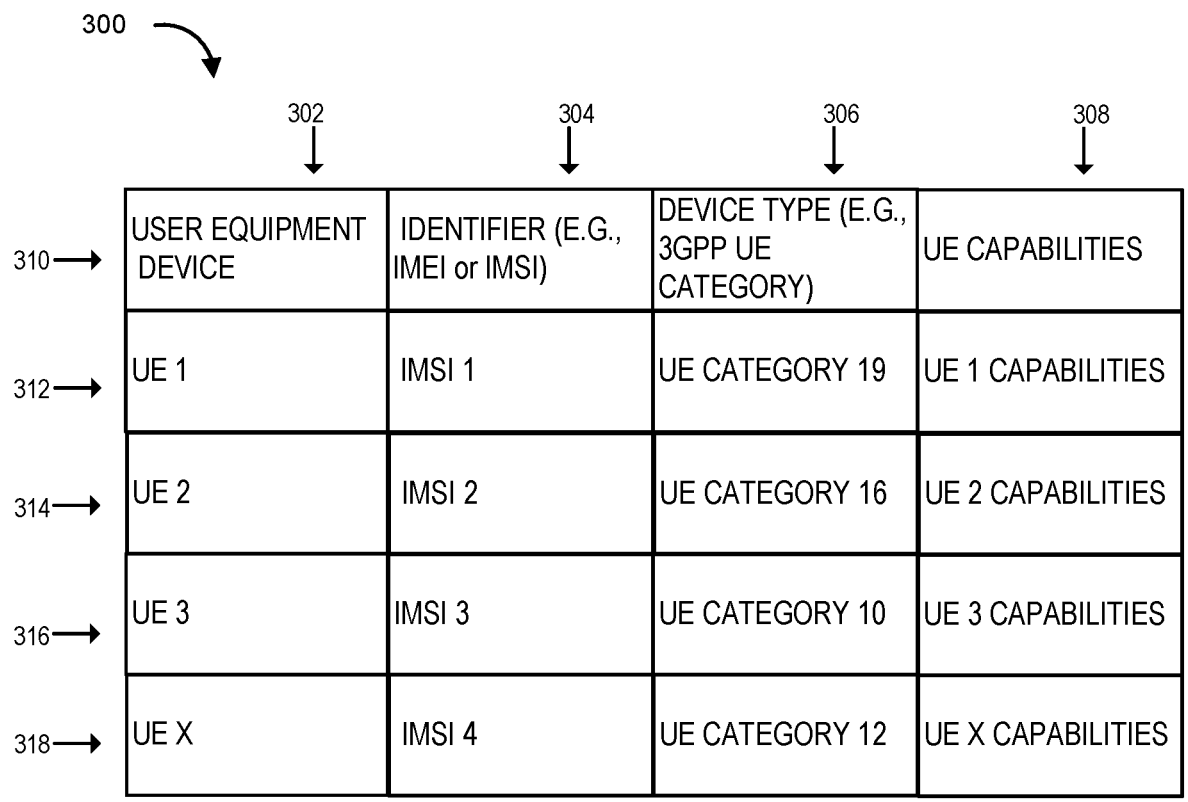
FIG. 3 illustrates a table correlating user identity with device type (e.g., 3GPP UE category) and user equipment device capabilities (e.g., operating spectrum and transmission capabilities).

In step 1632, the geo-fencing/proximity analyzer 1518 determines UE 1 1510 device type (e.g., LTE UE category) based on information received from UE 1 1510 via the core network 1516. In some embodiments, the UE 1 1510 device type is determined from the identity or identification information received from the UE 1 1510 (e.g., the IMSI number or IMEI number). In some embodiments, the geo-fencing/proximity analyzer 1518 includes a listing or table of IMSI numbers and/or IMEI numbers and the device type to which the IMSI numbers and/or IMEI numbers correspond. FIG. 3 illustrates an exemplary table 300 which includes a listing of the second user equipment devices and their corresponding identifier (e.g., IMSI identifier, device type (e.g., 3GPP UE category) and UE capabilities. Table 300 is described in greater detail below. Operation proceeds from step 1632 to step 1634.

In step 1634, the geo-fencing/proximity analyzer 1518 determines UE 2 1512 device type (e.g., LTE UE category) based on information received from UE 2 1512 via the core network 1516. In some embodiments, the UE 2 1512 device type is determined from the identity or identification information received from the UE 2 1512 (e.g., the IMSI number or IMEI number). In some embodiments, the geo-fencing/proximity analyzer 1518 includes a listing or table of IMSI numbers and/or IMEI numbers and the device type to which the IMSI numbers and/or IMEI numbers correspond. Operation proceeds from step 1634 to step 1636.

In step 1636, the geo-fencing/proximity analyzer 1518 determines whether the distance between UE 1 1510 and UE 2 1512 is too large for out of coverage sidelink communications based on the determined distance between UE 1 1510 and UE 2 1512. In some embodiments, the determination of whether the distance between UE 1 1510 and UE 2 1512 is too large is made by determining whether the distance between UE 1 1510 and UE 2 1512 is equal to and/or greater than a threshold distance. The threshold distance may be, and in some embodiments, is based on one or more of the following: UE 1 device type, UE 2 device type, and/or session type. In some embodiments, the determination of whether the distance between UE 1 1510 and UE 2 1512 is too large for out of coverage sidelink communications is further based on one or more of the following: UE 1 device type, UE 2 device type, and information about the session to be established such as for example the session type (e.g., real-time session or non-real time session; transport protocol to be used for the session (TCP or UDP); whether the session to be established is to be a best effort data transfer session; size of data to be transferred if it is a data transfer session; whether the session is to be a voice or video communications session; application implementing the session (e.g., is a data transfer application implementing the session); Quality of Service to be guaranteed for the session to be established; whether the session requires media manipulation such as transcoding). In some embodiments, the determination of whether the distance between UE 1 1510 and UE 2 1512 is too great for out of coverage sidelink communications includes policies or policy factors provided to the geo-fencing proximity analyzer 1518 as inputs by the operator of the second network. For example, the policies or policy factors may include policies that favor using out of coverage sidelink communications when the session type is non-real time communications for a large data transfer between UE 1 and UE 2 and disfavor using out of coverage sidelink communications when the session type is real time communications for an audio or video call session. The policy factors may be weighted with the weightings indicating whether or not to utilize the out of coverage sidelink communications. And, the decision may be made by comparing the summation of the weighted factors with a threshold value. The threshold value may be different for different distances and/or different device types. In some embodiments, when the UE 1 1510 and UE 2 1512 device types are different, the device type with the lesser capabilities (e.g., lower downlink capabilities and/or lower uplink capabilities) is is used in making the decision as to whether or not to implement a sidelink communications session. That is the decision is made based on the capabilities of the device with the lesser or lower capabilities. For example, if UE 1 is LTE category 1 and UE 2 is LTE category 5 the decision is based on the capabilities of UE 1. Operation proceeds from step 1636 to step 1638 when the determination is that the distance between UE 1 1510 and UE 2 1512 is too large for out of coverage sidelink communications. Operation proceeds from step 1636 to step 1652 shown on FIG. 15C when the determination is that the distance between UE 1 1510 and UE 2 1512 is not too large for out of coverage sidelink communications.

In step 1638, in response to determining that the distance between UE 1 1510 and UE 2 1512 is too large for out of coverage sidelink communications, the geo-fencing/proximity analyzer 1518 determines that out of coverage sidelink communications will not be used for the session. Operation proceeds from step 1638 to step 1642 shown on FIG. 15C.

In step 1642, the geo-fencing/proximity analyzer 1518 generates a notification message 1644 including information indicating that out-of-coverage sidelink communications will not be used for the session. Operation proceeds from step 1642 to step 1646.

In step 1646, the geo-fencing/proximity analyzer 1518 transmits the message 1644 to the core network 1516 (e.g., to the Access Management and Mobility Management Function entity via the UE data forwarding function entity) in response to the sidelink determination request 1618. Operation proceeds from step 1646 to step 1648.

In step 1648, the core network 1516 (e.g., Access Management and Mobility Management Function (AMF) entity) receives and processes the message 1644. Operation proceeds from step 1648 to step 1649.

In step 1649, the core network 1516 (e.g., Access Management and Mobility Management Function entity of the core network) determines from the received notification message 1644 that out of coverage sidelink communications will not be used for the session. Operation proceeds from step 1649 to step 1650.

In step 1650, the core network 1516 (e.g., Access Management and Mobility Management Function entity of the core network) proceeds to establish a session between UE 1 1510 and UE 2 1512 without using out of coverage sidelink communications but instead using the first wireless network operator's network and spectrum. Upon establishment the session is implemented on the first wireless operator's network.

In step 1652, when it is determined by the geo-fencing/proximity analyzer 1518 that the distance between UE 1 1510 and UE 2 1512 is not too large for out of coverage sidelink communications, the geo-fencing/proximity analyzer 1518 generates a request message 1656 for pathloss calculation for the path between UE 1 1510 and UE 2 1512. The pathloss request message 1656 includes information about UE 1 1510 and UE 2 1512 including the UE 1 device type and UE 1 location and UE 2 device type and UE 2 location. Operation proceeds from step 1652 to step 1658.

In step 1658, the geo-fencing/proximity analyzer 1518 transmits the pathloss request message 1656 to the pathloss calculator entity 1520. Operation proceeds from step 1658 to step 1660.

In step 1660, the pathloss calculator entity 1520 receives the pathloss request message 1656 from the geo-fencing/proximity analyzer 1518. Operation proceeds from step 1660 to step 1662.

In step 1662, the pathloss calculator entity determines the pathloss for the path between UE 1 1510 and UE 2 1512 based on the information for UE 1 1510 and UE 2 1512 received in the pathloss request message 1656. In various embodiments, the determination of the pathloss includes an evaluation of the pathloss between UE 1 1210 and UE 2 1212 based on communicating via the out of coverage sidelink communication spectrum. The pathloss calculation entity 1520 determines UE 1 capabilities based on the UE 1 device type and UE 2 capabilities based on the UE 2 device type (e.g., UE LTE device category). Once the pathloss calculation entity 1520 has determined the UE 1 and UE 2 capabilities (e.g., maximum uplink and downlink data rates and/or maximum number of downlink MIMO (multiple input multiple output) layers), it uses the location of the UE 1 1510 and the UE 2 1512 and UE capabilities of UE 1 and UE 2 to determine how far UE 1 1510 and UE 2 1512 can reach for communication. The pathloss calculator entity 1520 determines a maximum distance between which the UE 1 and UE 2 devices can communicate. In some embodiments, one or more different propagation models are used in combination with digital terrain, morphologies, buildings and morphology heights data to determine the pathloss for wireless communications between UE 1 and UE 2. This data may be, and in some embodiments, is stored in memory in the pathloss calculator entity 1520 or in a storage device, e.g., a database attached to the pathloss entity 1520. In some embodiments, the pathloss calculator entity 1520 is a real time pathloss calculator that performs in real time the pathloss calculation using the UE 1 and UE 2 locations, UE 1 and UE 2 capabilities and digital data about the path between the UE 1 and UE 2 (e.g., heights, morphologies, geographical and buildings data) to determine and/or calculate a pathloss for out of coverage sidelink communications between UE 1 and UE 2. In some embodiments, the pathloss calculator entity 1520 is a free space pathloss calculator that uses the sidelink spectrum frequency to be used for the communication, the distance between UE 1 and UE 2 and the transmitter and receiver gains in UE 1 and UE 2 to calculate the Free Space Path Loss in decibels while ignoring obstacles in the path between UE 1 and UE 2. In some embodiments, the pathloss calculator entity 1520 uses an empirical or deterministic formulae to determine the pathloss in a given morphology. Using an empirical or deterministic formulae to determine the pathloss has the advantage of being faster than some of the other methods discussed. In some embodiments, the particular method used to determine the pathloss is selected by the pathloss calculator entity based on the location of the UE devices, the UE device types, and/or the type of session to be established. The session type information being provided in the pathloss request message 1656. In some embodiments, multiple methods are employed to determine the pathloss between UE 1 and UE 2 with the results of the methods being combined (e.g., averaged) or one of the methods (e.g., worst or best case) being selected. In step 1662, the pathloss calculator entity 1520 also determines power instructions for UE 1 1510 and UE 2 1512 (e.g., a power level or initial power level for each of the UEs to transmit at for the sidelink communications session). Operation proceeds from step 1662 to step 1664.

In step 1664, the pathloss calculator entity 1520 generates pathloss response message 1666. The pathloss response messages includes the determined pathloss between UE 1 1510 and UE 2 1512 and power instructions (e.g., a transmission power level for UE 1 and UE 2). Operation proceeds from step 1664 to step 1668.

In step 1668, the pathloss response message 1666 is transmitted from the pathloss calculator entity 1520 to the geo-fencing/proximity analyzer 1518 in response to the pathloss request message 1656. Operation proceeds from step 1668 to step 1670.

In step 1670, the geo-fencing/proximity analyzer 1518 receives the pathloss response message 1666. Operation proceeds from step 1670 to step 1672.

In step 1672, the geo-fencing/proximity analyzer 1518 processes the received pathloss response message 1666 extracting the determined pathloss and the power instructions from the pathloss response message 1666. Operation proceeds from step 1672 to step 1674 shown on FIG. 15D.

In step 1674, the geo-fencing/proximity analyzer 1518 determines whether or not the determined pathloss is within reasonable limits. In some embodiments step 1674 includes the sub-step of determining if the out of coverage area sidelink communications at the power level provided in the power instructions of the pathloss response message 1666 is equal to or above a threshold value which will cause interference with other user equipment devices operating in the cell coverage area of the second wireless network operator (e.g., cell coverage area of the second wireless network's cells). If the answer is yes that sidelink communications with the UE 1 and UE 2 transmitting at the power levels identified in the power instructions is at or above a threshold value which will result in interference with the operation of UEs within cell coverage area then the pathloss is determined not to be within reasonable limits. If it is determined that the sidelink communications will not cause interference then the geo-fencing/proximity analyzer determines that the pathloss is within reasonable limits.

When the answer is yes that the pathloss is not within reasonable limits that is the sidelink communications will cause interference, then the geo-fencing/proximity analyzer 1518 determines that one or more General Authorized Access (GAA) channels will be used for the out of coverage area sidelink communications channel(s). When the answer is no that the pathloss is within reasonable limits that is the sidelink communications will not cause interference, then the geo-fencing/proximity analyzer 1518 determines that: (i) one or more Priority Access License (PAL) channels of the second wireless network operator will be used for the sidelink communications channel(s), or (ii) one or more PAL channel(s) of the second wireless network operator+one or more GAA channel(s) will be used for the sidelink communications channel(s). When a GAA channel is used for the sidelink communications, UE 1 and UE 2 will operate using network listen before talk mode of operation. Operation proceeds from step 1674 to step 1676.

In step 1676, the geo-fencing/proximity analyzer 1518 generates a channel request message 1678. The request message 1678 includes a request for one or more CBRS channels. This is done so that the cleanest CBRS channel(s) (e.g., CBRS GAA channels) can be identified/obtained for use for the sideline communications between UE 1 1510 and UE 2 1512. The cleanest channel(s) being the channel(s) with the least amount of interference. The channel request message 1678 includes location information derived from or based on the UE 1 and UE 2 location information received at the geo-fencing/proximity analyzer 1518 (e.g., GPS coordinates which include latitude, longitude and altitude for UE 1 1510 and UE 2 1512). In some embodiments, the location information is the location of UE 1 1510. In some embodiments, the location information is the location of UE 2 1512. In some embodiments, it is a location (e.g., a midpoint) on the communications path between UE 1 and UE 2. In some embodiments, the location is based on the location of UE 1 and/or UE 2. Operation proceeds from step 1676 to step 1680.

In step 1680, the geo-fencing/proximity analyzer 1518 transmits the channel request message 1678 to the OSS/Domain Proxy 1522. Operation proceeds from step 1680 to step 1682.

In step 1682, the OSS/Domain Proxy 1522 receives the channel request message 1678. Operation proceeds from step 1682 to step 1684.

In step 1684, the OSS/Domain Proxy 1522 processes the channel request message 1678 and generates register ghost CBSD message 1688 in response to the channel request message 1678. The register ghost CBSD message 1688 includes parameters for configuring a CBSD with a Spectrum Access System. As there is no CBSD the ghost CBSD is used to emulate an actual CBSD so that the Spectrum Access System can be used to identify the spectrum channel(s) (e.g., GAA channel(s)) which have the least interference to be used for the sidelink communications between UE 1 1510 and UE 2 1512. From the SAS's perspective the ghost CBSD appears as an actual CBSD of the second wireless network requesting registration. The parameters include location information which are based on the UE 1 and UE 2 location information provided by the geo-fencing/proximity analyzer 1518 in the channel request message 1678 (e.g., the UE 1 location, UE 2 location, or a location based on the UE 1 and/or UE 2 location information). Operation proceeds from step 1684 to step 1690.

In step 1690, the OSS/Domain Proxy 1522 transmits the register Ghost CBSD message 1688 to the SAS 1524. Operation proceeds from step 1690 to steps 1692 and 1694.

In step 1692, the SAS 1524 receives the register Ghost CBSD message 1688. Operation proceeds from step 1692 to step 1693.

In step 1693, the SAS 1524 registers the Ghost CBSD as if it is an actual CBSD of the second wireless network. Operation proceeds from step 1693 to step 1700.

In step 1694, the OSS/Domain Proxy 1522 enters into a CBSD emulation mode of operation in which it appears as the registered ghost CBSD in connection with communications with the SAS 1524 regarding inquiries about available spectrum, requests for spectrum grants, grants of spectrum, relinquishment of spectrum grants and de-registration of the ghost CBSD. Operation proceeds from step 1694 to steps 1698 and 1700 in which the OSS/Domain Proxy 1522 and SAS 1524 perform standard communications and exchange of messages and data 1696 including a inquiry from the OSS/Domain Proxy 1522 to the SAS 1524 as the ghost CBSD for available spectrum. The OSS/Domain Proxy 1522 utilizes an identifier assigned by the SAS 1524 to the ghost CBSD when communicating with the SAS 1524 as the ghost CBSD. Operation proceeds from steps 1698 and 1700 to step 1702.

In step 1702, the OSS/Domain Proxy 1522 generates a CBRS channel request message 1704 which includes information requesting one or more CBRS channels (e.g., GAA channels) for the registered Ghost CBSD. The CBRS channel request 1704 may include a request for specific channel(s) or spectrum identified by the SAS 1524 in response to a prior spectrum availability inquiry message during the standard communication exchange 16%. The channel request message 1704 typically includes the ghost CBSD identifier assigned to the ghost CBSD when registering with the SAS 1524. Operation proceeds from step 1702 to step 1706.

In step 1706, the OSS/Domain Proxy 1522 transmits the CBRS channel request 1704 to the SAS 1524. Operation proceeds from step 1706 to step 1708.

In step 1708, the SAS 1524 receives the CBRS channel request message 1704 from the OSS/Domain proxy 1522. The channel request message 1704 appearing to the SAS 1524 as if coming from the registered Ghost CBSD. Operation proceeds from step 1708 to step 1710 shown on FIG. 15E.

In step 1710, the SAS 1524 processes the channel request message 1704 and determines CBRS channel(s) (e.g., GAA channel(s) or GAA channel(s)+PAL channel(s)) in response to the request. Operation proceeds from step 1710 to step 1712.

In step 1712, the SAS 1524 grants the determined CBRS channels to the ghost CBSD. That it the determined CBRS channels (e.g., GAA channel(s) or (GAA channel(s)+PAL channel(s)) are authorized for use by the ghost CBSD. Operation proceeds from step 1712 to step 1714.

In step 1714, the SAS 1524 generates channel(s) grant authorization message 1716 in response to the channel request message 1704. The channel grant authorization message 1716 indicating that the CBRS channel(s) which have been granted to and authorized for use by the ghost CBSD. The channel grant authorization message 1716 including the identifier assigned to the ghost CBSD by the SAS 1524 when it was registered with the SAS 1524 by the OSS/Domain Proxy 1522. In some embodiments, the channel grant authorization message 1716 also includes a channel or spectrum grant identification assigned by the SAS 1524 to the spectrum grant. Operation proceeds from step 1714 to step 1718.

In step 1718 the SAS 1524 transmits the channel grant authorization message 1716 to the OSS/Domain Proxy 1522 which appears as the ghost CBSD to the SAS 1524. Operation proceeds from step 1718 to step 1720.

In step 1720, the OSS/Domain Proxy 1522 receives the channel grant authorization message 1716. Operation proceeds from step 1720 to step 1722.

In step 1722, the OSS/Domain Proxy 1522 generates the authorized channel(s) message 1724 based on the channel grant authorization message 1716. The authorized channel(s) message 1724 includes information on the granted and authorized channel(s) (e.g., identification information which identifies channel(s)/spectrum granted and authorized for use). Operation proceeds from step 1722 to step 1726.

In step 1726, the OSS/Domain Proxy 1522 transmits the authorized channel(s) message 1724 to the geo-fencing/proximity analyzer 1518 in response to the channel request message 1678 from the geo-fencing proximity analyzer 1518. Operation proceeds from step 1726 to step 1728.

In step 1728, the geo-fencing/proximity analyzer 1518 receives the authorized channel(s) message 1724 from the OSS/Domain Proxy 1522. Operation proceeds from step 1728 to step 1730.

In step 1730, the geo-fencing/proximity analyzer 1518 generates the authorized channel(s) message 1732 based on information received in the authorized channel(s) message 1724. The authorized channel(s) message 1732 includes information indicating the session between UE 1 1510 and UE 2 1512 is to be implemented using sidelink communications. The authorized channel(s) message 1732 further includes information identifying the authorized channels with power estimates for UE sidelink uplink and downlink communications using CBRS spectrum (e.g., channel(s) identified by the SAS 1524 for use by the ghost CBSD). In various embodiments, the power estimates are transmission power levels determined by the pathloss calculator entity 1520. Operation proceeds from step 1730 to step 1734.

In step 1734, the geo-fencing/proximity analyzer 1518 transmits the authorized channel(s) message 1732 to network equipment in the core network 1516 (e.g., to the AMF entity in the core network 1516 via a UE data forwarding function entity) in response to the sidelink determination request 1618. Operation proceeds from step 1734 to step 1736.

In step 1736, the core network 1516 (e.g., network equipment in the core network 1516 (e.g., the AMF entity via the UE Data Forwarding Function entity)) receives the authorized channel(s) message 1732. Operation proceeds from step 1736 to step 1738.

In step 1738, the core network 1516 (e.g., network equipment in the core network 1516 such as the AMF entity) generates authorized channel(s) message 1740 based on the message 1732. The authorized channel(s) message 1740 includes information indicating the session between UE 1 and UE 2 is to be implemented as a sidelink communications session. The authorized channel(s) message 1740 further includes information for the UE 1 to UE 2 sidelink communications session including information identifying the channel(s) (e.g., GAA channel(s) or GAA channel(s) and PAL channel(s)) and power estimates for sideline uplink and downlink communications using CBRS spectrum. Operation proceeds from step 1738 to step 1742.

In step 1742, the core network 1516 (e.g., the AMF entity in the core network 1516) transmits the authorized channel(s) message 1740 to the base station 1 1514 in response to the session initiation message 1610. Operation proceeds from step 1742 to step 1744.

In step 1744, the base station 1 1514 receives the authorized channel(s) message 1740. Operation proceeds from step 1744 to steps 1746 and 1756 shown on FIG. 15F.

In step 1746, the base station 1 1514 generates authorized channel(s) message 1748 based on message 1740. The authorized channel(s) message 1748 includes information indicating the session between UE 1 and UE 2 is to be implemented as a sidelink communications session. The authorized channel(s) message 1748 further includes information for the UE 1 to UE 2 sidelink communications session including information identifying the channel(s) (e.g., GAA channel(s) or GAA channel(s) and PAL channel(s)) and power estimates for sideline uplink and downlink communications using CBRS spectrum. Operation proceeds from step 1746 to step 1750.

In step 1750, the base station 1 1514 transmits the authorized channel(s) message 1748 to UE 1 1510 using spectrum of the first wireless network. Operation proceeds from step 1750 to step 1752.

In step 1752, UE 1 1510 receives the authorized channel(s) message 1748 from base station 1 1514. Operation proceeds from step 1752 to step 1754.

In step 1756 shown in FIG. 15F, the base station 1 1514 generates authorized channel(s) message 1758 based on message 1740. The authorized channel(s) message 1758 includes information indicating a session between UE 1 and UE 2 is to be implemented as a sidelink communications session. The authorized channel(s) message 1758 further includes information for the UE 1 to UE 2 sidelink communications session including information identifying the channel(s) (e.g., GAA channel(s) or GAA channel(s) and PAL channel(s)) and power estimates for sideline uplink and downlink communications using CBRS spectrum. Operation proceeds from step 1756 to step 1760.

In step 1760, base station 1 1514 transmits the authorized channel(s) message 1758 to UE 2 1512 using spectrum of the first wireless network. Operation proceeds from step 1760 to step 1762.

In step 1762, UE 2 1512 receives the authorized channel(s) message 1758 from base station 1 1514. Operation proceeds from step 1762 to step 1764.

In step 1754 UE 1 1510 generates synchronization message(s) 1769 to be exchanged with UE 2 1512.

In step 1764 UE 2 1512 generates synchronization message(s) 1769 to be exchanged with UE 1 1510.

In steps 1768 and 1766, UE 1 1510 and UE 2 1512 respectively exchange synchronization messages 1769 until synchronization between UE 1 1510 and UE 2 1512 has been achieved. Operation proceeds from steps 1766 and 1768 to steps 1770 and 1772.

In steps 1770 and 1772, UE 1 1510 and UE 2 1512 establish an out of coverage area sidelink communications session via an exchange of messages 1774. The sidelink communications session is a wireless communications session using channel(s) and/or spectrum identified in the authorized channel messages 1748 and 1758. The power transmission levels for uplink and downlink communications between UE 1 and UE 2 over the sidelink channel(s) being based on and/or those specifically specified in the authorized channel messages 1748 and 1758 as power estimates for UE sidelink uplink and downlink communications using CBRS spectrum. The sidelink channel(s) being GAA channel(s) in some embodiments. The sidelink channel(s) being GAA channel(s)+PAL channel(s) in some embodiments. The sidelink channel(s) being PAL(s) in some embodiments. In some embodiments, the PAL(s) channels are utilized with fallback to the GAA channels if the interference is too great. Operation proceeds from steps 1770 and 1772 to steps 1776 and 1778.

In steps 1776 and 1778, the UE 1 1510 and UE 2 1512 respectively perform operations to exchange data 1780 (e.g., data of the session such as for example real-time or non-real time data of the session depending on the type of session). Operation proceeds from step 1776 to steps 1778 to steps 1782 and 1783.

In steps 1782 and 1783, the UE 1 1510 and UE 2 1512 respectively perform operations to conclude the exchange of data and exchange messages 1784 to terminate the session. Operation proceeds from step 1782 to step 1785. Operation proceeds from step 1783 to step 1786.

In step 1785, UE 1 1510 performs operations terminating the sidelink communications session with UE 2 1512.

In step 1786, UE 2 1512 performs operations to terminate the sidelink communications session with UE 1 1512. These operations include generating a termination of session message 1788 which indicates that the sidelink session between UE 1 1510 and UE 2 1512 has been terminated. In some embodiments, the termination of session message 1788 includes information indicating the channel(s) which are to released or relinquished now that the session has been terminated. Operation proceeds from step 1786 to step 1790.

In step 1790, the termination of session message 1788 is transmitted from UE 2 1512 to base station 1 1514 over wireless spectrum of the first wireless network. In some embodiments, the generation of the termination of session message 1788 is generated by a connection manager component included in UE 2 1512. In some embodiments, instead of UE 2 1512 generating and sending the termination of session message 1788 to the base station 1 1514, UE 1 1510 generates and sends the termination of session message 1788 to the base station 1 1514 over wireless spectrum of the first wireless network. In some of such embodiments, the connection manager in UE 1 1510 performs these steps of generating and sending the termination of session message 1788 to the base station 1 1514. In some embodiments, both UE 1 1510 and UE 2 1512 generate and send termination of session messages to the base station 1 1514 using the spectrum of the first wireless network. Operation proceeds from step 1790 to step 1792.

In step 1792, base station 1 1514 receives the termination of session message 1788 from UE 2 1512. Operation proceeds from step 1792 to step 1794.

In step 1794, the base station 1 1514 in response to receiving the termination of session message 1788, generates and transmits termination of session message 1796 to network equipment in the core network 1516 (e.g., AMF entity in the core network 1516). The termination of session message 1796 is based on the termination of session message 1788 and includes information to identify the session being terminated and/or the channel(s) to be released. Operation proceeds from step 1794 to step 1798.

In step 1798, network equipment in the core network 1516 (e.g., the AMF entity in the core network 1516) receives the termination of session message 1796. Operation proceeds from step 1798 to step 1800.

In step 1800, network equipment in the core network (e.g., the AMF entity) in response to receiving the termination of session message 1796, generates and transmits termination of session message 1802 to the geo-fencing/proximity analyzer 1518 in the second wireless network (e.g., via an UE data forwarding function entity in the core network 1516). The termination of session message 1802 is based on the termination of session message 1796 and includes information to identify the session being terminated and/or the channel(s) to be released. Operation proceeds from step 1800 to step 1804.

In step 1804, the geo-fencing/proximity analyzer 1518 receives the termination of session message 1802 from the core network 1516. Operation proceeds from step 1804 to step 1806 shown on FIG. 15G.

In step 1806, the geo-fencing/proximity analyzer 1518 generates channel release message 1808 based on termination of session message 1802. The channel release message 1808 includes information indicating that the granted channels used for the sidelink session between UE 1 1510 and UE 2 1512 are to be released and identifies the channel(s) to be released. Operation proceeds from step 1806 to step 1810.

In step 1810, the geo-fencing/proximity analyzer 1518 transmits the channel release message 1808 to the OSS/Domain Proxy 1522. Operation proceeds from step 1810 to step 1812.

In step 1812, the OSS/Domain Proxy 1522 receives the channel release message 1808. Operation proceeds from step 1812 to step 1814.

In step 1814, the OSS/Domain Proxy 1522 determines from the information in the channel release message 1808 that the channel(s) to be released are those granted to the ghost CBSD. Operation proceeds from step 1814 to step 1815.

In step 1815, the OSS/Domain Proxy 1522 generates the release channel(s) message 1816 based on the channel release message 1808. The release channel release message 1816 includes information indicating that the granted channels for the ghost CBSD used for the sidelink session between UE 1 1510 and UE 2 1512 are to be released and identifies the channel(s) to be released. The release channel(s) message 1816 in some embodiments also includes an identifier assigned to the ghost CBSD. In some embodiments, the release channel(s) message 1816 is a relinquish channel(s) or spectrum message. In some embodiments, the release channel(s) message 1816 includes a spectrum grant identifier which identifies the spectrum channel grant which is to be released and which was assigned by the SAS 1524 and provided to the OSS/Domain Proxy 1522 with the spectrum channel grant. Operation proceeds from step 1815 to step 1818.

In step 1818, the OSS/Domain Proxy 1522 transmits the release channel(s) message 1816 to the SAS 1524. Operation proceeds from step 1818 to step 1820.

In step 1820, the SAS 1524 receives the release channel(s) message 1816. Operation proceeds from step 1820 to steps 1822 and 1824.

In step 1822, the SAS 1524 releases the channel(s) identified in the release channel(s) message 1816 so that the channel(s) are once again available for use by other entities (e.g., other CBSDs). The channel(s) which are released are the channel(s) which had been granted and authorized for use to the ghost CBSD.

In step 1824, the OSS/Domain Proxy 1522 generates de-register ghost CBSD message 1826. The de-register ghost CBSD message 1826 includes in some embodiments an identifier assigned by the SAS 1524 to the ghost CBSD when the OSS/Domain Proxy 1522 registered the ghost CBSD with the SAS 1524. Operation proceeds from step 1824 to step 1828.

In step 1828, the OSS/Domain Proxy 1522 transmits the de-register ghost CBSD message 1826 to the SAS 1524. Operation proceeds from step 1828 to step 1830.

In step 1830, the SAS 1524 receives the de-register ghost CBSD message 1826 from the OSS/Domain Proxy 1522. Operation proceeds from step 1830 to step 1832.

In step 1832, the SAS 1524 de-registers the ghost CBSD and the method comes to a conclusion.

In some embodiments, a combination of spectrum channel grants of licensed (e.g., PAL spectrum) and unlicensed spectrum (GAA spectrum) is obtained for the sidelink communications session. The PAL spectrum channels being used by the first and second user equipment unless or until there is too much interference on the PAL spectrum channels at which time the first and second user equipment devices fall back to using the GAA spectrum for the sidelink communications session.

While the method 1500 illustrated in FIG. 15, has been explained with respect to a single session between two user equipment devices in which out of coverage area sidelink communications are utilized, the method may be, and in some embodiments is, implemented for a session between a plurality of user equipment devices, e.g., mobile devices, in excess of two which utilize out of coverage area sidelink communications. Additionally, multiple out of coverage area sidelink communications sessions between different user equipment devices (e.g., mobile devices) can be implemented simultaneously.

It should be understood that the operation(s), step(s), and function(s) described in connection with network core 1516 may be implemented by network entities such as network equipment device(s), network service function(s) and/or other components or systems located in the core network 1516.

In some embodiments of method 1500, the transmission power estimates for the UE sidelink communications session are provided by the pathloss calculator 1520 to the geo-fencing proximity analyzer 1518. These transmission power estimates are provided as transmission power level instructions for the UE 1 and UE 2 equipment devices and are provided to the UE 1 and UE 2 equipment devices via the first wireless network. In some embodiments, the geo-fencing proximity analyzer 1518 makes the determination of what type of spectrum to utilize for the sidelink communications based on the location of UE 1, location of UE 2, location of coverage area of the second wireless network, transmission power level and/or UE transmission power level instructions provided by the pathloss calculator 1520. In some embodiments, the type of spectrum includes spectrum licensed to the second wireless network, unlicensed spectrum or a combination of spectrum licensed to the second wireless network and unlicensed spectrum. In some embodiments, the type of spectrum further includes shared and unshared spectrum as an additional distinction (e.g., shared unlicensed spectrum, shared licensed spectrum, unshared licensed spectrum). In some embodiments, the types are: CBRS GAA spectrum, CBRS PAL spectrum, and CBRS PAL and GAA spectrum. In some embodiments, the sidelink determination request message is a session initiation request message that is forwarded from the core network 1516 to the geo-fencing proximity analyzer 1518.

FIG. 3 illustrates as previously discussed includes an exemplary table 300 which includes a listing of the second user equipment devices and their corresponding identifier (e.g., IMSI identifier, device type (e.g., 3GPP UE category) and UE capabilities. Table 300 is described in greater detail below. The exemplary table 300 may be included in memory in one or more components in the first and/or second wireless network and/or in a storage device such as a data base system or data repository accessible from various nodes, devices, and/or components of the first and/or second wireless network such as for example, the geo-fencing proximity analyzer also referred to as a sidelink proximity analyzer and the pathloss calculator. Table 300 includes columns 302, 304, 306, and 308 and rows 310, 312, 314, 316, 318. The entries in row 308 are labels indicating the information contained in each column. Entries in column 302 are the user equipment device (row 310, entry 302) of a second wireless network (e.g., UE 1 1510 which is UE 1 202 of system 200, UE 2 1512 which is UE 2 204 of system 200, UE 3 206 of system 200 and UE X 208 of system 200). Entries in column 304 are identifiers (e.g., IMEI or IMSI) corresponding to the user equipment device of the same row. Entries in column 306 are device type (e.g., 3GPP UE category) corresponding to the user equipment device of the same row. Entries in column 308 are the UE capabilities for the user equipment device of the same row. The entries in row 312 correspond to the UE 1. The entries in row 314 correspond to UE 2. The entries in row 316 correspond to UE 3. The entries in row 318 correspond to UE X. For example, UE 1 (entry row 312, column 302) has IMSI 1 as its identifier (entry row 313, column 304), is a UE category 19 device type (entry row 312, column 306) and has UE 1 capabilities (entry row 312, column 308). The UE 1 capabilities is a representative entry. The UE 1 capabilities included in the table may, and in some embodiments does include, transmission capabilities (uplink and downlink data rates), operating frequency range capabilities (e.g., operates in cellular and CBRS frequency spectrum range), number of antennas, type of antennas, processing capabilities, power transmission capabilities, battery capabilities, wireless protocols supported. In some embodiments, the UE capabilities also include manufacturer, model, hardware version and/or software version from which other capabilities can be derived. In some embodiments, the manufacturer, model, hardware version and/or software version information is included in a separate column of the table (e.g., a UE information column)

Signaling diagram/method 1400 illustrates the steps and signaling between an OSS/Domain Proxy 1401 and an SAS 1402 for identifying and obtain spectrum which is available for use for a sidelink communications session as well as relinquishing the spectrum upon termination of the sidelink communications session. The signaling/method 1400 may be, and in some embodiments is utilized and employed by system 200, system 1100, system 1300 and/or OSS/Domain 1522 and SAS 1524. While it will be readily understood that additional steps and signaling are performed in connection with communicating information, messages, and packets between devices, the method 1400 focuses on and discusses the steps and signaling for understanding the invention. Elements or steps with the same reference numbers used in different figures are the same or similar and those elements or steps will not be described in detail again.

The method 1400 begins in start step 1403. Operation proceeds from start step 1403 to step 1404. In step 1404, the OSS/Domain Proxy 1401 receives a request for spectrum for a sidelink communications session, e.g., a request from a sidelink proximity analyzer. The request typically will include location information based on the location of one or more of the user equipment devices for which the sidelink communications session is to be established. In some embodiments, the request may also identify the type of spectrum (e.g., licensed spectrum such as PAL spectrum or unlicensed spectrum such as GAA spectrum) and an amount of spectrum (e.g., number of channels and channel width and/or bandwidth). Operation proceeds from step 1404 to step 1405.

In step 1405 in response to receiving the request for spectrum for a sidelink session, the OSS/Domain Proxy 1401 generates and communicates a ghost CBSD registration request message 1406 to SAS 1408. The ghost CBSD is a fictious non-existent CBSD which will appear to the SAS 1402 as an actual CBSD requesting to be registered. Operation proceeds from step 1405 to step 1408.

In step 1408, the SAS 1402 receives the ghost CBSD registration request 1406. Operation proceeds from step 1408 to step 1410. In step 1410, the SAS performs the registration of the ghost CBSD and assigns a registration ID to the ghost CBSD. The ghost CBSD includes the registration ID in future messages sent to the SAS 1402. Operation proceeds from step 1410 to step 1412. In step 1412, the SAS 1402 generates and communicates a successful registration response message 1414 to the OSS/Domain Proxy 1401 indicating that the ghost CBSD has been successfully registration and providing the registration ID for the ghost CBSD. Operation proceeds from step 1412 to step 1416. In step 1416, the OSS/Domain Proxy 1401 receives and processes the message 1414 determining the ghost CBSD has been successfully registered. Operation proceeds from step 1416 to step 1418.

In step 1418, the OSS/Domain Proxy 1401 generates and communicates the a ghost CBSD spectrum inquiry request message 1420 to the SAS 1402. The spectrum inquiry request message 1420 includes the registration ID for the ghost CBSD as well as request for information on available spectrum. The location of the ghost CBSD is either provided in the registration information when the ghost CBSD was registered or in the spectrum inquiry. In some embodiments, the spectrum inquiry request message 1420 identifies the type of spectrum (licensed (e.g., PAL) spectrum and/or unlicensed spectrum (GAA spectrum). In some embodiments, the spectrum inquiry request message 1420 also includes an amount of spectrum (e.g., number of channels and channel width and/or bandwidth). Operation proceeds from step 1418 to step 1422. In step 1422, the SAS 1402 receives and processes the spectrum inquiry request 1420. Operation proceeds from step 1422 to step 1424. In step 1424, the SAS 1402 determines the location for which the spectrum is to be used (e.g., based on the location of the ghost CBSD included in the registration information for the ghost CBSD) or from information contained in the spectrum inquiry. Upon determining the location, the SAS 1402 performs a channel availability assessment based on the information included in the request and determined location. Operation proceeds from step 1424 to step 1426. In step 1426, the SAS 1402 identifies the best available spectrum channels (i.e., spectrum channels with least amount of interference meeting the criteria (e.g., number of channels, spectrum type, spectrum amount) included in the spectrum inquiry. Operation proceeds from step 1426 to step 1428. In step 1428, the SAS 1402 generates and communicates spectrum inquiry response message 1430 to OSS/Domain Proxy 1401. The spectrum inquiry response message 1430 includes the identified available spectrum channels and/or the best available spectrum channels. In some embodiments, the spectrum inquiry response also includes information about the available spectrum channels and/or channels in use in the area (e.g., heat map of spectrum usage in the location of the ghost CBSD). Operation proceeds from step 1428 to step 1432. In step 1432, the OSS/Domain Proxy 1401 receives and processes the spectrum inquiry response message 1430.

Operation proceeds from step 1432 to step 1434. In step 1434, the OSS/Domain Proxy 1401 determines which spectrum channels of the identified available spectrum channels in the spectrum inquiry response to request be granted for use for the sidelink communications session. The determination may be, and in some embodiments is, based on the type of spectrum (e.g., licensed and/or unlicensed), quality of spectrum (amount of interference) and amount of spectrum. Operation proceeds from step 1434 to step 1436. In step 1436, the OSS/Domain Proxy 1401 generates and communicates ghost CBSD spectrum grant request message 1438 to the SAS 1402. The ghost CBSD spectrum grant request message includes the registration ID of the ghost CBSD and includes a request for a spectrum grant identifying the spectrum channels determined in step 1434. Operation proceeds from step 1436 to step 1440. In step 1440, the SAS 1402 receives the spectrum grant request message 1438 from the OSS/Domain Proxy 1401. Operation proceeds from step 1440 to step 1442. In the step 1442, the OSS/Domain Proxy 1401 determines if the requested spectrum is available and when it is available grants the requested spectrum to the ghost CBSD (e.g., by allocating the granted spectrum channels to the ghost CBSD registration ID and indicating that these allocated spectrum channels are now assigned to the ghost CBSD). The SAS 1402 assigned a grant ID to the spectrum grant for tracking purposes. In this example, the requested spectrum channels are available and are granted to the ghost CBSD by the SAS 1402. Operation proceeds from step 1442 to step 1444. In step 1444, the SAS 1402 generates and communicates the spectrum grant response message 1146 to the OSS/Domain Proxy 1401. The spectrum grant response message 1446 indicates that the spectrum channels requested have been granted to the ghost CBSD and provides the grant ID corresponding to the spectrum grant. Operation proceeds from step 1444 to step 1448. In step 1448, the OSS/Domain Proxy 1401 receives and processes the spectrum grant response message 1446 determining that the spectrum channels have been successfully obtained (i.e., via a spectrum grant from the SAS) for use for the sidelink communications session. Operation proceeds from step 1448 to step 1450.

In step 1450, the OSS/Domain Proxy 1401 communicates spectrum grant information which identifies the spectrum channels granted for use for the ghost CBSD which is to be used for the sidelink communications session to the entity from which the request for spectrum for a sidelink session was received in step 1404 which in this example is the geo-fencing proximity analyzer. Operation proceeds from step 1450 to step 1451. In step 1451, the OSS/Domain 1401 receives a notification from the entity (e.g., geo-fencing proximity analyzer) which requested the spectrum for the sidelink session that the sidelink session has terminated. Operation proceeds from step 1451 to step 1452.

In step 1452, the OSS/Domain Proxy 1401 generates and communicates ghost CBSD relinquish spectrum grant request message 1454 to the SAS 1402. The ghost CBSD relinquish spectrum grant request message 1454 includes the registration identifier for the ghost CBSD and the grant ID included in the spectrum grant response identifying the spectrum grant which is being relinquished. Operation proceeds from step 1452 to step 1456. In step 1456, the ghost CBSD relinquish spectrum grant request message 1454 is received and processed by SAS 1402. Operation proceeds from step 1456 to step 1458. In step 1458, the SAS 1402 releases the spectrum identified by the spectrum grant Id and de-allocates the spectrum from being assigned to the ghost CBSD. The spectrum is once again designated as available. Operation proceeds from step 1458 to step 1460. In step 1460, the SAS 1402 generates and communicates spectrum grant relinquish response message 1462 to the OSS/Domain Proxy 1401. The spectrum grant relinquish response message 1462 indicates that the spectrum grant has been successfully relinquished and is no longer granted to the ghost CBSD. Operation proceeds from step 1460 step 1464. In step 1464, the OSS/Domain Proxy 1401 receives and processes the spectrum grant relinquish response message 1462 and determines that the spectrum grant has been successfully relinquished. Operation proceeds from step 1464 to step 1466.

In step 1466, the OSS/Domain Proxy 1401 generates and communicates CBSD ghost de-registration request message 1468 to the SAS 1402. The ghost CBSD de-registration request message 1468 includes the ghost CBSD registration ID and indicates that the ghost CBSD is to be de-registered indicating it is no longer. Operation proceeds from step 1466 to step 1470. In step 1470, the SAS 1402 receives and processes the ghost CBSD de-registration request message 1468. Operation proceeds from step 1470 to step 1472. In step 1472, the SAS 1402 de-registers the ghost CBSD. Operation proceeds from step 1472 to step 1474. In step 1474, the SAS 1402 generates and communicates the ghost CBSD de-registration response message 1476 to the OSS/Domain Proxy 1401. The ghost CBSD de-registration response message indicates that the ghost CBSD has been successfully de-registered. Operation proceeds from step 1474 to step 1478. In step 1478, the OSS/Domain Proxy 1401 receives and processes the ghost CBSD de-registration response message 1476 and determines that the ghost CBSD has been successfully de-registered by the SAS 1402. The steps of method 1400 are repeated when another request for spectrum for a sidelink session is received by the OSS/Domain 1401.

FIG. 4 is a drawing of an exemplary wireless base station 400 in accordance with an exemplary embodiment. The wireless base station 400 may be, and in some embodiments is an eNodeB, gNodeB, or Citizens Broadband Radio Service Device (CBSD) 400, in accordance with an exemplary embodiment. Exemplary wireless base station 400 includes a wireless interfaces 404, a network interface 405, e.g., a wired or optical interface, a processor 406, e.g., a CPU, an assembly of hardware components 408, e.g., an assembly of circuits, and I/O interface 410, and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455, K being an integer greater than 2. The wireless interfaces are used to communicate with the wireless devices, e.g., user equipment device, e.g., DSDS user equipment devices. The first wireless interface 424 is used for example to communicate with a first user equipment device using a first spectrum band. The second wireless interface can be used to communicate with a second user equipment device using a second spectrum band. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a user equipment device. Wireless transmitter 440 is coupled to a plurality of wireless transmit antennas (transmit antenna 1443, . . . , transmit antenna N 445) via which the wireless base station 400 can transmit signals to other wireless communications devices including a second wireless communications device, e.g., a user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device, e.g., CBRS UE device. The wireless base station network interface 405 may be coupled to a cable modem, a core network, other networks, e.g., internet, or other wireless base stations.

Memory 412 includes an assembly of components 414, e.g., an assembly of software components, and data/information 416. Data/information 416 includes UE information 460, sidelink communications session information 462, and base station operational information 464. In some embodiments, the UE information 460 includes for the UEs in the base station's coverage: UE identification information, UE location information (e.g., UE GPS coordinates), UE device type information, UE LTE category information, UE capabilities, UE session information such as session state information, session initiation request information, session type information. In some embodiments, the sidelink communications session information 462 includes information received from sidelink proximity analyzer to be used by user equipment devices to establish a direct to device sidelink communications session, e.g., spectrum (i.e., channel(s) to be used for the sidelink communications session). In some embodiments, the base station operational information 464 includes the information necessary to operate as a base station such as spectrum on which to communicate to with user equipment devices. For base stations which are CBSDs GAA and/or PAL spectrum granted by an SAS to the CBSD.

While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example a plurality of wireless devices such as user equipment devices. In some embodiments, one or more of the wireless base stations discussed and/or shown in the Figures and/or in connection with the methods discussed herein are implemented in accordance with the wireless base station 400. For example, the base stations and CBSDs of system 100 of FIG. 1, the base stations and CBSDs of system 200 shown in FIG. 2, system 1100 shown in FIG. 11, system 1300 shown in FIG. 13, and BS 1 1514 shown in FIG. 15.

Figure 5:
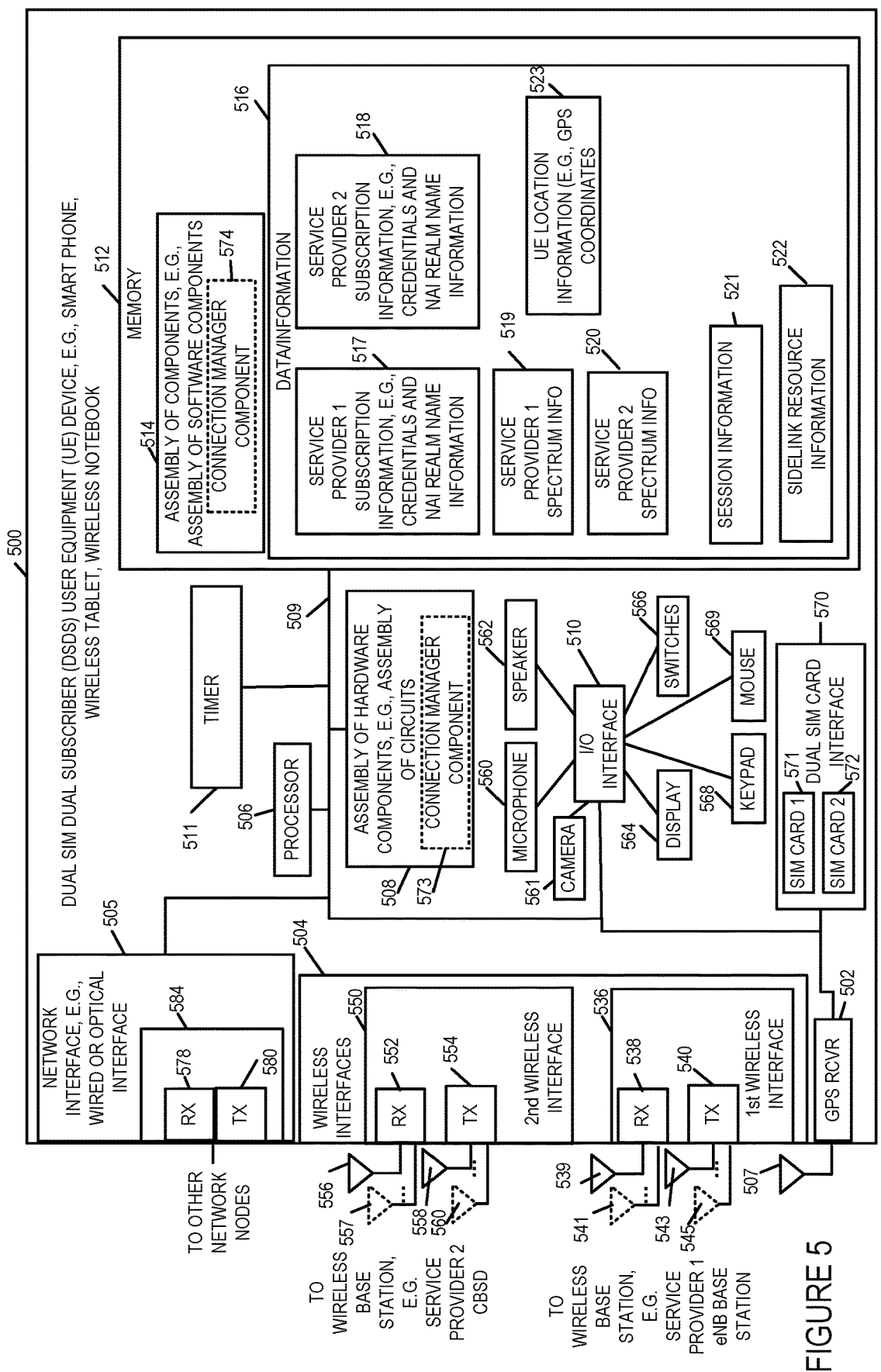
FIG. 5 illustrates details of an exemplary Dual Subscriber Identity Module Dual Subscriber (DSDE) User Equipment (UE) device, e.g., a mobile device, cell phone, smartphone, wireless tablet, laptop, wireless notebook, in accordance with one embodiment of the present invention.

FIG. 5 is a drawing of an exemplary user equipment (UE) device 500 in accordance with an exemplary embodiment. UE device 500 is, e.g., a wireless device, e.g., a mobile device such as a cell phone, a smart phone, wireless tablet or wireless notebook. UE device 500 is a dual SIM dual subscription device that is enabled to communicate with different wireless base stations utilizing different wireless spectrum and/or wireless protocols, e.g., 5G wireless protocol, CBRS wireless protocol or cellular wireless protocol. Exemplary UE device 500 includes wireless interfaces 504, a network interface 505, a processor 506, e.g., a CPU, an assembly of hardware components 508, e.g., an assembly of circuits, and I/O interface 510, a GPS receiver 502 coupled to GPS receive antenna 507, a timer 511, e.g., a reference clock, a dual SIM card interface 570 including a first SIM card, SIM card 1 571, corresponding a first service provider, and a second SIM card, SIM card 2 572 corresponding to a second service provider, and memory 512 coupled together via a bus 509 over which the various elements may interchange data and information. UE device 500 further includes a microphone 560, camera 561, speaker 562, a display 564, e.g., a touch screen display, switches 566, keypad 568 and mouse 569 coupled to I/O interface 510, via which the various I/O devices (560, 561, 562, 564, 566, 568, 569) may communicate with other elements (502, 504, 505, 506, 508, 512, 570) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584. In some embodiments, the assembly of hardware components 508 includes a connection manager component 573.

Wireless interfaces 504 include a plurality of wireless interfaces including first wireless interface 536 and a second wireless interface 550. The first wireless interface 536 is, e.g., used to communicate with wireless base stations in a first service provider's communications network, e.g., cellular, e.g., gNB tower base stations of the first service provider's communications network, e.g., using a first set of spectrum and a first communications protocol corresponding to the first service provider. The second wireless interface 550 is, e.g., used to communicate with a device, e.g., a CBSD base station, of a second service provider's communications network. For example, the second wireless interface 550 is used to communicate with a CBDS base station of the second service. The second wireless interface is able to communicate using sidelink communications with another user equipment device using CBRS spectrum. The first wireless interface 536 includes wireless receiver 538 and a wireless transmitter 540. In some embodiments, receiver 538 and transmitter 540 are part of a transceiver. In various embodiments, the first wireless interface 536 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., a cellular wireless base station of the first service provider. Wireless transmitter 540 is coupled to a plurality of wireless transmit antennas (transmit antenna 1543, . . . , transmit antenna N 545) via which the user equipment device 500 can transmit signals to other wireless communications devices including a cellular wireless base station of the first service provider. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including, e.g. a CBSD base station of a second service provider. Wireless transmitter 554 is coupled to one or more wireless transmit antennas (transmit antenna 1 558, . . . , transmit antenna N 560) via which the user equipment device 500 can transmit signals to other wireless communications devices including, e.g. a CBSD of a second service provider or another user equipment device. The user equipment device network interface 505 may be coupled to LAN or WAN networks or routers so that the user equipment device can also obtain services via a hardwired connection in addition to through the wireless interfaces, e.g. when the UE device 500 is at a location where such a connection is possible.

Memory 512 includes an assembly of components 514, e.g., an assembly of software components, and data/information 516. In some embodiments, the assembly of software components 514 includes a connection manager component 574. Data/information 516 includes service provider 1 subscription information 517, e.g. credentials and NAI realm information corresponding to service provide 1, service provider 2 subscription information 518, e.g. credentials and NAI realm information corresponding to service provider 2. Data/information 516 further includes service provider 1 spectrum information 519 (e.g., spectrum on which the service provider 1 operates), service provider 2 spectrum information (e.g., CBRS spectrum on which service provider 2 operates), session information 521 (session type, session endpoint addresses), sidelink resource information (e.g., channel(s) to be used for an out of coverage area sidelink communications session with another UE), UE location information (e.g., GPS coordinates received from the GPS receiver) 523.

In some embodiments, the user equipment devices discussed in the Figures and/or in connection with the embodiments of the present invention are implemented in accordance with user equipment device 500. For example, UE A 102, UE B 104, UE C 106, UE D 108 of system 100; UE 1 202, UE 2 204, UE 3 206, UE X 208 of systems 200, 1100, and 1300; UE 1 1510 and UE 2 1512 in the system shown in FIG. 15 may be, and in some embodiments are, implemented in accordance with user equipment device 500.

Figure 6:
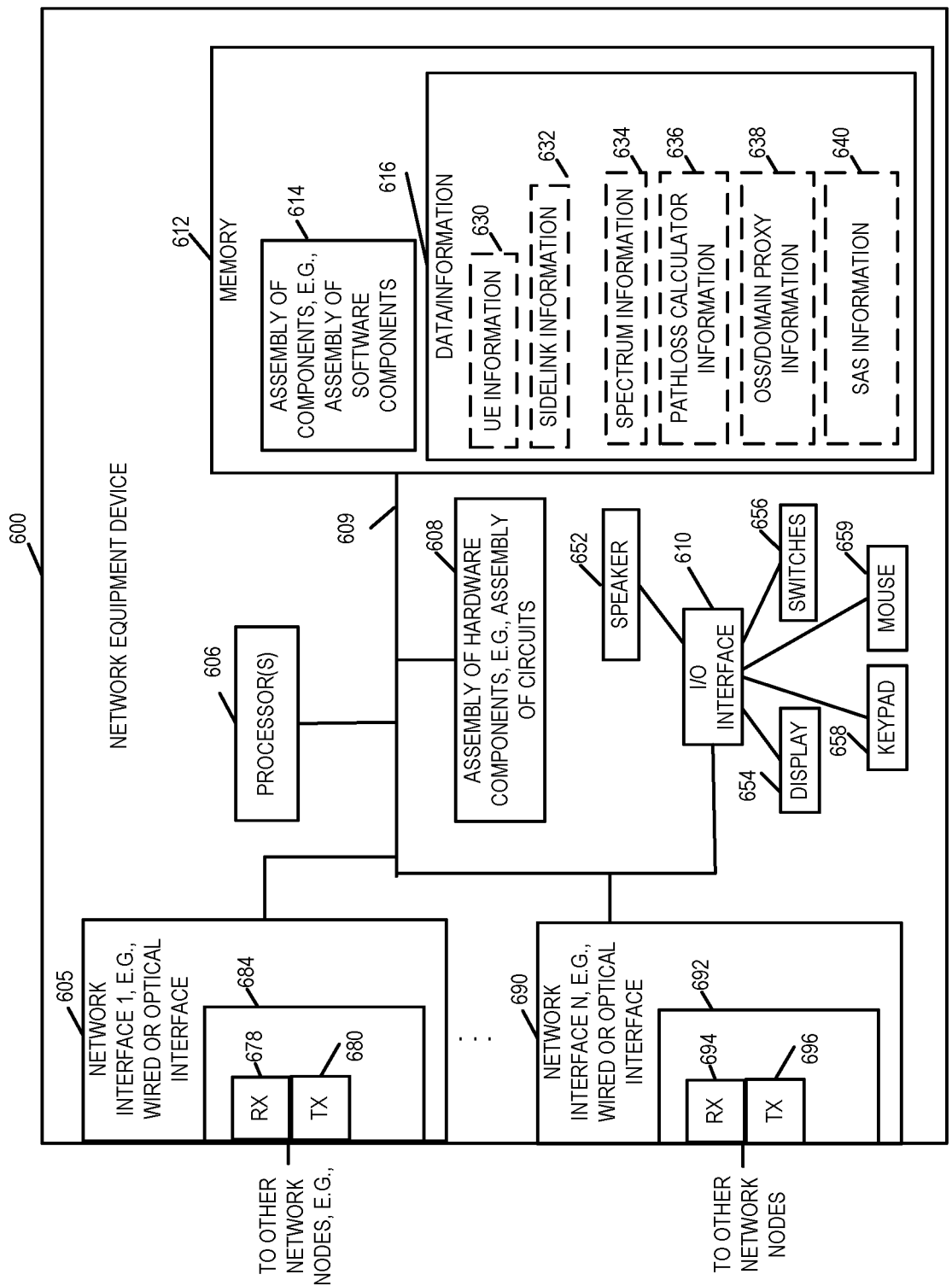
FIG. 6 illustrates details of an exemplary network equipment device, e.g., User Equipment data forwarding function node/device, Geo-Fencing/Proximity Analyzer (also referred to as a sidelink proximity analyzer), pathloss calculator, Operating Service Systems (OSS)/Domain Proxy, in accordance with one embodiment of the present invention.

FIG. 6 is a drawing of an exemplary network equipment device, server or node, e.g., UE information forwarding device, sidelink proximity analyzer device, pathloss calculator device, an OSS/Domain Proxy, an SAS, NSSF, AUSF, UDM, AMF, SMF, PCF, AF, UPF in accordance with an exemplary embodiment. The network equipment device 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The network equipment device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the network equipment device 600. Network interface 605 includes a receiver 678 and a transmitter 680. The network interface 605 is typically used to communicate with other devices, e.g., a wireless base station, core network equipment, sidelink proximity analyzer, pathloss calculator, OSS/Domain Proxy, databases, SAS. In some embodiments, receiver 678 and transmitter 680 are part of a transceiver 684. Network interface 690 includes a receiver 694 and a transmitter 696. The network interface 690 is typically used to communicate with other devices, e.g., other network nodes in a core, etc. In some embodiments, receiver 694 and transmitter 696 are part of a transceiver 692. Memory 612 includes an assembly of component 614, e.g., an assembly of software components, and data/information 616. Data/information 616 includes UE information 630, sidelink information 632, spectrum information 634, pathloss calculator information 636, OSS/Domain Proxy information 638 and SAS information 640. The specific information included in data/information 616 depends on the specific network equipment device implemented. For example, UE information including UE identification information, UE location information, UE session request information, UE device type information, UE category type information, UE capability information, are included in the network equipment device when the network equipment device 600 is implemented as a sidelink proximity analyzer. Sidelink information 632 includes information e.g., spectrum resource grant information for a sidelink communications session, ghost CBSD ID, spectrum grant ID, sidelink state information. Spectrum information includes CBRS spectrum (e.g., PAL and/or GAA channel information) allocated to sidelink communications sessions. Pathloss calculator information includes formulae for determining pathloss between two locations, digital terrain data, morphology data. OSS/Domain Proxy information 638 includes information for emulating CBSDs or implementing ghost CBSDs for communicating with SAS and obtaining CBRS spectrum grants for use in UE to UE sidelink communications sessions. SAS information 640 includes information tracking of spectrum assignment and usage within the CBRS network.

In some embodiments, the network equipment devices discussed in the Figures and/or in connection with the embodiments of the present invention described are implemented in accordance with network equipment device 600. For example, network equipment devices in the core networks (e.g., NSSF, AUSF, UDM, AMF, SMF, PCF, AF, UPF), UE information forwarding device, sidelink proximity analyzer device, pathloss calculator device, OSS/Domain Proxy, and SAS, in FIGS. 1, 2, 11, 13, and 15 may be, and in some embodiments are, implemented in accordance with the network equipment device 600.

Figure 7:
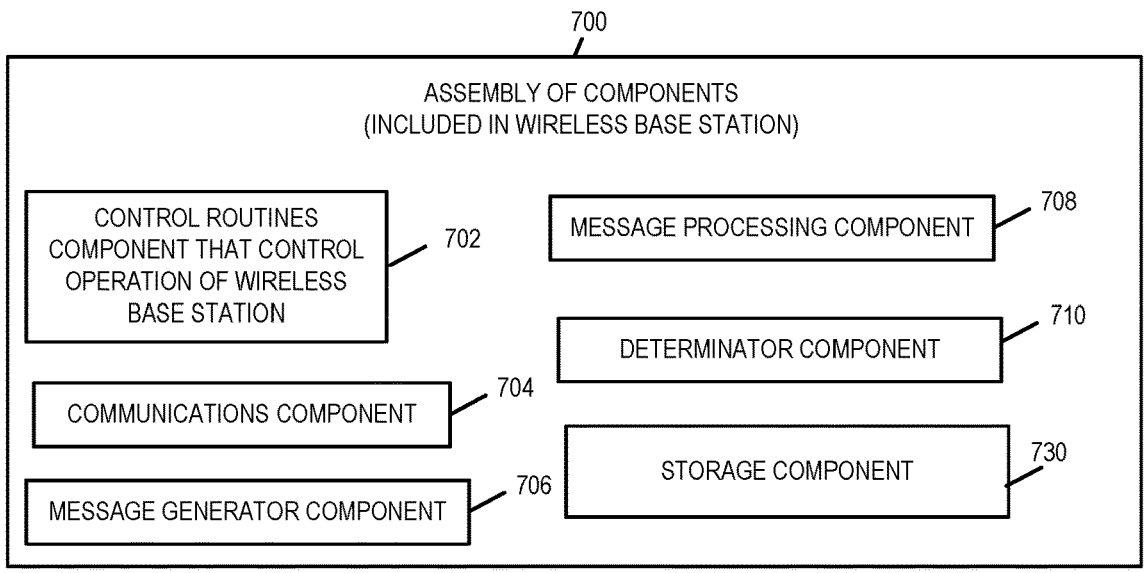
FIG. 7 illustrates an exemplary assembly of components for a wireless base station in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a determinator component 710, and a storage component 714.

The control routines component 702 is configured to control operation of the wireless base station (e.g., gNodeB, eNodeB, or a CBSD).

The communication component 704 is configured to handle communications, e.g., transmission and reception of messages, and protocol signaling for the wireless base station (e.g., communications with user equipment devices and components, functions, devices, and servers in its core network).

The message generator component 706 is configured to generate messages for transmission to other devices, e.g., request messages, response messages, notification messages, messages for sharing information, e.g., UE identification, location and session initiation request information, sidelink communications resource information (e.g., spectrum channels and power transmission instructions), communications messages with network equipment devices, communications messages with user equipment devices. In some embodiments, the message generator component 706 is a sub-component of the communications component 704.

The message processing component 708 is configured to process messages received from other devices and implement operations in response to instructions and/or information included in the processed message, e.g., processing and implementing operations in connection with messages from user equipment devices, messages from network equipment devices. In some embodiments, the message processing component 708 is a sub-component of the communications component 704.

The determinator component 710 is configured to make determinations and decisions for the wireless base station including for example: determining what UE information (e.g., location information and session information to communicate with network equipment in its core network) and when to communicate the information (e.g., in compliance with a reporting schedule).

The storage component 712 is configured to manage the storage, and retrieval of data and/or instructions to/and from memory, buffers in memory, hardware buffers and/or storage device coupled and/or connected to the wireless base station.

Figure 8:
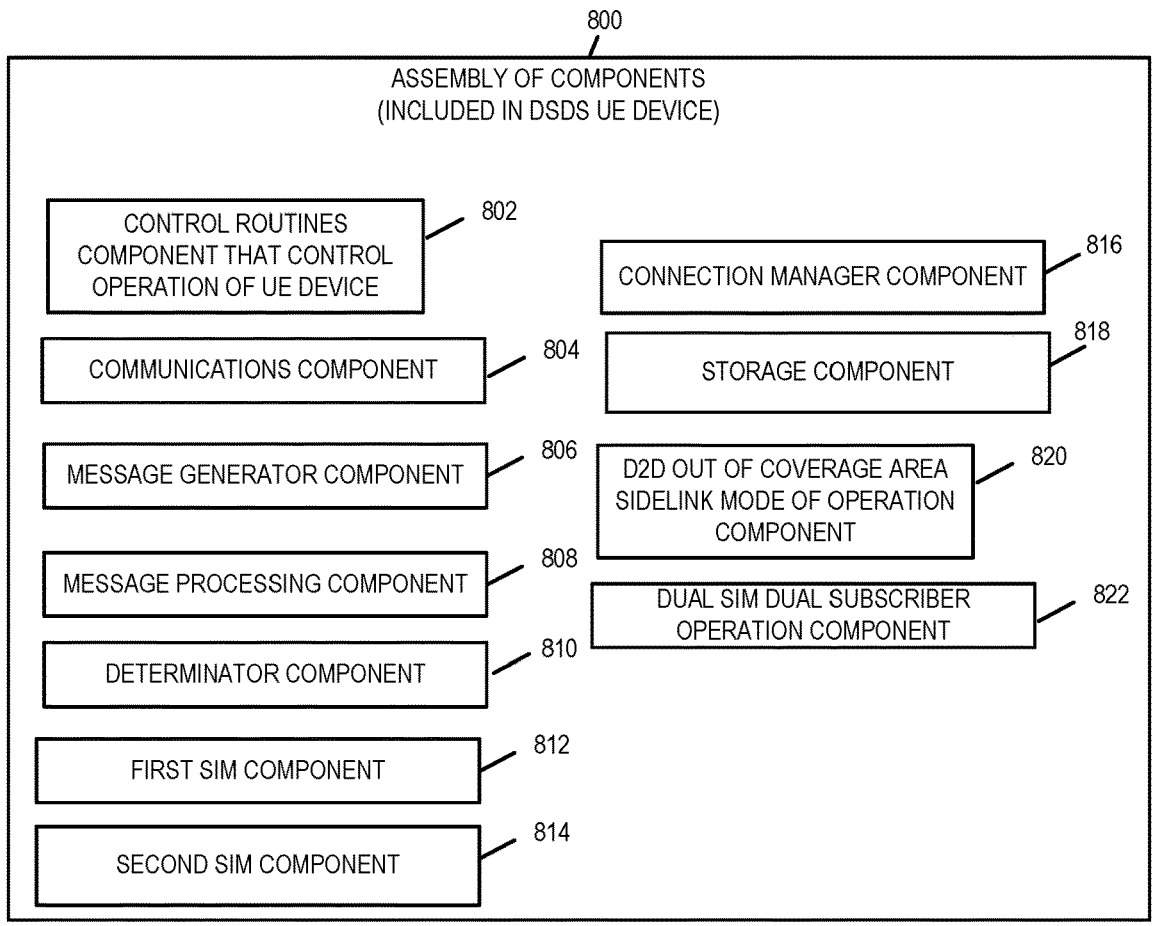
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a first SIM component 812, a second SIM component 814, a connection manager component 816, a storage component 818, a D2D out of coverage area sidelink mode of operation component 820, and a dual SIM dual subscriber mode of operation component 822.

The control routines component 802 is configured to control operation of the UE.

The communications component 804 is configured to handle communications, e.g., receipt and transmission of signals and provide protocol signal processing for one or protocols for the UE.

The message generator component 806 is configured to generate messages for transmission to wireless base stations (e.g., CBSD devices, gNodeBs, eNodeBs) such as messages including request and response messages, etc. In some embodiments, the message generator component 806 is a sub-component of the communications component 804.

The message processing component 808 processes received messages, e.g., requests for information. In some embodiments, the message processing component 808 is a sub-component of the communications component 804.

The determinator component 810 makes determination for the user equipment devices such as for example, determining to implement out of coverage area sidelink device to device communications operations in response to messages received identifying spectrum channels for sidelink communications, determining GPS coordinates for the UE, determining to report the GPS coordinates to wireless base station to which it is connected.

The first SIM component 812 is configured to store Subscriber Identity Information, e.g., a first set of credentials, for obtaining access to a first service provider/operator's wireless network.

The second SIM component 814 is configured to store Subscriber Identity Information, e.g., a second set of credentials, for obtaining access to a second service provider/operator's wireless network.

The connection manager component 816 is configured to manage the communications between the user equipment device and a first network and a second network including coordinating the off-load and/or handoff of calls from one network to the other network and the generation and sharing of UE location information.

The storage component 818 is configured to perform all operations in storing and retrieving information, e.g., credential information, location information, spectrum channel grant information and transmission power level instructions, session information, from memory and/or storage devices (e.g., SIMs) located in the user equipment device.

The D2D out of coverage area sidelink mode of operation component 820 is configured to operate the user equipment device in a device to device sidelink mode of operation where the UE communicates directly with another user equipment device using spectrum identified to the user equipment device. The user equipment device implementing device to device operations to discover, synchronize with and establish a communications session with another user equipment device (e.g., using 5G sidelink device to device communications procedures). The D2D out of coverage area sidelink mode of operation component 824 is configured to implement all operations for implementing an out of coverage area sidelink communications session with another user equipment device.

The dual SIM dual subscriber mode of operation component 822 is configured to implement all operations for operating as a dual subscriber in which the user equipment device utilizes both SIM cards to communicate with two different wireless base stations using two different subscriptions, e.g., simultaneously or switching back forth between the two different wireless base stations. This component includes the management of the signaling between the two wireless base stations. In some embodiments, the dual SIM dual subscriber mode of operation component is a sub-component of the communications component 804.

Figure 9:
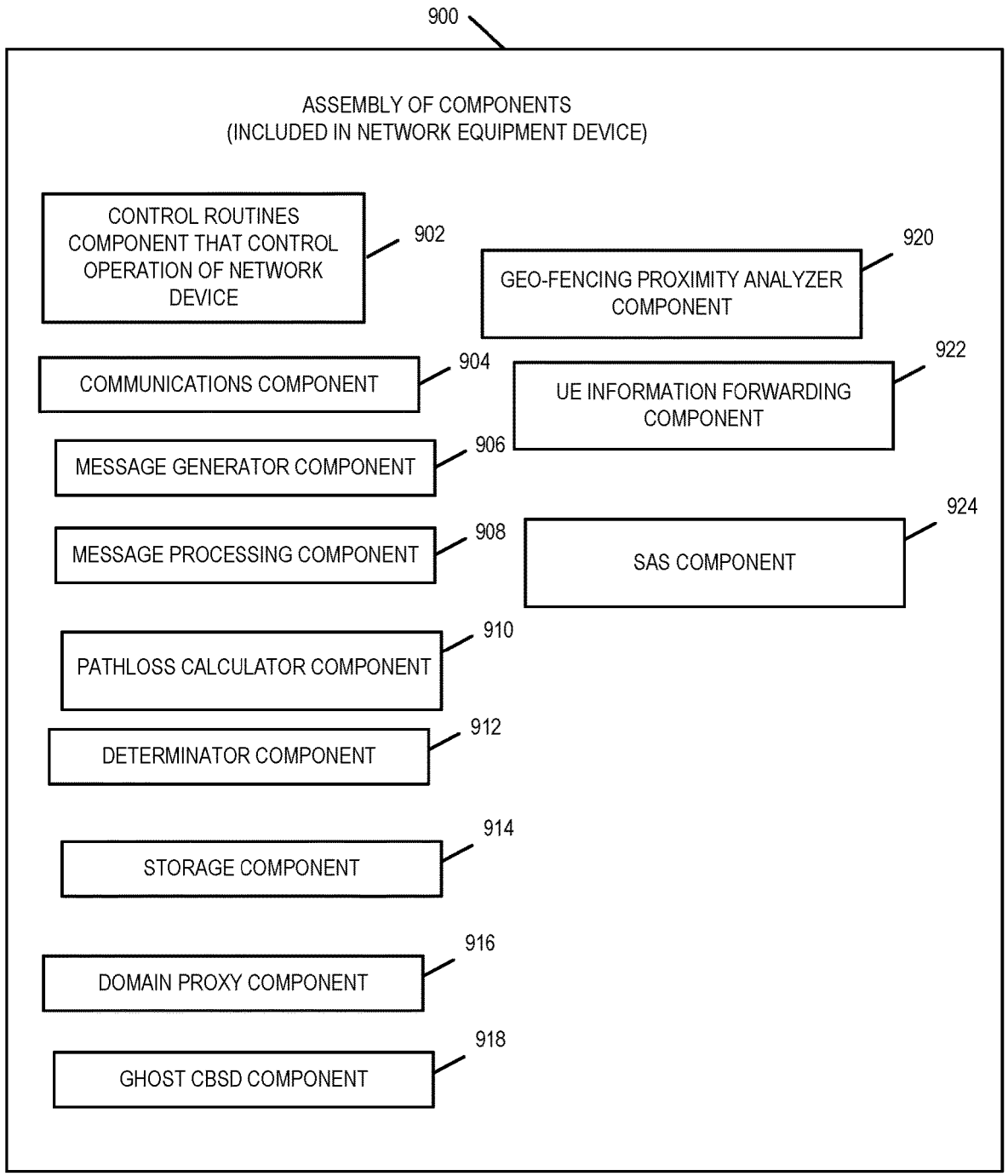
FIG. 9 illustrates an exemplary assembly of components for a network equipment device in accordance with an embodiment of the present invention.

FIG. 9 is a drawing of an exemplary assembly of components 900 which may be included in a network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the network equipment device 600, with the components controlling operation of the network equipment device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the network equipment device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a pathloss calculator component 910, determinator component 912, a storage component 914, a domain proxy component 916, a ghost CBSD component 918, a geo-fencing proximity analyzer component 920, a user equipment (UE) information forwarding component 922, and a Spectrum Access System component 924.

The control routines component 902 is configured to control operation of the network equipment device.

The communication component 904 is configured to handle communications, e.g., transmission and reception of messages, and protocol signaling for the network equipment device.

The message generator component 906 is configured to generate messages for transmission to other devices. Exemplary messages which are generate include request messages for spectrum sidelink sessions, base station (e.g., CBSD) registration request messages, base station registration response messages, base station spectrum inquiry request messages, spectrum inquiry response messages, base station spectrum grant request, spectrum grant response messages, base station relinquish spectrum grant messages, spectrum grant relinquish response messages, base station de-registration request messages, de-registration response messages, UE location reporting messages, sidelink session determination request messages, sidelink session determination response messages, pathloss determination request messages, pathloss determination response messages, notification messages that out of cover sidelink communications will not be used for a session, notification messages that sidelink communications will be used for a session, messages including information for establishing sidelink communications (e.g., spectrum channel information and transmission power instructions).

The message processing component 908 is configured to process messages and implement procedures/operations in response to messages or based on the contents of messages. This includes messages received from other devices, e.g., messages from wireless base stations, core network, UE information forwarding device, geo-fencing proximity analyzer, pathloss calculator, Domain Proxy or SAS, including spectrum inquiries, spectrum grant requests, notification messages, messages with UE information, session information, messages with instructions.

The pathloss calculator component 910 is configured to determine the pathloss between two user equipment devices and the transmission power required for a sidelink communications session between the two user equipment devices. The pathloss calculator in some embodiments is configured to determine the pathloss using one or more propagation models and/or formulae as well as the user equipment device location information and capabilities (e.g., transmission capabilities). In some embodiments, the pathloss calculator determines the regions that each user equipment device can communicate within given its capabilities and whether the regions of the two user equipment devices overlap or not (i.e., can the two user equipment devices communicate with one another or are they two far apart). In some embodiments, the pathloss calculator generates power instructions for the user equipment devices for a sidelink communications session to be established between the two user equipment devices. In some embodiments, the pathloss calculator is configured to use digital terrain data, building heights and morphologies in determining the pathloss between the two user equipment devices. The pathloss calculator component 910 is in some embodiments a sub-component of the geo-fencing proximity analyzer component 920.

The determinator component 912 is configured to make determinations and decisions for the network equipment device including for example: determining pathloss between two user equipment devices, determining if the distance between two user equipment devices is greater than or equal to a threshold distance, determining whether or not a session between two out of coverage area user equipment devices should be implemented as a sidelink communications session, determining the type of spectrum (licensed, unlicensed or combination of licensed and unlicensed spectrum is to be used for a sidelink communications session; determining transmission power instructions for user equipment devices which are to establish a sidelink communications session based on user equipment capabilities and pathloss; determining spectrum to identify in a spectrum grant request for a sidelink communications session, determining whether an out of coverage area sidelink communications session should be implemented between two user equipment devices based on the location of the user equipment devices, capabilities (e.g., transmission capabilities of the user equipment devices) and the session type (e.g., real-time or non real-time session) to be initiated; determining real-time session types are not to be implemented as sidelink communications sessions; determining non-real-time sessions between user equipment devices within a specified distance of one another and can transmit at a power level sufficient to reach one another are implement sidelink communications sessions; determine availability of spectrum; and determine spectrum grants.

The storage component 914 is configured to manage the storage, and retrieval of data and/or instructions to/and from memory, and/or storage devices coupled and/or connected to the network equipment device, e.g., storage and retrieval of a list of identification information for user equipment devices (IMSI or IMEI) and corresponding information about the UE including for example, UE category, UE capabilities (transmission capabilities), UE device type; storage and retrieval of spectrum information for managing a network's (e.g., CBRS network's spectrum) such as available spectrum (licensed and unlicensed) at a location or within an area), spectrum grant information; storage and retrieval of CBSD registration IDs and registration parameters (e.g., location information); storage and retrieval of UE location information and policy information; storage and retrieval of information for pathloss calculations (e.g., propagation models, digital terrain information, morphologies); storage and retrieval of session information (e.g., session initiation information).

The domain proxy component 916 is configured to interact on behalf of wireless base stations and geo-fencing proximity analyzers in its domain/network with an SAS managing resources (e.g., spectrum for a wireless network such as CBRS spectrum) of a wireless network. The domain proxy component 916 is further configured to register ghost base stations (e.g., CBSDs) with the SAS to identify and obtain spectrum for use in sidelink communications session between user equipment devices outside the coverage area of the actual base stations of the network. The domain proxy component 916 is configured to perform the operations described for the OSS/Domain Proxy 1401 in connection with signaling diagram/method 1400 and OSS/Domain Proxy 1522 in signaling diagram/method 1500.

The ghost CBSD component 918 is configured to emulate operations performed by an actual CBSD and/or on behalf of an actual CBSD by a domain proxy, e.g., sending request messages and responses as if the ghost CBSD is an actual CBSD for the purposes of interacting with an SAS to identify and/or obtain spectrum for use in a sidelink communication session between two user equipment devices. In some embodiments, the ghost CBSD component 918 is sub-component of the domain proxy component 916.

The geo-fencing proximity analyzer component 920 is configured to make determination for a wireless network whether session between user equipment devices should be implemented as sidelink communications sessions based on the locations of the user equipment devices and the user equipment devices capabilities. The geo-fencing proximity analyzer component 920 is further configured to determine what type of spectrum (e.g., licensed or unlicensed spectrum) the sidelink communications session should utilized based on potential interference with other user equipment devices operating within the coverage area of the wireless network. The geo-fencing proximity analyzer component 920 is further configured to obtain a spectrum grant and power instructions for UEs for sidelink communications sessions and to provide this information to the user equipment devices via a different wireless network than the wireless network of which the geo-fencing proximity analyzer component belongs.

UE information forwarding component 922 is configured to collect and provide UE information (e.g., location information and session information (e.g., session request and session termination information) from a first wireless network (e.g., first core network of the first wireless network) to a geo-fencing proximity analyzer belonging to a second wireless network. The UE information forwarding component 922 is also configured to relay session requests and sidelink session determination requests from the first wireless to the geo-fencing proximity analyzer of the second wireless network. The UE information forwarding component 922 is also configured to communicate sidelink communication session determination response message, spectrum grant information and power instructions for sidelink communications received from the geo-fencing proximity analyzer to the first core network.

The Spectrum Access System component 924 is configured to manage resources (e.g., spectrum) of a wireless network (e.g., CBRS network) including registering base stations, responding to spectrum inquiries, responding to spectrum grant requests, determining spectrum availability, evaluating spectrum based on location and interference, grant spectrum for use by base stations, suspend spectrum grants, release spectrum grants, de-register base stations. The SAS component 924 is configured in some embodiments to the perform the operations of a CBRS SAS.

The specific components of the assembly of components 900 included in any particular network equipment device may, and typically does vary depending on the specific network equipment device and the functionality required for the device and/or the operations the network equipment device is responsible for performing.

Various exemplary numbered embodiments illustrating different features of the present invention will now be discussed. The various features discussed may be used in variety of different combinations. It should be appreciated that not necessarily all embodiments include the same features and some of the features described below are not necessary but can be desirable in some embodiments. The numbered embodiments are only exemplary and are not meant to be limiting to the scope of the invention. The various method embodiments may be, and in some embodiments are, implemented on system 200 of FIG. 2.

List of Exemplary Numbered Method Embodiments

Method Embodiment 1. A communications method comprising: receiving from a first wireless network, by a geo-fencing proximity analyzer of a second wireless network, session request information (e.g., a sidelink determination request or a session initiation request from the first core network of first wireless network) for a session to be established between a first user equipment device and a second user equipment device, said first user equipment device and the second user equipment device both being located outside the coverage area of the second wireless network; and determining, by the geo-fencing proximity analyzer, whether or not a sidelink communications session is to be established between the first user equipment device and the second user equipment device based on: (i) the location of the first user equipment device, and (ii) the location of the second user equipment device.

Method Embodiment 2. The communications method of Method Embodiment 1, further comprising: when the geo-fencing proximity analyzer determines that a sidelink communications session is to be established between the first user equipment device and the second user equipment device, communicating spectrum channel grant information to the first user equipment device and the second user equipment device via the first wireless network, said spectrum channel grant information identifying one or more spectrum channels to be used for the sidelink communications session between the first user equipment device and the second user equipment device.

Method Embodiment 2A. The communications method of Method Embodiment 2, further comprising: communicating from the geo-fencing proximity analyzer to the first user equipment device and the second user equipment device via the first wireless network power transmission level instructions to be used for the sidelink communications session between the first user equipment device and the second user equipment device and an indication that the communications session between the first user equipment device and the second user equipment is be implemented as a sidelink communications session.

Method Embodiment 2B. The communications method of Method Embodiment 2A, further comprising: subsequent to receiving from the geo-fencing proximity analyzer the spectrum channel grant information and power transmission level instructions at the first user equipment device and the second user equipment device; establishing, by the first user equipment device and the second user equipment device, a sidelink communications session between the first user equipment device and the second user equipment device utilizing the spectrum channels identified in the received spectrum channel grant information.

Method Embodiment 3. The communications method of Method Embodiment 2, wherein the one or more spectrum channels are spectrum channels licensed to the second wireless network (e.g., CBRS PAL spectrum licensed to the second wireless network).

Method Embodiment 4. The communications method of Method Embodiment 2, wherein the one or more spectrum channels are unlicensed spectrum channels (e.g., CBRS GAA spectrum channels).

Method Embodiment 5. The communications method of Method Embodiment 2, wherein the one or more spectrum channels are determined by querying a Spectrum Access System for available spectrum channels in a first location, said first location being determined based on one or more of the following: (i) the first user equipment device location, and (ii) the second user equipment device location.

Method Embodiment 6. The communications method of Method Embodiment 2, further comprising: determining, by the geo-fencing proximity analyzer, the type of spectrum to be utilized for the sidelink communications session based on a determination of whether or not the sidelink communications session will cause interference with other user equipment devices operating within the coverage area of the second wireless network.

Method Embodiment 6A. The communications method of Method Embodiment 6, further comprising: when the determination is that the sidelink communications session will cause interference with other user equipment devices operating within the coverage area of the second wireless network determining that the type of spectrum to be used for the sidelink communications session is to be unlicensed spectrum (e.g., GAA spectrum).

Method Embodiment 6B. The communications method of Method Embodiment 6A, further comprising: when the determination is that the sidelink communications session will not cause interference with other user equipment devices operating within the coverage area of the second wireless network determining that the type of spectrum to be used for the sidelink communications session is to be licensed spectrum (e.g., PAL spectrum licensed by the second wireless network) or a combination of licensed and unlicensed spectrum (PAL spectrum licensed to the second wireless network as well as GAA spectrum).

Method Embodiment 6C. The communications method of Method Embodiment 6B, further comprising: making said determination of whether or not the sidelink communications session will cause interference with other user equipment devices operating within the coverage area of the second wireless network is based on transmission signal power required for the sidelink communications session.

Method Embodiment 6D. The communications method of Method Embodiment 6C, further comprising: determining transmission signal power required for the sidelink communications session based on a pathloss calculation for the communications signals for the sidelink communications session (e.g., signal attenuation as the signals transmitted from the first user equipment device travels to the second user equipment device and signals from the second user equipment device travel to the first user equipment device), said pathloss calculation being based on the location of the first user equipment device, the location of the second user equipment device, the capabilities of the first user equipment device, the capabilities of the second user equipment device, and one or more propagation models and/or pathloss calculation formulae.

Method Embodiment 7. The communications method of Method Embodiment 6, further comprising: making said determination of whether or not the sidelink communications session will cause interference with other user equipment devices operating within the coverage area of the second wireless network is based on transmission power levels for the first user equipment device and the second user equipment device determined based on a pathloss calculation.

Method Embodiment 8. The communications method of Method Embodiment 7, further comprising: requesting, by the geo-fencing proximity analyzer, power transmission level instructions for the first user equipment device and the second user equipment device from a pathloss calculator; receiving, by the geo-fencing proximity analyzer, said requested power transmission level instructions for the first user equipment device and the second user equipment device from the pathloss calculator; and communicating the power transmission level instructions to the first user equipment device and the second user equipment device via the first wireless network.

Method Embodiment 9. The communications method of Method Embodiment 1, wherein said determining, by the geo-fencing proximity analyzer, whether or not a sidelink communications session is to be established between the first user equipment device and the second user equipment device is further based on a transmission power signal level for the sidelink communications session, said transmission power signal level being determined using a pathloss calculation in which a range of communication of the first user equipment device and a range of communication of the second user equipment device is determined based on capabilities of the first user equipment device, capabilities of the second user equipment device, and one or more propagation models.

Method Embodiment 10. The communications method of Method Embodiment 2, further comprising: prior to communicating said spectrum channel grant information to the first user equipment device and second user equipment device, determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or (iii) a combination of spectrum licensed to the second wireless network and unlicensed spectrum (CBRS PAL+GAA spectrum).

Method Embodiment 10A. The communications method of Method Embodiment 10, wherein said determination by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g. GAA spectrum), or (iii) a combination of spectrum licensed to the second wireless network and unlicensed spectrum (CBRS PAL+GAA spectrum) is based on whether or not the sidelink communications session will cause interference with other user equipment devices operating in the cell coverage area of the second wireless network (e.g., will the sidelink communications at the power transmission level provided by a pathloss calculator cause interference with the communications of other user equipment devices operating within the cell coverage area of the second wireless network e.g., using the same licensed spectrum).

Method Embodiment 10B. The communications method of Method Embodiment 10, wherein said determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g. GAA spectrum), or (iii) a combination of spectrum licensed to the second wireless network and unlicensed spectrum (CBRS PAL+GAA spectrum) includes: determining that the spectrum for the sidelink communications session is to be spectrum licensed to the second wireless network when the user equipment power transmission level for the sidelink communications session is below or equal to a first threshold value and both the first user equipment device and the second user equipment device are not within a first distance from the cell coverage area of the second wireless network.

Method Embodiment 10C. The communications method of Method Embodiment 10, wherein said determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g. GAA spectrum), or (iii) a combination of spectrum licensed to the second wireless network and unlicensed spectrum (CBRS PAL+GAA spectrum) includes: determining that the spectrum for the sidelink communications session is to be unlicensed spectrum when the user equipment power transmission level for the sidelink communications session is above a first threshold value and either the first user equipment device or the second user equipment device is within a first distance from the cell coverage area of the second wireless network.

Method Embodiment 10D. The communications method of Method Embodiment 10, wherein said determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or iii) a combination of spectrum licensed to the second wireless network and unlicensed spectrum (CBRS PAL+GAA spectrum) includes: determining that the spectrum for the sidelink communications session is to be a combination of spectrum licensed to the second wireless network and unlicensed spectrum when the following criteria are met: (i) the user equipment power transmission level for the sidelink communications session is below or equal to a first threshold value, (ii) both the first user equipment device and the second user equipment device are not within a first distance from the cell coverage area of the second wireless network, and (iii) an amount of available licensed spectrum is below the required amount of spectrum for the sidelink communications session.

Method Embodiment 10E. The communications method of Method Embodiment 10, wherein prior to making said determination of whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or (iii) a combination of spectrum licensed to the second wireless network and unlicensed spectrum (CBRS PAL+GAA spectrum), requesting, by the geo-fencing proximity analyzer, a pathloss calculator determine a power transmission level required for the sidelink communications session between the first user equipment device and the second user equipment device.

Method Embodiment 10F. The communications method of Method Embodiment 10E, further comprising: determining, by the pathloss calculator, the pathloss (e.g., signal attenuation) for the sidelink communications session between the first user equipment device and the second user equipment device based on the location of the first user equipment device, the location of the second user equipment device, the transmission capabilities of the first user equipment device, the transmission capabilities of the second user equipment device, and one or more pathloss models.

Method Embodiment 10G. The communications method of Method Embodiment 10F, further comprising: determining, by the pathloss calculator, power level transmission instructions (e.g., UE transmit power levels) for the first user equipment device and the second user equipment device for the sidelink communications session.

Method Embodiment 11. The communications method of Method Embodiment 2, wherein the one or more spectrum channels are spectrum channels granted for use to a ghost base station of the second wireless network by a Spectrum Access System managing the spectrum of the second wireless network, said ghost base station (e.g., ghost CBSD) being a fictious non-existent base station registered with the Spectrum Access System as belonging to the second wireless network.

Method Embodiment 12. The communications method of Method Embodiment 1, wherein said determining, by the geo-fencing proximity analyzer, whether or not a sidelink communications session is to be established between the first user equipment device and the second user equipment device based on: (i) the location of the first user equipment device, and (ii) the location of the second user equipment device includes: determining whether the distance between the first user equipment device and the second user equipment device is less than a first threshold value.

Method Embodiment 13. The communications method of Method Embodiment 12 wherein said determination, by the geo-fencing proximity analyzer, of whether or not a sidelink communications session is to be established between the first user equipment device and the second user equipment device is further based on one or more of the following: device type of the first user equipment device, device type of the second user equipment device, capabilities of the first user equipment device, capabilities of the second user equipment device, type of communications session to be established.

Method Embodiment 13A. The communications method of Method Embodiment 13, wherein said determination, by the geo-fencing proximity analyzer, of whether or not a sidelink communications session is to be established between the first user equipment device and the second user equipment device is further based on information (e.g., calculated and/or determined pathloss for the sidelink communication session between UE 1 and UE 2 (e.g., transmission signal attenuation from the first user equipment device to the second user equipment device) and/or user equipment device power transmission level required for the sidelink communication) received from a pathloss calculator regarding the sidelink communications session to be established between the first user equipment device and the second user equipment device.

Method Embodiment 14. The communications method of Method Embodiment 2 further comprising: identifying one or more available spectrum channels that can be used for the sidelink communications session between the first user equipment device and the second user equipment device; and obtaining one or more spectrum channel grants for the sidelink communications session from a Spectrum Access System managing the spectrum of the second wireless network, said one or more spectrum channel grants including said information identifying said one or more spectrum channels to be used for the sidelink communications session between the first user equipment device and the second user equipment device; and wherein said one or more spectrum channels to be used for the sidelink communications session are one or more of the prior identified available spectrum channels that can be used for the sidelink communications session between the first user equipment device and the second user equipment device.

Method Embodiment 15. The communications method of Method Embodiment 2, further comprising: registering by a Domain Proxy of the second wireless network a ghost base station with a Spectrum Access System which is managing the use of spectrum by the second wireless network, said ghost base station being a fictious non-existent base station; receiving at the Domain Proxy a registration identifier for the ghost base station from the Spectrum Access System; communicating a spectrum query from the Domain Proxy to the Spectrum Access System, said spectrum query including information (e.g., the registration identifier) indicating the query is from the ghost base station, said spectrum query requesting information on spectrum available for use by the ghost base station; receiving by the Domain Proxy information from the Spectrum Access System in response to the spectrum query, said information identifying spectrum available for use by the ghost base station (e.g., information identifying the best portions of available spectrum at the location of the ghost base station such as for example the available spectrum channel(s) with the least interference).

Method Embodiment 15A. The communications method of Method Embodiment 15, wherein said registering by a Domain Proxy of the second wireless network a ghost base station with a Spectrum Access System which is managing the use of spectrum by the second wireless network includes providing a location of the ghost base station, said location of the ghost base station being based on one or more of the following: the first user equipment device location or the second user equipment device location.

Method Embodiment 15B. The communications method of Method Embodiment 15, wherein the spectrum query includes a request for information on available spectrum at a first location, said first location being based on one or more of the following: (i) location of the first user equipment device, and (ii) location of the second user equipment device; and wherein the response to the spectrum query includes information identifying available spectrum at the first location (e.g., information identifying the best portions of available spectrum at the first location such as for example the available spectrum channel(s) with the least interference).

Method Embodiment 15C. The communications method of Method Embodiment 15A or 15B further comprising: performing, by the Spectrum Access System, an evaluation of available spectrum based on the location of the ghost base station (e.g., provided during registration of the ghost base station) or the first location included in the spectrum query; and determining, by the Spectrum Access System, the available spectrum channels and an amount of interference on each of the available spectrum channels; determining, by the Spectrum Access System, available spectrum channels with the least amount of interference; and communicating, by the SAS to the OSS/Domain Proxy, one or more of the following: (i) information on the available spectrum channels, (ii) interference measurement information on the available spectrum channels, (iii) identification of available spectrum channels with the least amount of interference.

Method Embodiment 16. The communications method of Method Embodiment 1, further comprising: identifying a General Authorized Access (GAA) channel for the sidelink communications session by sending a query to a Spectrum Access System.

Method Embodiment 17. The communications method of Method Embodiment 1, wherein the first user equipment device and second user equipment device are user equipment devices of the second wireless network; wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network; wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network; wherein the first wireless network utilizes first spectrum to communicate with user equipment devices, said first spectrum being in the cellular frequency band (e.g., between 600 MHz and 39 GHz); wherein the second wireless network utilizes second spectrum to communicate with user equipment devices (e.g., CBRS spectrum in frequency band between 3.55 to 3.7 GHz), said first and second spectrum being different.

Method Embodiment 17A. The communications method of Method Embodiment 17, wherein the first wireless network provides wireless services to user equipment devices of the second wireless network pursuant to an agreement between the first wireless network and the second wireless network (e.g., MVNO agreement).

Method Embodiment 17B. The communications method of Method Embodiment 17, wherein the second wireless network operator is Hybrid Mobile Network Operator (e.g., Charter Communications) in which the second wireless network is owned and operated by the second wireless network operator and wherein the second wireless network operator operates as a Mobile Virtual Network Operator with respect to the first wireless network, said first wireless network being owned and operated by a Mobile Network Operator (e.g., Verizon) with which the second wireless network operator has entered into an agreement in which the second wireless network user equipment devices can receive wireless services from the first wireless network.

Method Embodiment 18. The communications method of Method Embodiment 1, further comprising: prior to or along with receiving the session initiation request information receiving, by the geo-fencing proximity analyzer, the location information of the first user equipment device and the location information of the second user equipment device via the first wireless network.

Method Embodiment 19. The communications method of Method Embodiment 18, further comprising: reporting on a scheduled basis, by the first user equipment device, the location of the first user equipment device (e.g., GPS coordinates) to the geo-fencing proximity analyzer; reporting on a scheduled basis, by the second user equipment device, the location of the second user equipment device (e.g., GPS coordinates) to the geo-fencing proximity analyzer.

Method Embodiment 20. The communications method of Method Embodiment 1, wherein the session request information is included in a sidelink determination request received from the first wireless network.

List of Exemplary First Set of Numbered System Embodiments

System Embodiment 1. A communications system comprising: a geo-fencing proximity analyzer including: memory; and a first processor that controls the geo-fencing proximity analyzer to perform the following operations: receiving, by the geo-fencing proximity analyzer, from a first wireless network, session request information (e.g., a sidelink determination request or session initiation request from the first core network of first wireless network) for a session to be established between a first user equipment device and a second user equipment device, said first user equipment device and the second user equipment device both being located outside the coverage area of the second wireless network; and determining, by the geo-fencing proximity analyzer, whether or not a sidelink communications session is to be established between the first user equipment device and the second user equipment device based on: (i) the location of the first user equipment device, and (ii) the location of the second user equipment device.

System Embodiment 2. The communications system of System Embodiment 1, wherein the first processor further controls the geo-fencing proximity analyzer to perform the following operation when the geo-fencing proximity analyzer determines that a sidelink communications session is to be established between the first user equipment device and the second user equipment device: communicating spectrum channel grant information to the first user equipment device and the second user equipment device via the first wireless network, said spectrum channel grant information identifying one or more spectrum channels to be used for the sidelink communications session between the first user equipment device and the second user equipment device.

System Embodiment 2A. The communications system of System Embodiment 2, wherein the first processor further controls the geo-fencing proximity analyzer to perform the following operation: communicating from the geo-fencing proximity analyzer to the first user equipment device and the second user equipment device via the first wireless network power transmission level instructions to be used for the sidelink communications session between the first user equipment device and the second user equipment device and an indication that the communications session between the first user equipment device and the second user equipment is be implemented as a sidelink communications session.

System Embodiment 2B. The communications system of System Embodiment 2A, wherein a sidelink communications session is established between the first user equipment device and the second user equipment device utilizing the spectrum channels identified in the spectrum channel grant information.

System Embodiment 3. The communications system of System Embodiment 2, wherein the one or more spectrum channels are spectrum channels licensed to the second wireless network (e.g., CBRS PAL spectrum licensed to the second wireless network).

System Embodiment 4. The communications system of System Embodiment 2, wherein the one or more spectrum channels are unlicensed spectrum channels (e.g., CBRS GAA spectrum channels).

System Embodiment 5. The communications system of System Embodiment 2, wherein the one or more spectrum channels are determined by querying a Spectrum Access System for available spectrum channels in a first location, said first location being determined based on one or more of the following: (i) the first user equipment device location, and (ii) the second user equipment device location.

System Embodiment 6. The communications system of System Embodiment 2, wherein the first processor further controls the geo-fencing proximity analyzer to perform the following operation: determining, by the geo-fencing proximity analyzer, the type of spectrum to be utilized for the sidelink communications session based on a determination of whether or not the sidelink communications session will cause interference with other user equipment devices operating within the coverage area of the second wireless network.

System Embodiment 6A. The communications system of System Embodiment 6, wherein the first processor further controls the geo-fencing proximity analyzer to perform the following operation: when the determination is that the sidelink communications session will cause interference with other user equipment devices operating within the coverage area of the second wireless network: determining that the type of spectrum to be used for the sidelink communications session is to be unlicensed spectrum (e.g., GAA spectrum).

System Embodiment 6B. The communications system of System Embodiment 6A, wherein the first processor further controls the geo-fencing proximity analyzer to perform the following operation when the determination is that the sidelink communications session will not cause interference with other user equipment devices operating within the coverage area of the second wireless network determining that the type of spectrum to be used for the sidelink communications session is to be licensed spectrum (e.g., PAL spectrum licensed by the second wireless network) or a combination of licensed and unlicensed spectrum (PAL spectrum licensed to the second wireless network as well as GAA spectrum).

System Embodiment 6C. The communications system of System Embodiment 6B, wherein making said determination of whether or not the sidelink communications session will cause interference with other user equipment devices operating within the coverage area of the second wireless network is based on transmission signal power required for the sidelink communications session.

System Embodiment 6D. The communications system of System Embodiment 6C, wherein the first processor further controls the geo-fencing proximity analyzer to perform the following operation: determining transmission signal power required for the sidelink communications session based on a pathloss calculation for the communications signals for the sidelink communications session (e.g., signal attenuation as the signals transmitted from the first user equipment device travels to the second user equipment device and signals from the second user equipment device travel to the first user equipment device), said pathloss calculation being based on the location of the first user equipment device, the location of the second user equipment device, the capabilities of the first user equipment device, the capabilities of the second user equipment device, and one or more propagation models and/or pathloss calculation formulae.

System Embodiment 7. The communications system of System Embodiment 6, wherein the first processor further controls the geo-fencing proximity analyzer to perform the following operation: making said determination of whether or not the sidelink communications session will cause interference with other user equipment devices operating within the coverage area of the second wireless network is based on transmission power levels for the first user equipment device and the second user equipment device determined based on a pathloss calculation.

System Embodiment 8. The communications system of System Embodiment 7, wherein the first processor further controls the geo-fencing proximity analyzer to perform the following operations: requesting, by the geo-fencing proximity analyzer, power transmission level instructions for the first user equipment device and the second user equipment device from a pathloss calculator; receiving, by the geo-fencing proximity analyzer, said requested power transmission level instructions for the first user equipment device and the second user equipment device from the pathloss calculator; and communicating the power transmission level instructions to the first user equipment device and the second user equipment device via the first wireless network.

System Embodiment 9. The communications system of System Embodiment 1, wherein said determining, by the geo-fencing proximity analyzer, whether or not a sidelink communications session is to be established between the first user equipment device and the second user equipment device is further based on a transmission power signal level for the sidelink communications session, said transmission power signal level being determined using a pathloss calculation in which a range of communication of the first user equipment device and a range of communication of the second user equipment device is determined based on capabilities of the first user equipment device, capabilities of the second user equipment device, and one or more propagation models.

System Embodiment 10. The communications system of System Embodiment 2, wherein the first processor further controls the geo-fencing proximity analyzer to perform the following operation prior to communicating said spectrum channel grant information to the first user equipment device and second user equipment device, determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or (iii) a combination of spectrum licensed to the second wireless network and unlicensed spectrum (CBRS PAL+GAA spectrum).

System Embodiment 10A. The communications system of System Embodiment 10, wherein said determination by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g. GAA spectrum), or (iii) a combination of spectrum licensed to the second wireless network and unlicensed spectrum (CBRS PAL+GAA spectrum) is based on whether or not the sidelink communications session will cause interference with other user equipment devices operating in the cell coverage area of the second wireless network (e.g., will the sidelink communications at the power transmission level provided by a pathloss calculator cause interference with the communications of other user equipment devices operating within the cell coverage area of the second wireless network e.g., using the same licensed spectrum).

System Embodiment 10B. The communications system of System Embodiment 10, wherein said determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or (iii) a combination of spectrum licensed to the second wireless network and unlicensed spectrum (CBRS PAL+GAA spectrum) includes: determining that the spectrum for the sidelink communications session is to be spectrum licensed to the second wireless network when the user equipment power transmission level for the sidelink communications session is below or equal to a first threshold value and both the first user equipment device and the second user equipment device are not within a first distance from the cell coverage area of the second wireless network.

System Embodiment 10C. The communications system of System Embodiment 10, wherein said determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g. GAA spectrum), or (iii) a combination of spectrum licensed to the second wireless network and unlicensed spectrum (CBRS PAL+GAA spectrum) includes: determining that the spectrum for the sidelink communications session is to be unlicensed spectrum when the user equipment power transmission level for the sidelink communications session is above a first threshold value and either the first user equipment device or the second user equipment device is within a first distance from the cell coverage area of the second wireless network.

System Embodiment 10D. The communications system of System Embodiment 10, wherein said determining by the geo-fencing proximity analyzer whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or iii) a combination of spectrum licensed to the second wireless network and unlicensed spectrum (CBRS PAL+GAA spectrum) includes: determining that the spectrum for the sidelink communications session is to be a combination of spectrum licensed to the second wireless network and unlicensed spectrum when the following criteria are met: (i) the user equipment power transmission level for the sidelink communications session is below or equal to a first threshold value, (ii) both the first user equipment device and the second user equipment device are not within a first distance from the cell coverage area of the second wireless network, and (iii) an amount of available licensed spectrum is below the required amount of spectrum for the sidelink communications session.

System Embodiment 10E. The communications system of System Embodiment 10, wherein the first processor further controls the geo-fencing proximity analyzer to perform the following operation prior to making said determination of whether the spectrum for the sidelink communications session is to be: (i) spectrum licensed to the second wireless network (e.g., CBRS PAL spectrum licensed to the second wireless network), (ii) unlicensed spectrum (e.g., GAA spectrum), or (iii) a combination of spectrum licensed to the second wireless network and unlicensed spectrum (CBRS PAL+GAA spectrum), requesting, by the geo-fencing proximity analyzer, a pathloss calculator determine a power transmission level required for the sidelink communications session between the first user equipment device and the second user equipment device.

System Embodiment 10F. The communications system of System Embodiment 10E, wherein the requested power transmission level required for the sidelink communications session is provided to the geo-fencing proximity analyzer by the pathloss calculator; and wherein said pathloss calculator determines a pathloss (e.g., signal attenuation) for the sidelink communications session between the first user equipment device and the second user equipment device based on the location of the first user equipment device, the location of the second user equipment device, the transmission capabilities of the first user equipment device, the transmission capabilities of the second user equipment device, and one or more pathloss models, said location of the first user equipment device, the location of the second user equipment device, the transmission capabilities of the first user equipment device, the transmission capabilities of the second user equipment device being provided to the pathloss calculator by the geo-fencing proximity analyzer; and determining, by the pathloss calculator; and wherein said pathloss calculator uses said determined pathloss for the sidelink communications session to determine the power transmission level instructions (e.g., UE transmit power levels) for the first user equipment device and the second user equipment device for the sidelink communications session.

System Embodiment 11. The communications system of System Embodiment 2, wherein the one or more spectrum channels are spectrum channels granted for use to a ghost base station of the second wireless network by a Spectrum Access System managing the spectrum of the second wireless network, said ghost base station (e.g., ghost CBSD) being a fictious non-existent base station registered with the Spectrum Access System as belonging to the second wireless network.

System Embodiment 12. The communications system of System Embodiment 1, wherein said determining, by the geo-fencing proximity analyzer, whether or not a sidelink communications session is to be established between the first user equipment device and the second user equipment device based on: (i) the location of the first user equipment device, and (ii) the location of the second user equipment device includes: determining whether the distance between the first user equipment device and the second user equipment device is less than a first threshold value.

System Embodiment 13. The communications of System Embodiment 12, wherein said determination, by the geofencing proximity analyzer, of whether or not a sidelink communications session is to be established between the first user equipment device and the second user equipment device is further based on one or more of the following: device type of the first user equipment device, device type of the second user equipment device, capabilities of the first user equipment device, capabilities of the second user equipment device, type of communications session to be established.

System Embodiment 13A. The communications system of System Embodiment 13, wherein said determination, by the geo-fencing proximity analyzer, of whether or not a sidelink communications session is to be established between the first user equipment device and the second user equipment device is further based on information (e.g., calculated and/or determined pathloss for the sidelink communication session between UE 1 and UE 2 (e.g., transmission signal attenuation from the first user equipment device to the second user equipment device) and/or user equipment device power transmission level required for the sidelink communication) received from a pathloss calculator regarding the sidelink communications session to be established between the first user equipment device and the second user equipment device.

System Embodiment 14. The communications system of System Embodiment 2, wherein said first processor further controls the geo-fencing proximity analyzer to perform the following operations: identifying one or more available spectrum channels that can be used for the sidelink communications session between the first user equipment device and the second user equipment device; and obtaining one or more spectrum channel grants for the sidelink communications session from a Spectrum Access System managing the spectrum of the second wireless network, said one or more spectrum channel grants including said information identifying said one or more spectrum channels to be used for the sidelink communications session between the first user equipment device and the second user equipment device; and wherein said one or more spectrum channels to be used for the sidelink communications session are one or more of the prior identified available spectrum channels that can be used for the sidelink communications session between the first user equipment device and the second user equipment device.

System Embodiment 15. The communications system of System Embodiment 2, further comprising: a Domain Proxy which is part of the second wireless network, said Domain Proxy including memory and a second processor that controls the Domain Proxy to perform the following operations: registering by a Domain Proxy of the second wireless network a ghost base station with a Spectrum Access System which is managing the use of spectrum by the second wireless network, said ghost base station being a fictious non-existent base station; receiving at the Domain Proxy a registration identifier for the ghost base station from the Spectrum Access System; communicating a spectrum query from the Domain Proxy to the Spectrum Access System, said spectrum query including information (e.g., the registration identifier) indicating the query is from the ghost base station, said spectrum query requesting information on spectrum available for use by the ghost base station; receiving by the Domain Proxy information from the Spectrum Access System in response to the spectrum query, said information identifying spectrum available for use by the ghost base station (e.g., information identifying the best portions of available spectrum at the location of the ghost base station such as for example the available spectrum channel(s) with the least interference).

System Embodiment 15A. The communications system of System Embodiment 15, wherein said registering by a Domain Proxy of the second wireless network a ghost base station with a Spectrum Access System which is managing the use of spectrum by the second wireless network includes providing a location of the ghost base station, said location of the ghost base station being based on one or more of the following: the first user equipment device location or the second user equipment device location.

System Embodiment 15B. The communications system of System Embodiment 15, wherein the spectrum query includes a request for information on available spectrum at a first location, said first location being based on one or more of the following: (i) location of the first user equipment device, and (ii) location of the second user equipment device; and wherein the response to the spectrum query includes information identifying available spectrum at the first location (e.g., information identifying the best portions of available spectrum at the first location such as for example the available spectrum channel(s) with the least interference).

System Embodiment 15C. The communications system of System Embodiment 15A or 15B, further comprising: a Spectrum Access System, said Spectrum Access System including a third processor that controls the Spectrum Access System to perform the following operations: performing, by the Spectrum Access System, an evaluation of available spectrum based on the location of the ghost base station (e.g., provided during registration of the ghost base station) or the first location included in the spectrum query; and determining, by the Spectrum Access System, the available spectrum channels and an amount of interference on each of the available spectrum channels; determining, by the Spectrum Access System, available spectrum channels with the least amount of interference; and communicating, by the SAS to the Domain Proxy, one or more of the following: (i) information on the available spectrum channels, (ii) interference measurement information on the available spectrum channels, (iii) identification of available spectrum channels with the least amount of interference.

System Embodiment 16. The communications system of System Embodiment 1, wherein said first processor further controls the geo-fencing proximity analyzer to perform the following operation: identifying a General Authorized Access (GAA) channel for the sidelink communications session by sending a message to a Domain Proxy requesting the Domain Proxy to send a GAA spectrum channel query to a Spectrum Access System managing the spectrum of the second wireless network.

System Embodiment 17. The communications system of System Embodiment 1, wherein the first user equipment device and second user equipment device are user equipment devices of the second wireless network; wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network; wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network; wherein the first wireless network utilizes first spectrum to communicate with user equipment devices, said first spectrum being in the cellular frequency band (e.g., between 600 MHz and 39 GHz); wherein the second wireless network utilizes second spectrum to communicate with user equipment devices (e.g., CBRS spectrum in frequency band between 3.55 to 3.7 GHz), said first and second spectrum being different.

System Embodiment 17A. The communications system of System Embodiment 17, wherein the first wireless network provides wireless services to user equipment devices of the second wireless network pursuant to an agreement between the first wireless network and the second wireless network (e.g., MVNO agreement).

System Embodiment 17B. The communications system of System Embodiment 17, wherein the second wireless network operator is Hybrid Mobile Network Operator (e.g., Charter Communications) in which the second wireless network is owned and operated by the second wireless network operator and wherein the second wireless network operator operates as a Mobile Virtual Network Operator with respect to the first wireless network, said first wireless network being owned and operated by a Mobile Network Operator (e.g., Verizon) with which the second wireless network operator has entered into an agreement in which the second wireless network user equipment devices can receive wireless services from the first wireless network.

System Embodiment 18. The communications system of System Embodiment 1, wherein said first processor further controls the geo-fencing proximity analyzer to perform the following operation prior to or along with receiving the session initiation request information: receiving, by the geo-fencing proximity analyzer, the location information of the first user equipment device and the location information of the second user equipment device via the first wireless network.

System Embodiment 19. The communications system of System Embodiment 18, wherein said first processor further controls the geo-fencing proximity analyzer to perform the following operations: receiving on a scheduled basis from the first user equipment device reporting information including the location of the first user equipment device (e.g., GPS coordinates); receiving on a scheduled basis from the second user equipment device reporting information including the location of the second user equipment device (e.g., GPS coordinates).

System Embodiment 20. The communications system of System Embodiment 1, wherein the session request information is included in a sidelink determination request received from the first wireless network.

List of Exemplary Second Set of Numbered System Embodiments

System Embodiment 1: A communication system comprising: a first wireless network; a second wireless network; a geo-fencing proximity analyzer which is part of the second wireless network, said geo-fencing proximity analyzer including: first memory; and a first processor that controls the geo-fencing proximity analyzer to perform the following operations: receiving, by the geo-fencing proximity analyzer, from a first wireless network, session request information (e.g., sidelink determination request from the first core network of first wireless network) for a session to be established between a first user equipment device and a second user equipment device, said first user equipment device and the second user equipment device both being located outside the coverage area of the second wireless network; and determining, by the geo-fencing proximity analyzer, whether or not a sidelink communications session is to be established between the first user equipment device and the second user equipment device based on: (i) the location of the first user equipment device, and (ii) the location of the second user equipment device (e.g., if the distance between the first user equipment device and the second user equipment device is greater than a first threshold value).

System Embodiment 2. The communications system of System Embodiment 1, wherein the first processor further controls the geo-fencing proximity analyzer perform the following operation: when the geo-fencing proximity analyzer determines that a sidelink communications session is to be established between the first user equipment device and the second user equipment device, communicating spectrum channel grant information to the first user equipment device and the second user equipment device via the first wireless network, said spectrum channel grant information identifying one or more spectrum channels to be used for the sidelink communications session between the first user equipment device and the second user equipment device.

System Embodiment 2A. The communications system of System Embodiment 2, wherein the first processor further controls the geo-fencing proximity analyzer to perform the following operation: communicating from the geo-fencing proximity analyzer to the first user equipment device and the second user equipment device via the first wireless network power transmission level instructions to be used for the sidelink communications session between the first user equipment device and the second user equipment device and an indication that the communications session between the first user equipment device and the second user equipment is be implemented as a sidelink communications session.

System Embodiment 2B. The communications system of System Embodiment 2A, wherein the first user equipment device and the second user equipment device establish a sidelink communications session between the first user equipment device and the second user equipment device utilizing the spectrum channels identified in the received spectrum channel grant information and power transmission level instructions.

System Embodiment 3. The communications system of System Embodiment 2, wherein the one or more spectrum channels are spectrum channels licensed to the second wireless network (e.g., CBRS PAL spectrum licensed to the second wireless network).

System Embodiment 4. The communications system of System Embodiment 2 further comprising: a pathloss calculator, said pathloss calculator being part of the second wireless network and including: second memory; and a second processor that controls the pathloss calculator to perform the following operation: determining, by the pathloss calculator, the pathloss (e.g., signal attenuation) for the sidelink communications session between the first user equipment device and the second user equipment device based on the location of the first user equipment device, the location of the second user equipment device, the transmission capabilities of the first user equipment device, the transmission capabilities of the second user equipment device, and one or more pathloss models.

System Embodiment 5. The communications system of System Embodiment 4, wherein said second processor further controls the pathloss calculator to perform the following operation: determining, by the pathloss calculator, power level transmission instructions (e.g., UE transmit power levels) for the first user equipment device and the second user equipment device for the sidelink communications session.

System Embodiment 6. The communications system of System Embodiment 5, wherein the first processor further controls the geo-fencing proximity analyzer to perform the following operation: determining the type of spectrum to be used for the sidelink communications session based on the power level transmission instructions, said type of spectrum including spectrum licensed to the second wireless network or unlicensed spectrum.

System Embodiment 7. The communications system of System Embodiment 6, further comprising: a Domain Proxy which is part of the second wireless network, said Domain Proxy including: third memory; and a third processor that controls the Domain Proxy to perform the following operations: registering by the Domain Proxy of the second wireless network a ghost base station with a Spectrum Access System which is managing the use of spectrum by the second wireless network, said ghost base station being a fictious non-existent base station; receiving at the Domain Proxy a registration identifier for the ghost base station from the Spectrum Access System; communicating a spectrum query from the Domain Proxy to the Spectrum Access System, said spectrum query including information (e.g., the registration identifier) indicating the query is from the ghost base station, said spectrum query requesting information on spectrum available for use by the ghost base station; receiving by the Domain Proxy information from the Spectrum Access System in response to the spectrum query, said information identifying spectrum available for use by the ghost base station (e.g., information identifying the best portions of available spectrum at the location of the ghost base station such as for example the available spectrum channel(s) with the least interference).

System Embodiment 8. The communications system of System Embodiment 7, wherein said registering by a Domain Proxy of the second wireless network a ghost base station with a Spectrum Access System which is managing the use of spectrum by the second wireless network includes providing a location of the ghost base station, said location of the ghost base station being based on one or more of the following: the first user equipment device location or the second user equipment device location.

System Embodiment 9. The communications system of System Embodiment 7, wherein the spectrum query includes a request for information on available spectrum at a first location, said first location being based on one or more of the following: (i) location of the first user equipment device, and (ii) location of the second user equipment device; and wherein the response to the spectrum query includes information identifying available spectrum at the first location (e.g., information identifying the best portions of available spectrum at the first location such as for example the available spectrum channel(s) with the least interference).

System Embodiment 10. The communications system of System Embodiment 1, wherein the first user equipment device and second user equipment device are user equipment devices of the second wireless network; wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network; wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network; wherein the first wireless network utilizes first spectrum to communicate with user equipment devices, said first spectrum being in the cellular frequency band (e.g., between 600

MHz and 39 GHz); wherein the second wireless network utilizes second spectrum to communicate with user equipment devices (e.g., CBRS spectrum in frequency band between 3.55 to 3.7 GHz), said first and second spectrum being different.

System Embodiment 10A. The communications system of System Embodiment 10, wherein the first wireless network provides wireless services to user equipment devices of the second wireless network pursuant to an agreement between the first wireless network and the second wireless network (e.g., MVNO agreement).

System Embodiment 10B. The communications system of System Embodiment 10, wherein the second wireless network operator is Hybrid Mobile Network Operator (e.g., Charter Communications) in which the second wireless network is owned and operated by the second wireless network operator and wherein the second wireless network operator operates as a Mobile Virtual Network Operator with respect to the first wireless network, said first wireless network being owned and operated by a Mobile Network Operator (e.g., Verizon) with which the second wireless network operator has entered into an agreement in which the second wireless network user equipment devices can receive wireless services from the first wireless network.

System Embodiment 11. The communications system of System Embodiment 1, wherein the first processor further controls the geo-fencing proximity analyzer to perform the following operation: prior to or along with receiving the session initiation request information receiving, by the geo-fencing proximity analyzer, the location information of the first user equipment device and the location information of the second user equipment device via the first wireless network.

List of Exemplary Numbered Non-Transitory Computer Readable Medium Embodiments

Non-transitory Computer Readable Medium Embodiment 1. A non-transitory computer readable medium including a first set of computer executable instructions which when executed by a processor of a geo-fencing proximity analyzer cause the geo-fencing proximity analyzer of a second wireless network to perform the steps of: receiving from a first wireless network, session request information (e.g., sidelink determination request from the first core network of first wireless network) for a session to be established between a first user equipment device and a second user equipment device, said first user equipment device and the second user equipment device both being located outside the coverage area of the second wireless network; and determining, by the geo-fencing proximity analyzer, whether or not a sidelink communications session is to be established between the first user equipment device and the second user equipment device based on: (i) the location of the first user equipment device, and (ii) the location of the second user equipment device.

Non-transitory Computer Readable Medium Embodiment 2. The non-transitory computer readable medium of Non-transitory Computer Readable Medium Embodiment 1, wherein the first set of computer executable instructions when executed by the processor of the geo-fencing proximity analyzer cause the geo-fencing proximity analyzer of the second wireless network to perform the additional step of: when the geo-fencing proximity analyzer determines that a sidelink communications session is to be established between the first user equipment device and the second user equipment device, communicating spectrum channel grant information to the first user equipment device and the second user equipment device via the first wireless network, said spectrum channel grant information identifying one or more spectrum channels to be used for the sidelink communications session between the first user equipment device and the second user equipment device.

The techniques of various embodiments may be implemented using software, hardware and/or a combination of software and hardware. Various embodiments are directed to apparatus, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements. Various embodiments are also directed to methods, e.g., method of controlling and/or operating wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements described herein are implemented using one or more components to perform the steps corresponding to one or more methods, for example, generating or creating messages, implementing sidelink sessions, connections, message reception, message transmission, switching modes, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements are configured to perform the steps of the methods described as being performed by the wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements, with a processor which includes a component corresponding to each of the steps of the various described methods performed by the device in which the processor is included. In some but not all embodiments a device, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, geo-fencing proximity analyzer, pathloss calculator, Domain Proxy, OSS including a Domain Proxy, UE information forwarding node, CBSD, Spectrum Access System, servers, nodes, and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
   receiving from a first wireless network, by a geo-fencing proximity analyzer of a second wireless network, session request information for a session to be established between a first user equipment device and a second user equipment device, said first user equipment device and the second user equipment device both being located outside a coverage area of the second wireless network; and
   determining, by the geo-fencing proximity analyzer, whether or not a sidelink communications session is to be established between the first user equipment device and the second user equipment device based on: (i) a location of the first user equipment device, and (ii) a location of the second user equipment device;
wherein the first user equipment device and second user equipment device are user equipment devices of the second wireless network;
wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network;
wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network;
wherein the first wireless network utilizes first spectrum to communicate with user equipment devices, said first spectrum being in a cellular frequency band; and
wherein the second wireless network utilizes second spectrum which is not in the cellular frequency band to communicate with user equipment devices.

2. The communications method of claim 1, further comprising:
when the geo-fencing proximity analyzer determines that a sidelink communications session is to be established between the first user equipment device and the second user equipment device, communicating spectrum channel grant information to the first user equipment device and the second user equipment device via the first wireless network, said spectrum channel grant information identifying one or more spectrum channels to be used for the sidelink communications session between the first user equipment device and the second user equipment device.

3. The communications method of claim 2, wherein the one or more spectrum channels are spectrum channels licensed to the second wireless network.

4. The communications method of claim 2,
wherein the second spectrum is in frequency band 48 or in a Citizens Broadband Radio Service (CBRS) frequency band; and
wherein the one or more spectrum channels are unlicensed spectrum channels.

5. The communications method of claim 2, wherein the one or more spectrum channels are determined by querying a Spectrum Access System for available spectrum channels in a first location, said first location being determined based on one or more of the following: (i) the first user equipment device location, and (ii) the second user equipment device location.

6. The communications method of claim 2, further comprising:
determining, by the geo-fencing proximity analyzer, the type of spectrum to be utilized for the sidelink communications session based on a determination of whether or not the sidelink communications session will cause interference with other user equipment devices operating within the coverage area of the second wireless network.

7. The communications method of claim 6, further comprising:
making said determination of whether or not the sidelink communications session will cause interference with other user equipment devices operating within the coverage area of the second wireless network is based on transmission power levels for the first user equipment device and the second user equipment device determined based on a pathloss calculation.

8. The communications method of claim 7, further comprising:
requesting, by the geo-fencing proximity analyzer, power transmission level instructions for the first user equipment device and the second user equipment device from a pathloss calculator;
receiving, by the geo-fencing proximity analyzer, said requested power transmission level instructions for the first user equipment device and the second user equipment device from the pathloss calculator; and
communicating the power transmission level instructions to the first user equipment device and the second user equipment device via the first wireless network.

9. The communications method of claim 1,
wherein said determining, by the geo-fencing proximity analyzer, whether or not a sidelink communications session is to be established between the first user equipment device and the second user equipment device is further based on a transmission power signal level for the sidelink communications session, said transmission power signal level being determined using a pathloss calculation in which a range of communication of the first user equipment device and a range of communication of the second user equipment device is determined based on capabilities of the first user equipment device, capabilities of the second user equipment device, and one or more propagation models.

10. The communications method of claim 2, further comprising:
prior to communicating said spectrum channel grant information to the first user equipment device and second user equipment device, determining by the geo-fencing proximity analyzer whether the spectrum for the sidelink communications session is to be: (i) spectrum licensed to the second wireless network, (ii) unlicensed spectrum, or (iii) a combination of spectrum licensed to the second wireless network and unlicensed spectrum.

11. A communications method comprising:
receiving from a first wireless network, by a geo-fencing proximity analyzer of a second wireless network, session request information for a session to be established between a first user equipment device and a second user equipment device, said first user equipment device and the second user equipment device both being located outside a coverage area of the second wireless network;
determining, by the geo-fencing proximity analyzer, whether or not a sidelink communications session is to be established between the first user equipment device and the second user equipment device based on: (i) a location of the first user equipment device, and (ii) a location of the second user equipment device; and
communicating spectrum channel grant information to the first user equipment device and the second user equipment device via the first wireless network when the geo-fencing proximity analyzer determines that a sidelink communications session is to be established between the first user equipment device and the second user equipment device, said spectrum channel grant information identifying one or more spectrum channels to be used for the sidelink communications session between the first user equipment device and the second user equipment device; and wherein the one or more spectrum channels are spectrum channels granted for use to a ghost base station of the second wireless network by a Spectrum Access System managing the spectrum of the second wireless network, said ghost base station being a fictious non-existent base station registered with the Spectrum Access System as belonging to the second wireless network.

12. The communications method of claim 11,
wherein the first user equipment device and second user equipment device are user equipment devices of the second wireless network;
wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network;
wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network;
wherein the first wireless network utilizes first spectrum to communicate with user equipment devices, said first spectrum being in a cellular frequency band; and
wherein the second wireless network utilizes second spectrum which is not in the cellular frequency band to communicate with user equipment devices.

13. A communications system comprising:
a geo-fencing proximity analyzer including:
memory; and
a first processor that controls the geo-fencing proximity analyzer to perform the following operations:
receiving, by the geo-fencing proximity analyzer, from a first wireless network, session request information for a session to be established between a first user equipment device and a second user equipment device, said first user equipment device and the second user equipment device both being located outside a coverage area of the second wireless network; and
determining, by the geo-fencing proximity analyzer, whether or not a sidelink communications session is to be established between the first user equipment device and the second user equipment device based on: (i) a location of the first user equipment device, and (ii) a location of the second user equipment device;
wherein the first user equipment device and second user equipment device are user equipment devices of the second wireless network;
wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network;

wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network;
wherein the first wireless network utilizes first spectrum to communicate with user equipment devices, said first spectrum being in a cellular frequency band; and
wherein the second wireless network utilizes second spectrum to communicate with user equipment devices, said second spectrum not being within the cellular frequency band.

14. The communications system of claim 13, wherein the first processor further controls the geo-fencing proximity analyzer to perform the following operation when the geo-fencing proximity analyzer determines that a sidelink communications session is to be established between the first user equipment device and the second user equipment device:
communicating spectrum channel grant information to the first user equipment device and the second user equipment device via the first wireless network, said spectrum channel grant information identifying one or more spectrum channels to be used for the sidelink communications session between the first user equipment device and the second user equipment device.

15. The communications system of claim 14, wherein the one or more spectrum channels are spectrum channels licensed to the second wireless network.

16. The communications system of claim 14, wherein the one or more spectrum channels are unlicensed spectrum channels.

17. The communications system of claim 14,
wherein the first processor further controls the geo-fencing proximity analyzer to perform the following operation:
determining, by the geo-fencing proximity analyzer, the type of spectrum to be utilized for the sidelink communications session based on a determination of whether or not the sidelink communications session will cause interference with other user equipment devices operating within the coverage area of the second wireless network.

18. A communications system comprising:
a geo-fencing proximity analyzer including:
memory; and
a first processor that controls the geo-fencing proximity analyzer to perform the following operations:
receiving, by the geo-fencing proximity analyzer, from a first wireless network, session request information for a session to be established between a first user equipment device and a second user equipment device, said first user equipment device and the second user equipment device both being located outside a coverage area of the second wireless network;
determining, by the geo-fencing proximity analyzer, whether or not a sidelink communications session is to be established between the first user equipment device and the second user equipment device based on: (i) a location of the first user equipment device, and (ii) a location of the second user equipment device; and
communicating spectrum channel grant information to the first user equipment device and the second user equipment device via the first wireless network when the geo-fencing proximity analyzer determines that a sidelink communications session is to be established between the first user equipment device and the second user equipment device, said spectrum channel grant information identifying one or more spectrum channels to be used for the sidelink communications session between the first user equipment device and the second user equipment device; and wherein the one or more spectrum channels are spectrum channels granted for use to a ghost base station of the second wireless network by a Spectrum Access System managing the spectrum of the second wireless network, said ghost base station being a fictious non-existent base station registered with the Spectrum Access System as belonging to the second wireless network.

19. The communications system of claim 18, wherein the first user equipment device and second user equipment device are user equipment devices of the second wireless network;

wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network;

wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network;

wherein the first wireless network utilizes first spectrum to communicate with user equipment devices, said first spectrum being in a cellular frequency band; and wherein the second wireless network utilizes second spectrum to communicate with user equipment devices, said second spectrum not being within the cellular frequency band.

20. A non-transitory computer readable medium including a first set of computer executable instructions which when executed by a processor of a geo-fencing proximity analyzer of a second wireless network cause the geo-fencing proximity analyzer to perform the steps of:

receiving, by the geo-fencing proximity analyzer, from a first wireless network, session request information for a session to be established between a first user equipment device and a second user equipment device, said first user equipment device and the second user equipment device both being located outside a coverage area of the second wireless network; and determining, by the geo-fencing proximity analyzer, whether or not a sidelink communications session is to be established between the first user equipment device and the second user equipment device based on: (i) a location of the first user equipment device, and (ii) a location of the second user equipment device;

wherein the first user equipment device and second user equipment device are user equipment devices of the second wireless network;

wherein said first user equipment device is a mobile device with Dual Subscriber Identity Module (SIM) Dual Subscription (DSDS) functionality, said Dual SIM Dual Subscription functionality allowing the first user equipment device to receive services from either the first wireless network or the second wireless network;

wherein said second user equipment device is a mobile device with Dual Subscriber Identity Module (SIM) Dual Subscription (DSDS) functionality, said Dual SIM Dual Subscription functionality allowing the second user equipment device to receive services from either the first wireless network or the second wireless network;

wherein the first wireless network utilizes first spectrum to communicate with user equipment devices, said first spectrum being in a cellular frequency band; and wherein the second wireless network utilizes second spectrum to communicate with user equipment devices, said second spectrum not being within the cellular frequency band.

* * * * *